US008928715B2

(12) United States Patent
Omori et al.

(10) Patent No.: US 8,928,715 B2
(45) Date of Patent: Jan. 6, 2015

(54) LIGHT SOURCE DRIVER, LIGHT SOURCE-DRIVING METHOD, IMAGE-FORMING APPARATUS, LIGHT SOURCE-DRIVING CIRCUIT, AND OPTICAL SCANNER

(71) Applicants: Atsufumi Omori, Chigasaki (JP); Masaaki Ishida, Yokohama (JP); Muneaki Iwata, Yokohama (JP); Hayato Fujita, Yokohama (JP)

(72) Inventors: Atsufumi Omori, Chigasaki (JP); Masaaki Ishida, Yokohama (JP); Muneaki Iwata, Yokohama (JP); Hayato Fujita, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/140,147

(22) Filed: Dec. 24, 2013

(65) Prior Publication Data

US 2014/0176656 A1 Jun. 26, 2014

(30) Foreign Application Priority Data

Dec. 25, 2012 (JP) ................................ 2012-280564
Dec. 28, 2012 (JP) ................................ 2012-287138

(51) Int. Cl.

| | |
|---|---|
| ***B41J 2/47*** | (2006.01) |
| ***B41J 2/385*** | (2006.01) |
| ***B41J 2/435*** | (2006.01) |
| ***H05B 37/02*** | (2006.01) |
| ***G02B 26/10*** | (2006.01) |
| ***G03G 15/04*** | (2006.01) |

(52) U.S. Cl.
CPC ............ *H05B 37/0281* (2013.01); *G02B 26/10* (2013.01); *G03G 15/04036* (2013.01); *G03G 15/04072* (2013.01); *G03G 2215/0132* (2013.01)
USPC ............ 347/237; 347/253; 347/118; 347/247

(58) Field of Classification Search
USPC .................................. 347/118, 237, 247, 253
See application file for complete search history.

(56) References Cited

U.S. PATENT DOCUMENTS

| | | | | |
|---|---|---|---|---|
| 5,237,579 | A | 8/1993 | Ema et al. | |
| 6,498,617 | B1 | 12/2002 | Ishida et al. | |
| 7,701,480 | B2 * | 4/2010 | Omori et al. | 347/237 |
| 2003/0025785 | A1 | 2/2003 | Nihei et al. | |
| 2003/0156184 | A1 | 8/2003 | Suzuki et al. | |
| 2004/0095853 | A1 | 5/2004 | Masui et al. | |
| 2005/0243879 | A1 | 11/2005 | Horiuchi et al. | |

(Continued)

FOREIGN PATENT DOCUMENTS

| | | |
|---|---|---|
| JP | 2-215239 | 8/1990 |
| JP | 4-146546 | 5/1992 |

(Continued)

OTHER PUBLICATIONS

U.S. Appl. No. 14/072,946, filed Nov. 6, 2013.

(Continued)

*Primary Examiner* — Sarah Al Hashimi
(74) *Attorney, Agent, or Firm* — Oblon, Spivak, McClelland, Maier & Neustadt, L.L.P.

(57) ABSTRACT

A light source driver includes a controller which outputs an undershoot current in synchronization with lighting complete timing in lighting information, wherein the controller is configured to output the undershoot current such that a voltage in a light source when the output of the undershoot current is complete is equal to a voltage in the light source before being turned on.

20 Claims, 53 Drawing Sheets

(56) References Cited

U.S. PATENT DOCUMENTS

| | | | |
|---|---|---|---|
| 2006/0007841 A1 | 1/2006 | Masui et al. | |
| 2006/0285186 A1 | 12/2006 | Ishida et al. | |
| 2007/0030548 A1 | 2/2007 | Nihei et al. | |
| 2007/0036059 A1 | 2/2007 | Masui et al. | |
| 2007/0091163 A1 | 4/2007 | Omori et al. | |
| 2007/0132828 A1 | 6/2007 | Ishida et al. | |
| 2008/0088893 A1 | 4/2008 | Ishida et al. | |
| 2008/0123160 A1 | 5/2008 | Omori et al. | |
| 2008/0218813 A1 | 9/2008 | Tanabe et al. | |
| 2008/0225106 A1 | 9/2008 | Omori et al. | |
| 2008/0239336 A1 | 10/2008 | Tanabe et al. | |
| 2008/0267663 A1 | 10/2008 | Ichii et al. | |
| 2008/0272708 A1 | 11/2008 | Horiuchi et al. | |
| 2008/0291259 A1 | 11/2008 | Nihei et al. | |
| 2008/0298842 A1 | 12/2008 | Ishida et al. | |
| 2009/0091805 A1 | 4/2009 | Tanabe et al. | |
| 2009/0167837 A1 | 7/2009 | Ishida et al. | |
| 2009/0174915 A1 | 7/2009 | Nihei et al. | |
| 2009/0195635 A1 | 8/2009 | Ishida et al. | |
| 2009/0231656 A1 | 9/2009 | Suzuki et al. | |
| 2009/0303451 A1 | 12/2009 | Miyake et al. | |
| 2010/0045767 A1 | 2/2010 | Nihei et al. | |
| 2010/0119262 A1 | 5/2010 | Omori et al. | |
| 2010/0214637 A1 | 8/2010 | Nihei et al. | |
| 2010/0295461 A1 | 11/2010 | Horiuchi et al. | |
| 2011/0199657 A1 | 8/2011 | Ishida et al. | |
| 2011/0228037 A1 | 9/2011 | Omori et al. | |
| 2011/0228802 A1 | 9/2011 | Furuse et al. | |
| 2012/0081021 A1 | 4/2012 | Horiuchi et al. | |
| 2012/0099165 A1 | 4/2012 | Omori et al. | |
| 2012/0189328 A1 | 7/2012 | Suzuki et al. | |
| 2012/0293783 A1 | 11/2012 | Ishida et al. | |
| 2013/0302052 A1 | 11/2013 | Iwata et al. | |
| 2014/0139605 A1* | 5/2014 | Fujita et al. | 347/118 |

FOREIGN PATENT DOCUMENTS

| | | |
|---|---|---|
| JP | 2004-134740 | 4/2004 |
| JP | 2005-209309 | 8/2005 |
| JP | 2005-340774 | 12/2005 |
| JP | 2009-229762 | 10/2009 |
| JP | 2011-003939 | 1/2011 |
| JP | 2011-198877 | 10/2011 |

OTHER PUBLICATIONS

U.S. Appl. No. 14/082,628, filed Nov. 18, 2013.

* cited by examiner

| SELECT SIGNAL A | SELECTOR OUTPUT |
|---|---|
| 000 | OUTPUT SIGNAL OF f1 |
| 001 | OUTPUT SIGNAL OF f2 |
| 010 | OUTPUT SIGNAL OF f3 |
| 011 | OUTPUT SIGNAL OF f4 |
| 100 | OUTPUT SIGNAL OF f5 |
| 101 | OUTPUT SIGNAL OF f6 |
| 110 | OUTPUT SIGNAL OF f7 |
| 111 | OUTPUT SIGNAL OF f8 |

| SELECT SIGNAL B | SELECTOR OUTPUT |
|---|---|
| 000 | OUTPUT SIGNAL OF f21 |
| 001 | OUTPUT SIGNAL OF f22 |
| 010 | OUTPUT SIGNAL OF f23 |
| 011 | OUTPUT SIGNAL OF f24 |
| 100 | OUTPUT SIGNAL OF f25 |
| 101 | OUTPUT SIGNAL OF f26 |
| 110 | OUTPUT SIGNAL OF f27 |
| 111 | OUTPUT SIGNAL OF f28 |

LIGHT SOURCE DRIVER, LIGHT SOURCE-DRIVING METHOD, IMAGE-FORMING APPARATUS, LIGHT SOURCE-DRIVING CIRCUIT, AND OPTICAL SCANNER

PRIORITY CLAIM

The present application is based on and claims priority from Japanese Patent Application No. 2012-280564, filed on Dec. 25, 2012, and Japanese Patent Application No. 2012-287138, filed on Dec. 28, 2012, the disclosures of which are hereby incorporated by reference in their entirety.

BACKGROUND

1. Field of the Invention

The present invention relates to a light source driver, light source-driving method, and image-forming apparatus. More specifically, the present invention relates to a light source driver and light source-driving method which drive a light source based on lighting information, and an image-forming apparatus including the light source driver.

The present invention also relates to a light source-driving circuit which drives a light source and an optical scanner.

2. Description of the Related Art

An image-forming apparatus such as an optical printer, digital copier, and optical plotter is configured to drive a light source based on a signal pulse-modulated according to image information.

For example, Patent Document 1 (JP 2009-229762A) discloses a method of correcting light volume including a step of converting a pixel value of image data into an output gradation value, a step of detecting falling when the output graduation value of the dot in the downstream side in the main scanning direction is smaller than the output gradation value of the dot in the upstream side by a predetermined value or more, a correction step of adding an undershoot correction amount to the output gradation value of the dot just after detecting the falling, and a step of controlling the volume of the laser beam according to the output gradation value.

Patent Document 2 (JP 4476568B) discloses a light source driver including a generator which generates a superimposed current approximately corresponding to a charge-discharge current to a capacity generating in parallel with a light source in a predetermined time near at least one of the rising and falling of the driving current of the light source, an adder-subtractor which adds or subtracts the superimposed current generated by the generator to the driving current, and a controller which controls a superimposed time for generating a superimposed current according to a capacity, the controller controlling the superimposed time according to a variation in the driving current.

Patent Document 3 (JP 2011-198877A) discloses a semiconductor laser driver for setting a correction current value which determines a property of rising of an output and/or a property of falling of an output according to a value of current for driving a semiconductor laser.

The demand for an improved image quality in an image-forming apparatus increases every year. In the image-forming apparatus using the method and the driver disclosed in Patent Documents 1-3, optical waveforms may vary, and it is difficult to obtain an image quality of a required level.

In an image-forming apparatus for use in conventional product printing or the like, a photoreceptor is exposed by obtaining a predetermined light output from a light source such as an LD, so as to express a concentration of an image.

It is known to generate an emission delay time depending on a response property of a light source before obtaining a predetermined light output from a light source. It is also known to generate an emission delay time depending on a parasitic capacity such as a circuit on which a light source is mounted before detecting a light output after supplying a driving current to a light source, for example.

For this reason, a response property of a light output is deteriorated due to the emission delay time in the conventional image-forming apparatus. When, for example, the light output time is set to a short time of several nsec or below, the light output becomes smaller than a predetermined light volume, so that an uneven image may be generated due to a decrease in a concentration of an image.

Various measures are conventionally adopted for improving a response property of a light output. For example, Patent Document 4 (JP H04-146546A) discloses, as a conventional technique regarding light source-driving control using an LD, applying an overshoot current in light volume increase timing and an undershoot current in light volume decrease timing when changing a light volume of a lead level and a light level.

Patent Document 5 (JP H02-215239A) discloses to speed up discharge and charge of electric charge accumulated in a parasitic capacity of an emission element by an overshoot current or an undershoot current for an optical response.

The undershoot current in the conventional technique is a current for improving rounding of falling of the optical output waveform, but its value is a predetermined fixed value. When the light volume emitted from the emission element, for example, is changed, the undershoot current does not become an appropriate value, so that a response property of a light output may not be significantly improved.

SUMMARY

To solve the above circumstances, one embodiment of the present invention provides a light source driver including a controller which outputs an undershoot current in synchronization with lighting complete timing in lighting information, wherein the controller is configured to output the undershoot current such that a voltage in a light source when the output of the undershoot current is complete is equal to a voltage in the light source before being turned on.

One embodiment of the present invention also provides a method of driving a light source, including: a step of outputting an operation current from a lighting start timing to lighting complete timing in lighting information; and a step of outputting an undershoot current in synchronization with the lighting complete timing such that a voltage in the light source when the output of the undershoot current is complete equals to a voltage in the light source before being turned on.

One embodiment of the present invention also provides a light source-driving circuit which drives a light source, including: a driving current generator which generates a predetermined current for obtaining a predetermined light volume from the light source, and a driving current including a first undershoot current and a second undershoot current to be subtracted from the predetermined current; and a controller which sets the first undershoot current to a fixed value, and sets the second undershoot current to a value adjusted according to the light volume of the light source.

One embodiment of the present invention also provides an optical scanner, including: a light source; a reflection mirror which reflects light irradiated from the light source; and a light source-driving circuit which drives the light source, wherein the light source-driving circuit includes a driving current generator which generates a predetermined current for obtaining a predetermined light volume from the light source and a driving current including a first undershoot current and a second undershoot current subtracted from the predetermined current, and a controller which sets the first undershoot current to a fixed value, and sets the second undershoot current to a value adjusted according to the light volume of the light source.

One embodiment of the present invention also provides an image-forming apparatus, including: a light source; a reflection mirror which reflects light irradiated from the light source; a photoreceptor which is scanned by light reflected by the reflection mirror; and a light source-driving circuit which drives the light source, wherein the light source-driving circuit includes a driving current generator which generates a predetermined current for obtaining a predetermined light volume from the light source and a driving current including a first undershoot current and a second undershoot current subtracted from the predetermined current, and a controller which sets the first undershoot current to a fixed value, and sets the second undershoot current to a value adjusted according to the light volume of the light source.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Figure 1:
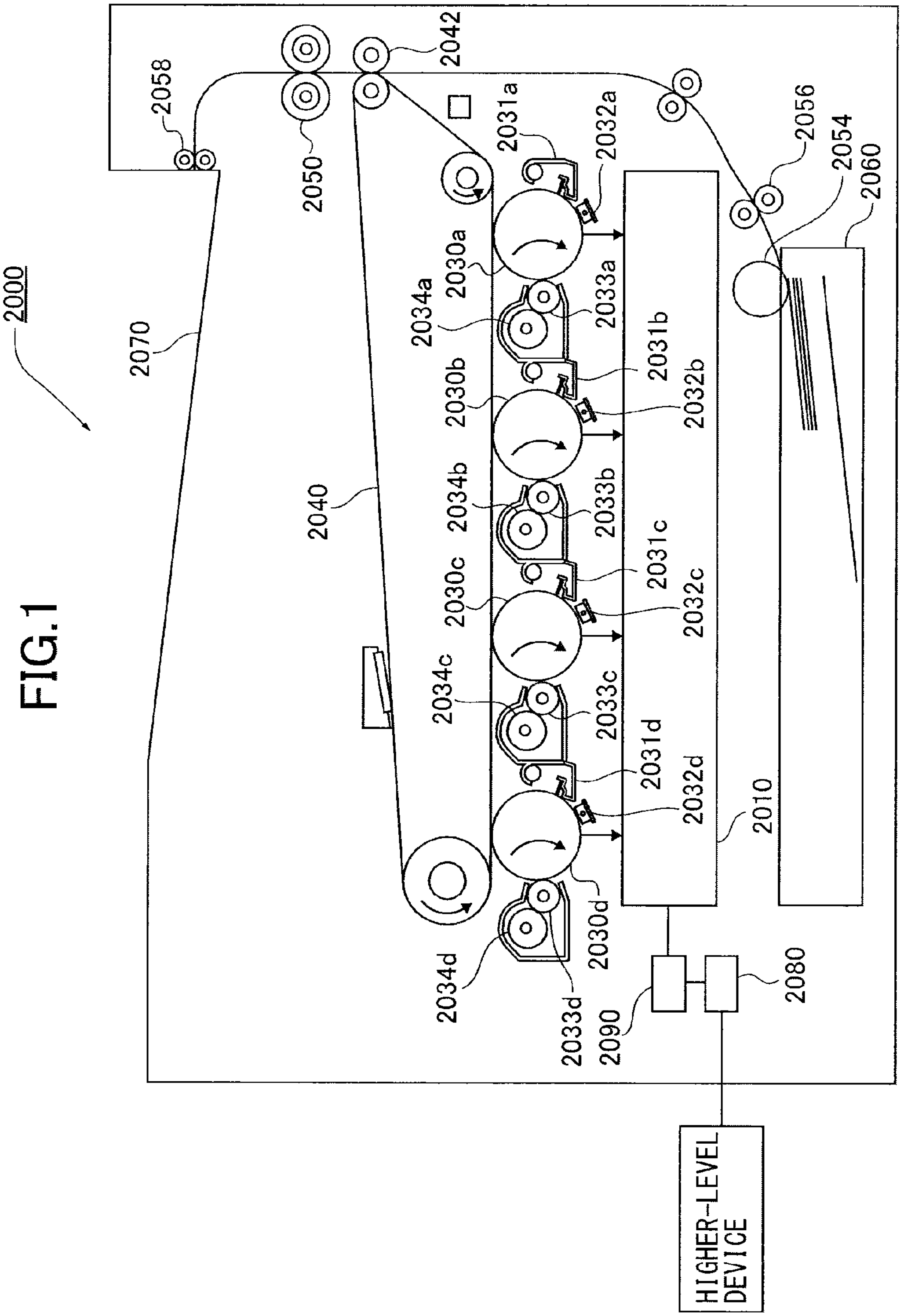
FIG. 1 is a view describing a schematic configuration of a color printer according to a first embodiment of the present invention.
Figure 2:
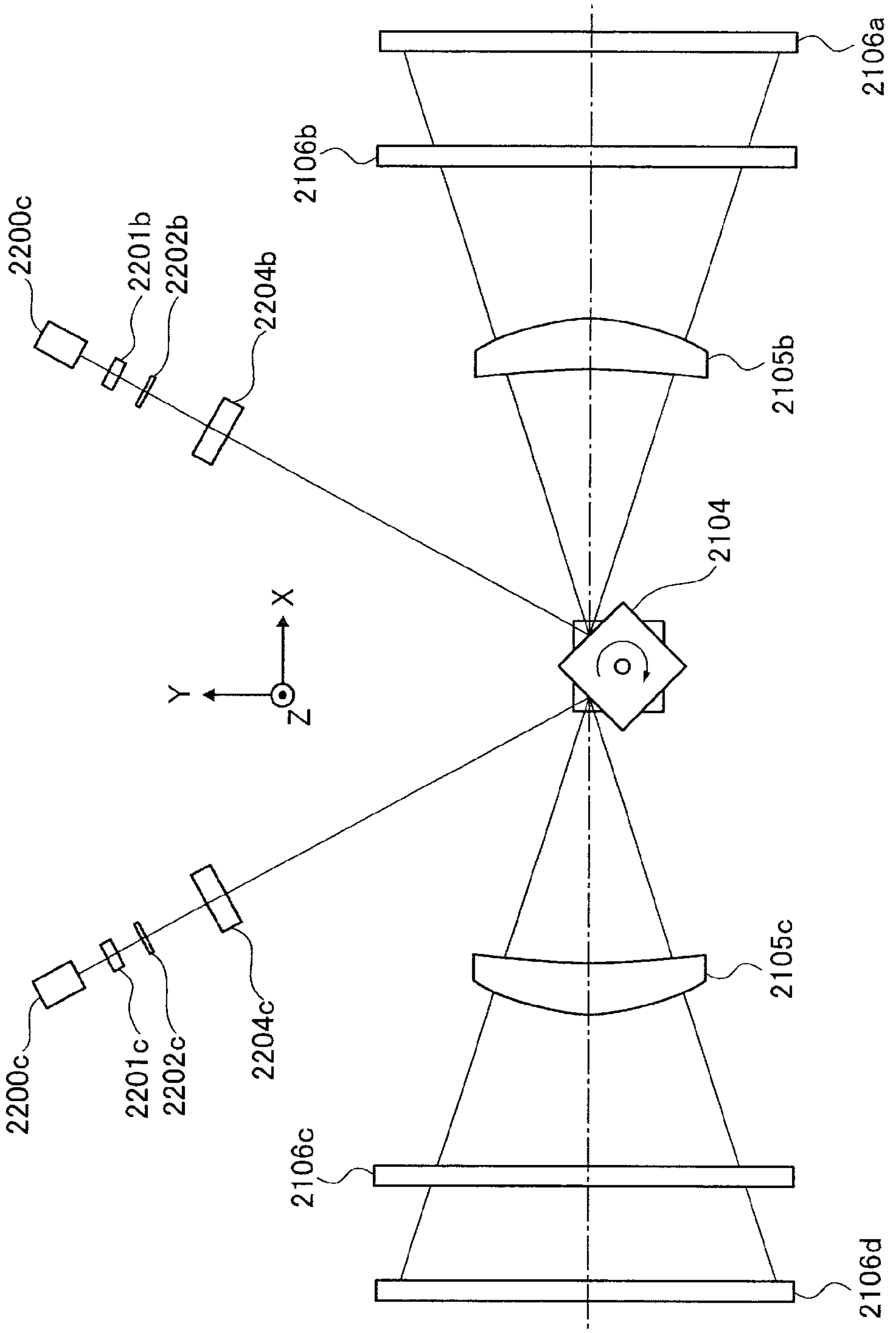
FIG. 2 is a view (part 1) describing an optical scanner in FIG. 1.
Figure 3:
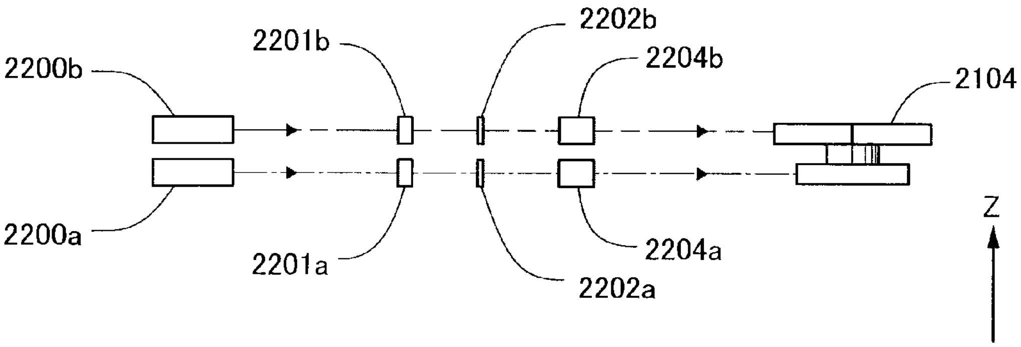
FIG. 3 is a view (part 2) describing an optical scanner in FIG. 1.
Figure 4:
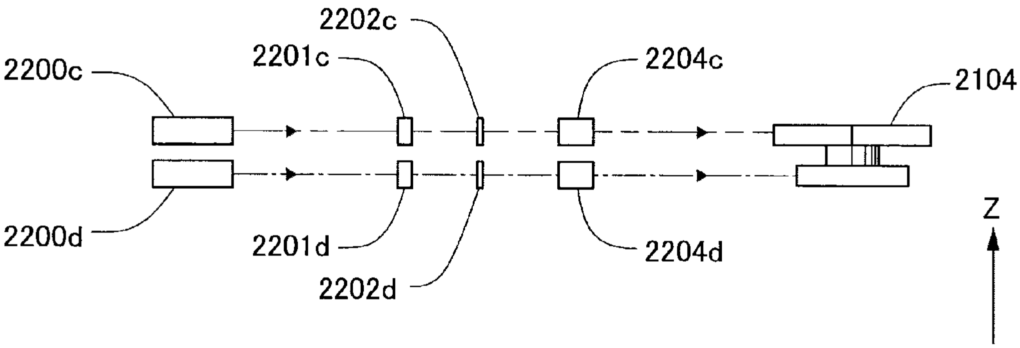
FIG. 4 is a view (part 3) describing an optical scanner in FIG. 1.
Figure 5:
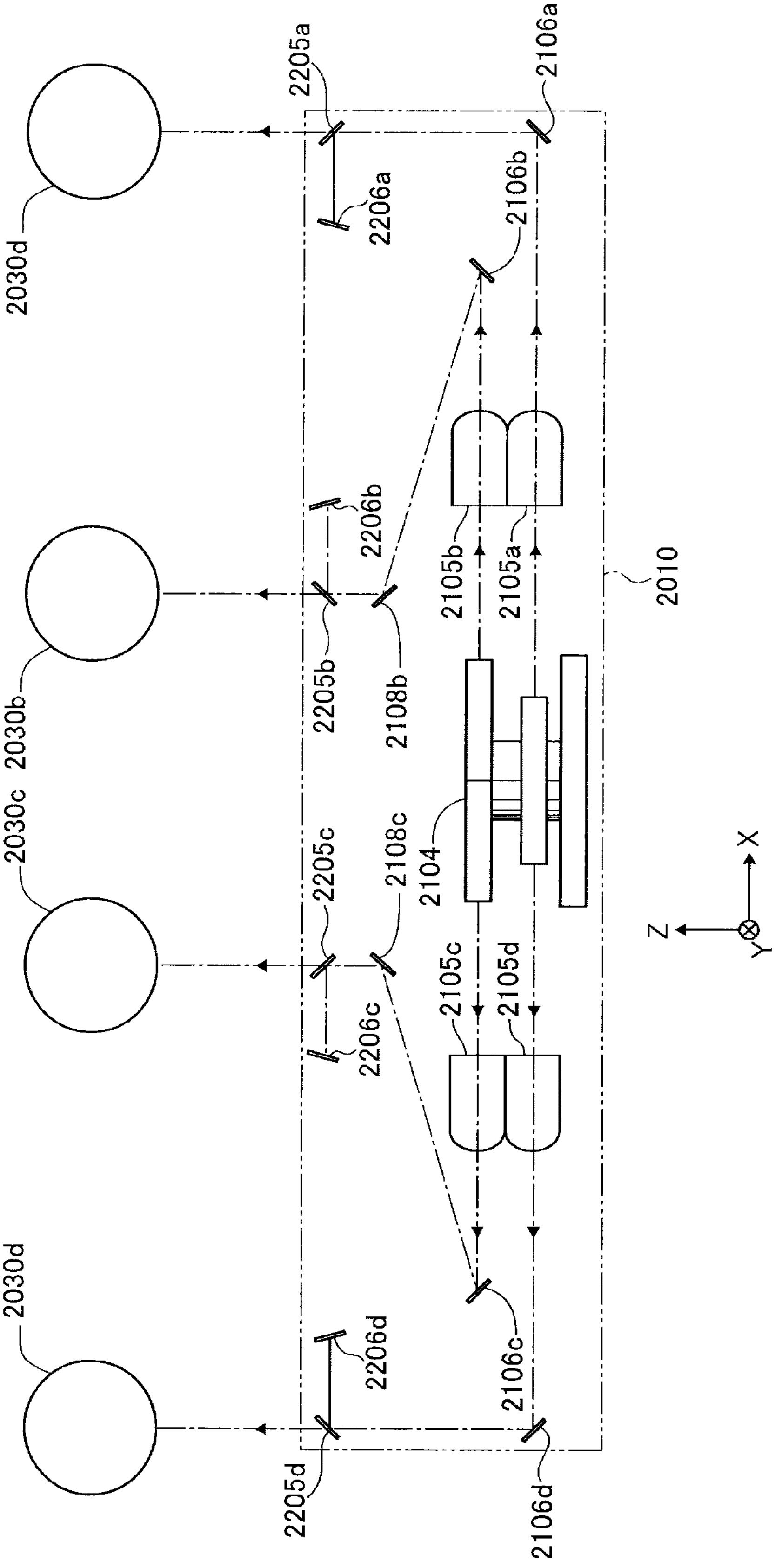
FIG. 5 is a view (part 4) describing an optical scanner in FIG. 1.

Hereinafter, a first embodiment of the present invention will be described with reference to FIGS. 1-29. FIG. 1 illustrates a schematic configuration of a color printer 2000 according to the first embodiment of the present invention.

This color printer 2000 is a tandem system multi-color printer which forms a full-color image by superimposing four colors (black, cyan, magenta, and yellow). The color printer 2000 includes an optical scanner 2010, four photoreceptor drums (2030*a*, 2030*b*, 2030*c*, 2030*d*), four cleaning units (2031*a*, 2031*b*, 2031*c*, 2031*d*), four chargers (2032*a*, 2032*b*, 2032*c*, 2032*d*), four development rollers (2033*a*, 2033*b*, 2033*c*, 2033*d*), a transfer belt 2040, transfer roller 2042, fuser 2050, paper feed roller 2054, paper discharge roller 2058, paper feed tray 2060, paper discharge tray 2070, communication controller 2080, and printer controller 2090 which controls each of the above sections overall.

The communication controller 2080 controls the two-way communication with a high-level device (for example, computer) through a network or the like.

The printer controller 2090 includes a CPU, ROM in which CPU-readable programs and various data for use in executing the programs are stored, RAM as a memory for an operation, amplifying circuit, and A/D conversion circuit which converts analog data into digital data. The printer controller 2090 informs multi-color image information from a higher-level device received through the communication controller 2080 to the optical scanner 2010.

The photoreceptor drum 2030*a*, charger 2032*a*, development roller 2033*a*, and cleaning unit 2031*a* constitute an image-forming station (hereinafter referred to as K station) which forms a black image.

The photoreceptor drum 2030*b*, charger 2032*b*, development roller 2033*b*, and cleaning unit 2031*b* constitute an image-forming station (hereinafter referred to as C station) which forms a cyan image.

The photoreceptor drum 2030*c*, charger 2032*c*, development roller 2033*c*, and cleaning unit 2031*c* constitute an image-forming station (hereinafter referred to as M station) which forms a magenta image.

The photoreceptor drum 2030*d*, charger 2032*d*, development roller 2033*c*, and cleaning unit 2031*d* constitute an image-forming station (hereinafter referred to as Y station) which forms a yellow image.

Each of the photoreceptor drums includes on a surface thereof a photosensitive layer. Namely, the surface of each photoreceptor drum is a surface to be scanned. Each photoreceptor drum rotates in the arrow direction in FIG. 1 by a not-shown rotation mechanism.

Each charger uniformly charges the surface of the corresponding photoreceptor drum.

The optical scanner 2010 scans the surface of the corresponding charged photoreceptor drum with a light flux modulated for each color based on multi-color image information (black image information, cyan image information, magenta image information, and yellow image information) from the printer controller 2090. A latent image corresponding to image information is thereby formed on the surface of each photoreceptor drum. The formed latent image moves in the direction of the corresponding developer along the rotation of the photoreceptor drum. In addition, the configuration of the optical scanner will be described later.

Toner from a not-shown corresponding cartridge is uniformly applied on the surface of each development roller along the rotation. After the toner on the surface of each development roller has contact with the surface of the corresponding photoreceptor drum, the toner moves on a light-irradiating portion on the surface, and adheres thereonto. Namely, each of the development rollers visualizes the latent image formed on the surface of the corresponding photoreceptor drum by adhering toner on the latent image. The image (toner image) onto which the toner adheres is moved in the direction of the transfer belt 2040 along the rotation of the photoreceptor drum.

Each toner image of yellow, magenta, cyan, and black is sequentially transferred onto the transfer belt 2040 at a predetermined timing, and is superimposed, so as to form a color image.

Recording paper is stored in the paper feed tray 2060. The paper feed roller 2054 is disposed near the paper feed tray 2060. The paper feed roller 2054 feeds a recording sheet one-by-one from the paper feed tray 2060. The recording sheet is fed toward an interval between the transfer belt 2040 and the transfer roller 2042 at a predetermined timing. A color image on the transfer belt 2040 is thereby transferred on a recording sheet. The recording sheet on which a color image is transferred is fed to the fuser 2050.

Heat and pressure are applied to the recording sheet in the fuser 2050. The toner is thereby fused on the recording sheet. The recording sheet on which the toner is fused is fed to the paper discharge tray 2070 through the paper discharge roller 2058, and is sequentially stacked on the paper discharge tray 2070.

Each cleaning unit eliminates the toner (residual toner) left on the surface of the corresponding photoreceptor drum. The surface of the photoreceptor drum from which the residual toner is eliminated again returns back to a position facing the corresponding charger.

Next, the configuration of the optical scanner 2010 will be described.

As illustrated in FIGS. 2-5 as one example, the optical scanner 2010 includes four light sources (2200*a*, 2200*b*, 2200*c*, 2200*d*), four coupling lenses (2201*a*, 2201*b*, 2201*c*, 2201*d*), four opening plates (2202*a*, 2202*b*, 2202*c*, 2202*d*), four cylindrical lenses (2204*a*, 2204*b*, 2204*c*, 2204*d*), a light deflector 2104, four scanning lenses (2105*a*, 2105*b*, 2105*c*, 2105*d*), six folding mirrors (2106*a*, 2106*b*, 2106*c*, 2106*d*, 2108*b*, 2108*c*), four synchronization detection mirrors (2205*a*, 2205*b*, 2205*c*, 2205*d*), four synchronization detection sensors (2206*a*, 2206*b*, 2206*c*, 2206*d*), and a not-shown scanning controller.

In addition, in the XYZ three-dimensional orthogonal coordinate system, a direction along the longitudinal direction (rotation axis direction) of each photoreceptor drum is described as a Y-axis direction and a direction parallel to the rotation axis of the light deflector 2104 is described as a Z-axis direction.

Hereinafter, in each optical member, a direction corresponding to the main-scanning direction is described as a main-scanning corresponding direction and a direction corresponding to the sub-scanning direction is described as a sub-scanning corresponding direction.

The scanning controller controls the four light sources (2200*a*, 2200*b*, 2200*c*, 2200*d*) and a light deflector 2104.

The light source 2200*a*, coupling lens 2201*a*, opening plate 2202*a*, cylindrical lens 2204*a*, scanning lens 2105*a*, folding mirror 2106*a*, synchronization detection mirror 2205*a*, and synchronization detection sensor 2206*a* are optical members for forming a latent image on the photoreceptor drum 2030*a*.

The light source 2200*b*, coupling lens 2201*b*, opening plate 2202*b*, cylindrical lens 2204*b*, scanning lens 2105*b*, folding mirror 2106*b*, folding mirror 2108*b*, synchronization detection mirror 2205*b*, and synchronization detection sensor 2206*b* are optical members for forming a latent image on the photoreceptor drum 2030*b*.

The light source 2200*c*, coupling lens 2201*c*, opening plate 2202*c*, cylindrical lens 2204*c*, scanning lens 2105*c*, folding mirror 2106*c*, folding mirror 2108*c*, synchronization detection mirror 2205*c*, and synchronization detection sensor 2206*c* are optical members for forming a latent image on the photoreceptor drum 2030*c*.

The light source 2200*d*, coupling lens 2201*d*, opening plate 2202*d*, cylindrical lens 2204*d*, scanning lens 2105*d*, folding mirror 2106*d*, synchronization detection mirror 2205*d*, and synchronization detection sensor 2206*d* are optical members for forming a latent image on the photoreceptor drum 2030*d*.

Figure 6:
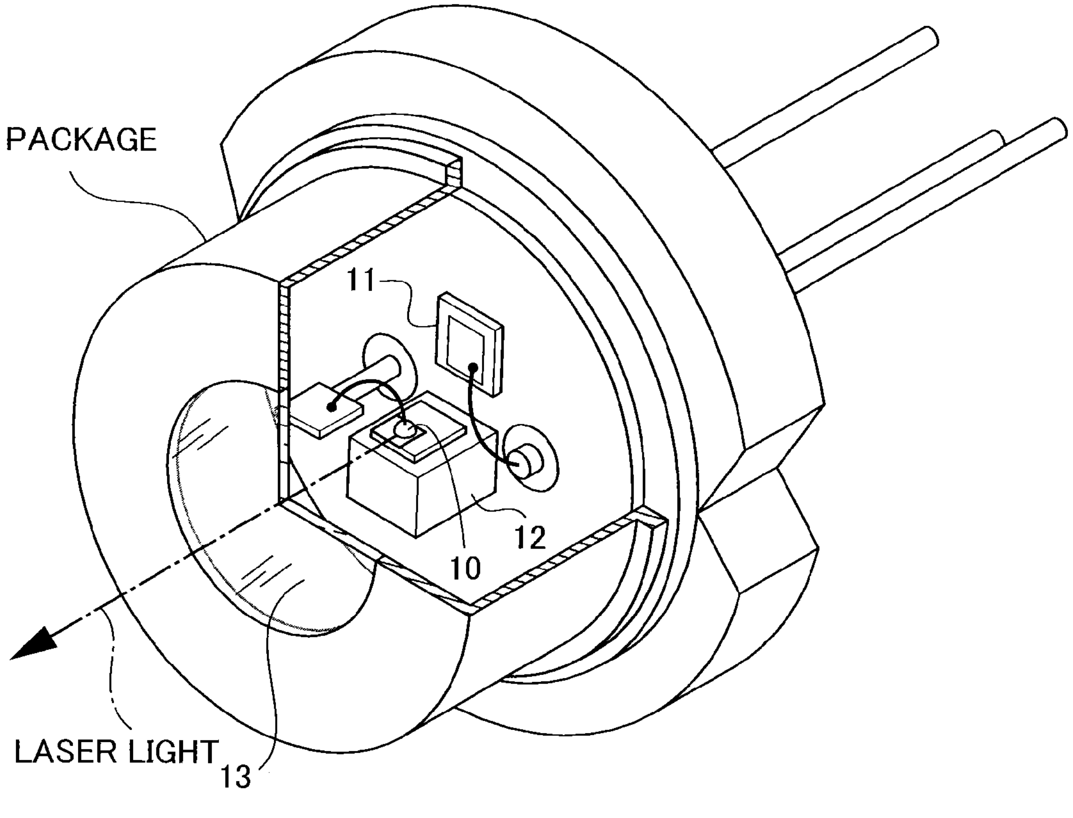
FIG. 6 is a view describing a semiconductor laser and a light-receiving element for monitoring.

Each light source includes a semiconductor laser (semiconductor laser 10) as a light-emitting element. As illustrated in FIG. 6 as one example, the semiconductor laser 10 is sealed in a package (for example, CAN package) together with a light-receiving element (for example, photodiode) 11 for monitoring and a heat sink 12 for radiation. The light from the semiconductor laser 10 is emitted through a glass window 13 of the package.

The semiconductor laser 10 drives by the scanning controller. The light-receiving element 11 for monitoring is provided to monitor the volume of the light emitted from the semiconductor laser 10, and outputs a signal according to the light volume to the scanning controller. In this case, in the light-receiving element 11 for monitoring, a current signal which is a photoelectric conversion signal is converted to a voltage signal by using a resistance, for example, so as be output.

Each coupling lens is disposed on the optical path of the light flux emitted from the corresponding light source, and changes the light flux into an approximate parallel light flux.

Each opening plate includes an opening, and forms the light flux through the corresponding coupling lens.

Each cylindrical lens gathers the light flux passing through the opening of the corresponding opening plate relative to the Z-axis direction near the deflection reflection surface of the light deflector 2104, so that an image is formed.

The optical system disposed on the optical path between each light source and the light deflector 2104 is referred to as an optical system before a deflector.

The light deflector 2104 includes a two-stage polygon mirror. Each polygon mirror includes four deflection reflection surfaces. The light flux from the cylindrical lens 2204*a* and the light flux from the cylindrical lens 2204*d* are deflected by the first stage (lower stage) polygon mirror. The light flux from the cylindrical lens 2204*b* and the light flux from the cylindrical lens 2204*c* are deflected by the second stage (upper stage) polygon mirror. In addition, the first stage polygon mirror and the second stage polygon mirror rotate at phases different at approximately 45° to each other, and the first stage and the second stage alternately perform the scanning.

The light flux from the cylindrical lens 2204*a* deflected by the light deflector 2104 irradiates the photoreceptor drum 2030*a* through the scanning lens 2105*a* and the folding mirror 2106*a*.

The light flux from the cylindrical lens 2204*a* deflected by the light deflector 2104 irradiates the photoreceptor drum 2030*b* through the scanning lens 2105*b* and two folding mirrors (2106*b*, 2108*b*).

The light flux from the cylindrical lens 2204*c* deflected by the light deflector 2104 irradiates the photoreceptor drum 2030*c* through the scanning lens 2105*c* and two folding mirrors (2106*c*, 2108*c*).

The light flux from the cylindrical lens 2204*d* deflected by the light deflector 2104 irradiates the photoreceptor drum 2030*d* through the scanning lens 2105*d* and folding mirror 2106*d*.

The light spot on each photoreceptor drum moves in the longitudinal direction of the photoreceptor drum along the rotation of the light deflector 2104. The moving direction of the light spot is the main-scanning direction and the rotation direction of the photoreceptor drum is the sub-scanning direction.

The optical system disposed on the optical path between the light deflector 2104 and each photoreceptor drum is referred to as the scanning optical system.

Each synchronization sensor receives a part of light, which is deflected by the light deflector 2014 toward the corresponding photoreceptor drum and is not used for writing, through the corresponding synchronization detection mirror. Each synchronization detection sensor outputs a signal according to the received light volume. Each synchronization detection sensor is set to receive the light which has completed the scanning of one line in the main-scanning direction of the corresponding photoreceptor drum. Namely, the completion timing of the scanning is informed to the scanning controller for each line in the main-scanning direction. In addition, when it is not necessary to distinguish the four synchronization detection sensors, these are referred to as the synchronization detection sensor 2206.

Figure 7:
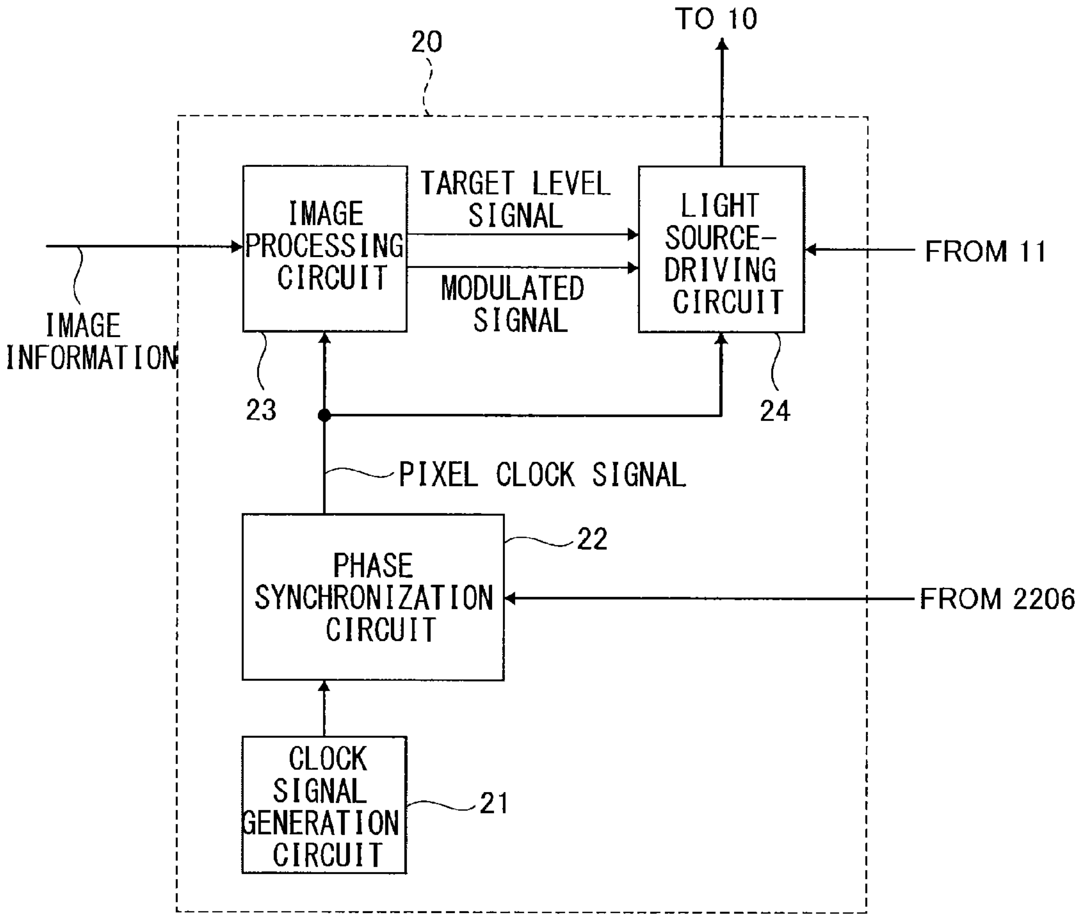
FIG. 7 is a view describing a light source controller.

The scanning controller includes a light source controller (light source controller 20) with respect to each light source. As illustrated in FIG. 7 as one example, each light source controller 20 includes a clock signal generation circuit 21, phase synchronization circuit 22, image-processing circuit 23, and light source-driving circuit 24. In addition, the arrow in FIG. 7 illustrates the flows of typical signals and information, but does not illustrate all of the connection relationships of respective blocks. Moreover, it does not always mean that one arrow is one signal line.

The clock signal generation circuit 21 generates a plurality of high frequency clock signals.

The phase synchronization circuit 22 generates a pixel clock signal based on a plurality of high frequency clock signals from the clock signal generation circuit 21 and the output signal of the corresponding synchronization detection sensor 2206. The pixel clock signal is output to the image-processing circuit 23 and the light source-driving circuit 24.

The image-processing circuit 23 generates a modulated signal as lighting information based on image information of the corresponding colors and the pixel clock signals from the phase synchronization circuit 22. The image-processing circuit 23 generates a target level signal.

The light source-driving circuit 24 drives the corresponding semiconductor laser 10 based on the modulated signal and the target level signal from the image-processing circuit 23, the pixel clock signal from the phase synchronization circuit 22, and the output signal of the corresponding light-receiving element 11 for monitoring.

Figure 8:
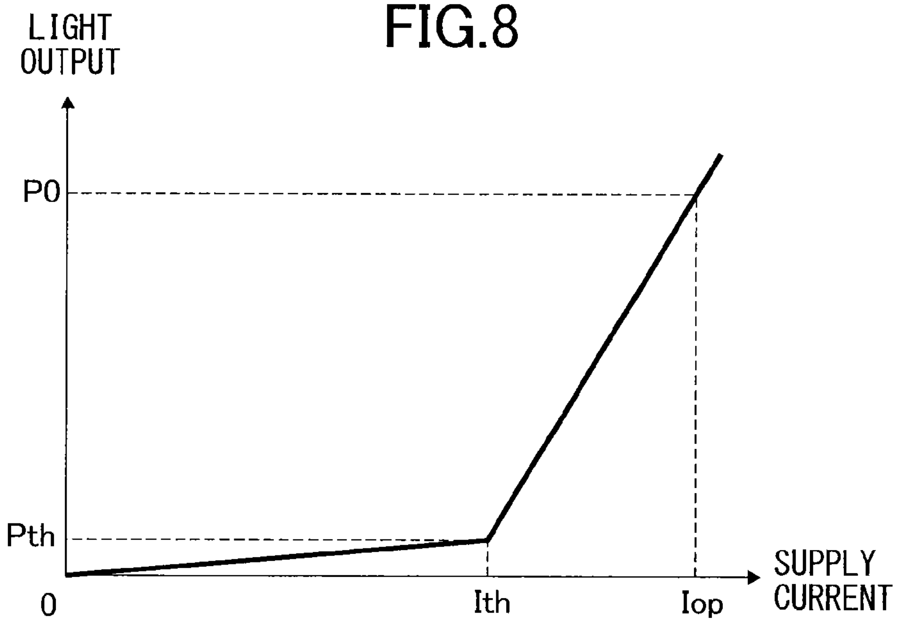
FIG. 8 is a view describing an IL property of a semiconductor laser.
Figure 9:
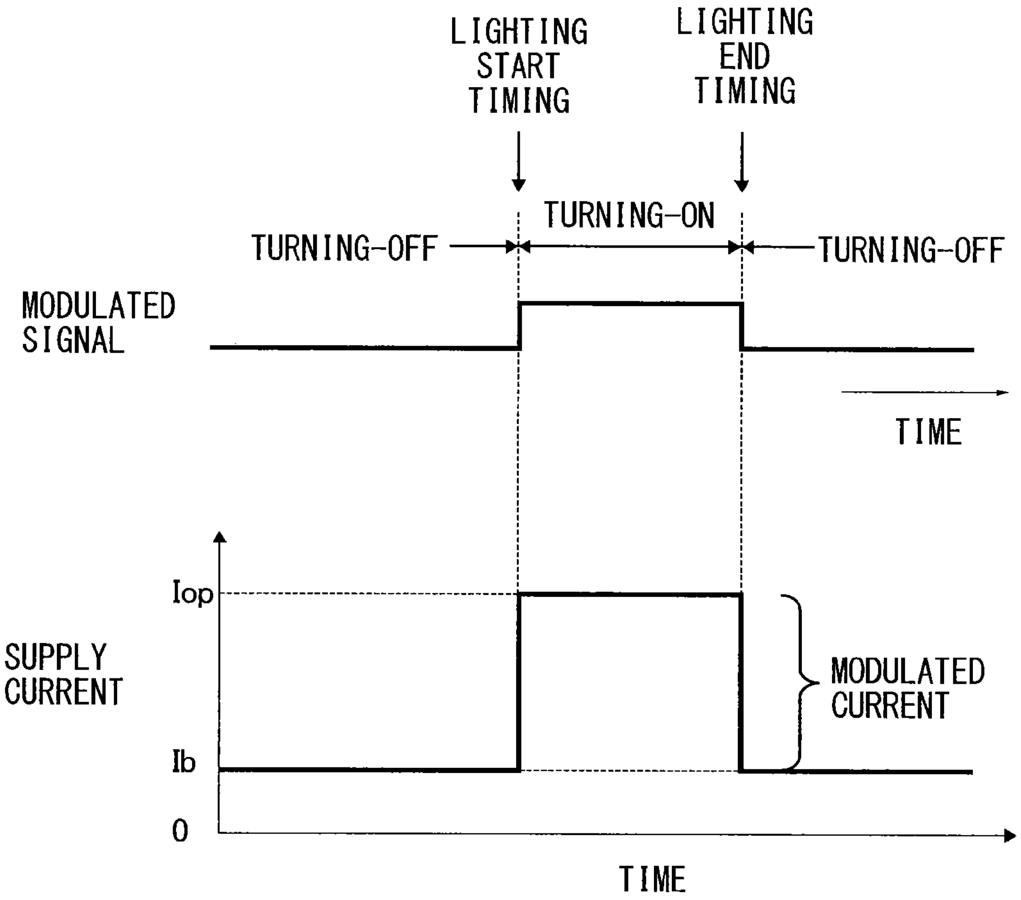
FIG. 9 is a view describing a bias current and a modulated current.

FIG. 8 illustrates an IL property of the semiconductor laser 10. The light output is very small until reaching the threshold Ith of the current to be supplied to the semiconductor laser 10 (supply current), and increases in proportion to the current value after the supply current exceeds the threshold Ith. In addition, reference number Iop in FIG. 8 is a supply current for obtaining a predetermined light output P0 in the turning-on, and is referred to as an operation current. The supply current in which the current value is the threshold Ith is also referred to as a threshold current Ith.

A semiconductor laser-driving method includes an unbias method and a bias method. The unbias method is a method of setting supply current to 0 in turning-off, and supplying the operation current Iop in turning-on. The bias method is a method of adding differences between the operation current Iop and a bias current Ib in turning-on while constantly supplying a very small current of about 1 mA as the bias current Ib (refer to FIG. 9). The current added in turning-on is referred to as a modulated current or a driving current.

Figure 10:
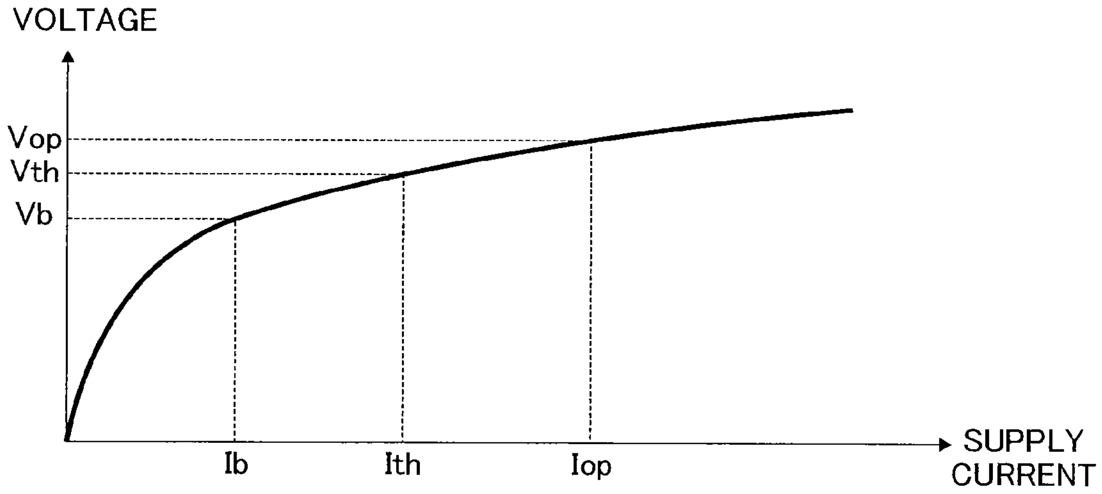
FIG. 10 is a view describing a relationship between a supply current and an applied voltage in a semiconductor laser.

FIG. 10 illustrates a relationship between a supply current and a voltage generated in the semiconductor laser by the supply current. The voltage Vb is a voltage generated in the semiconductor laser while the bias current Ib is supplied, the voltage Vth is a voltage generated in the semiconductor laser while the threshold current Ith is supplied, and the voltage Vop is a voltage generated in the semiconductor laser while the operation current Iop is supplied. In addition, the voltage generated in the semiconductor laser by the supply current is also referred to as an applied voltage.

The processing speed of the electrophotographic image-forming device is rapidly increased. When driving the semiconductor laser having the large threshold Ith with the unbias method, emission delay occurs because it requires a certain time until a lasing concentration carrier is generated even if the operation current Top is supplied to the semiconductor laser. In particular, red laser of 650 nm in emission wavelength or ultraviolet laser of 400 nm in emission wavelength has a time until a lasing concentration carrier is generated longer than that of laser of 1.3 μm, 1.5 μm, and 780 nm in emission wavelength.

Figure 11:
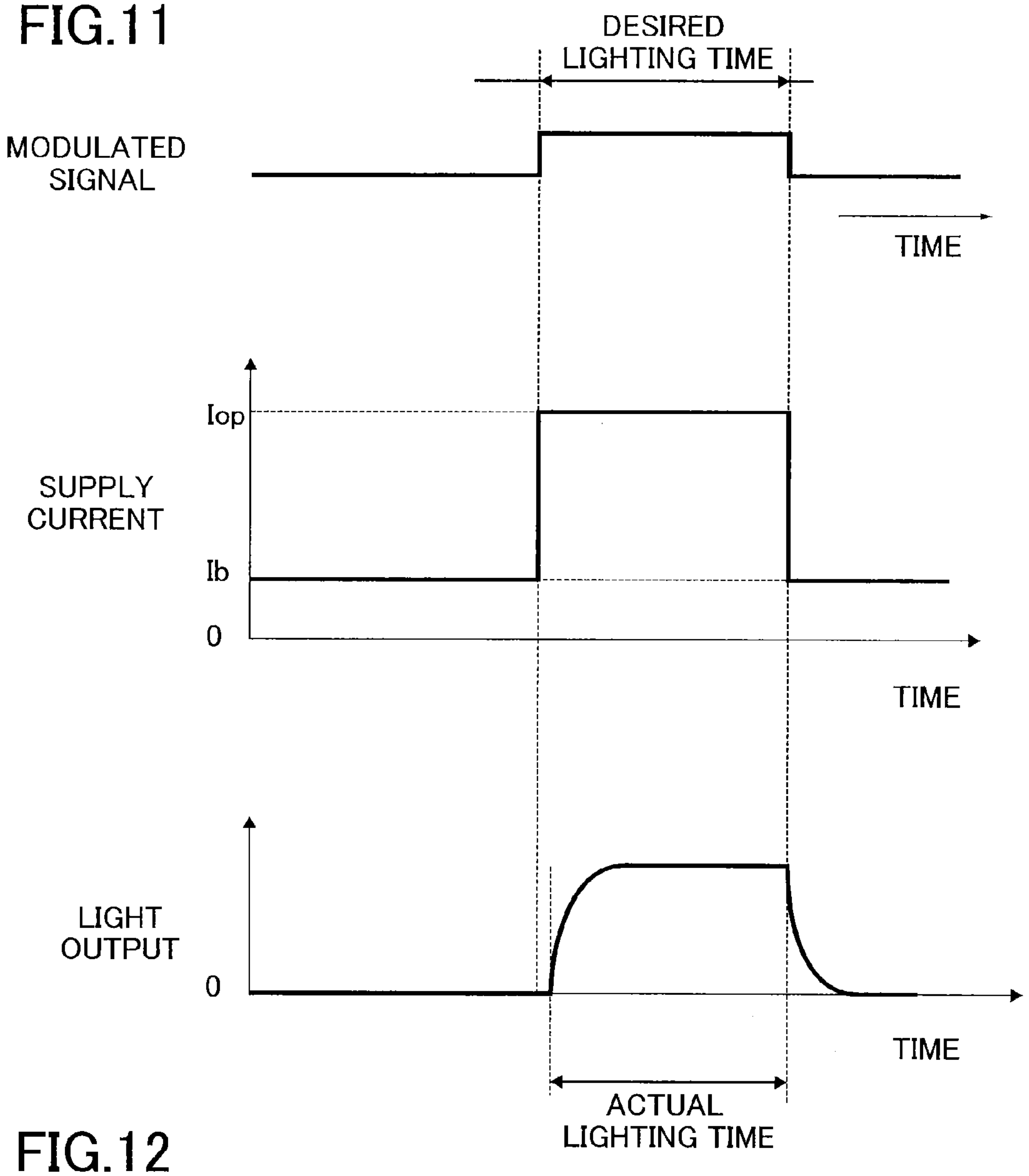
FIG. 11 is a view describing a relationship among a modulated signal, a supply current, and an optical waveform.

In this case, there may be a possibility that the actual lighting time becomes shorter than a desired lighting time even if the operation current is supplied to the semiconductor laser corresponding to a desired lighting time (refer to FIG. 11). The present embodiment therefore uses the bias method in order to improve a response property. In the following description, the relationship between a light output and a time is also referred to as an optical waveform. The rising shape and the falling shape in the optical waveform to the supply current are also referred to as a response property.

Figure 12:
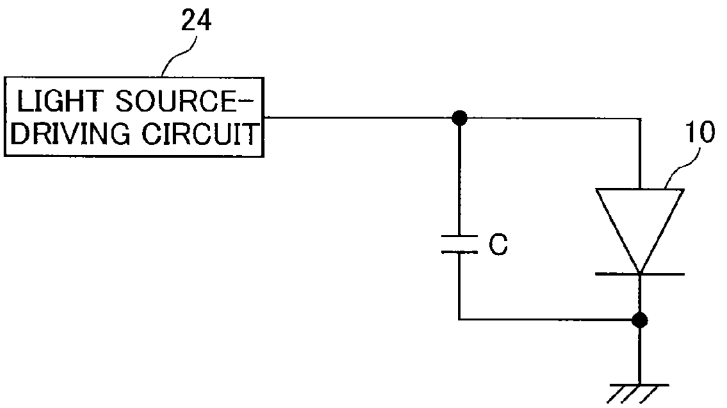
FIG. 12 is a view describing a parasitic capacity.

When the light source-driving circuit 24 and the semiconductor laser 10 are mounted on a circuit board, and these are electrically connected by wiring members, the light source-driving circuit 24 and the semiconductor laser 10 include therebetween parasitic capacities such as an output capacity of the light source-driving circuit 24, a wiring capacity of the circuit board, or an input capacity of a package for holding the semiconductor laser 10. An equivalent circuit in which the total of these is C is illustrated in FIG. 12.

The current from the light source-driving circuit 24 is supplied to the semiconductor laser 10 after the charging of the parasitic capacity C, so that the emission delay is further increased. When the light source includes a plurality light emitters, the response properties may differ among the light emitters. The parasitic capacity C affects the falling property in the turning-off and the rising property in the next turning-on in the optical waveform.

Figure 13:
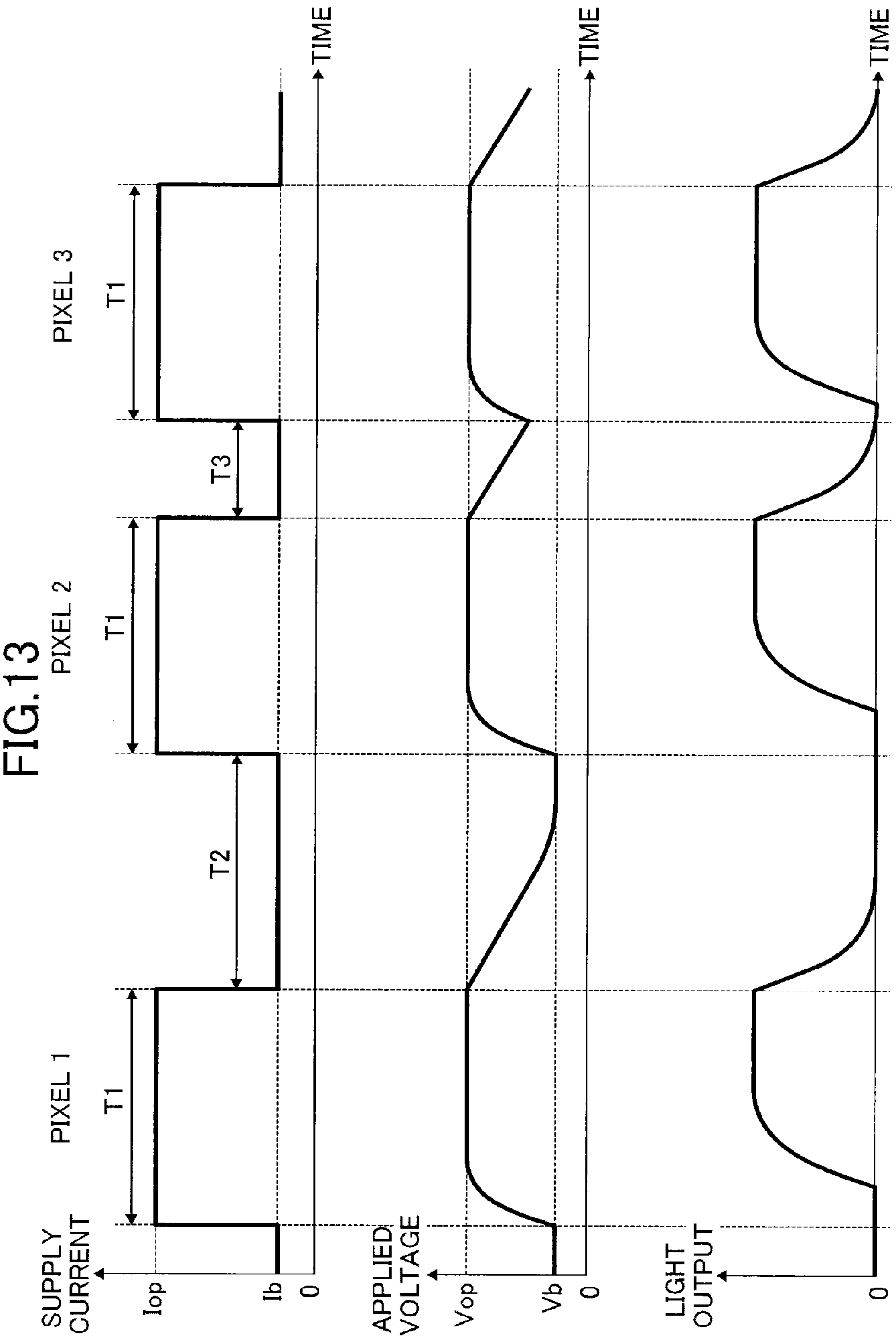
FIG. 13 is a view (part 1) describing a conventional inconvenience.

FIG. 13 illustrates one example of the supply current, applied voltage, and optical waveform when three equal-sized pixels (pixel 1, pixel 2, pixel 3) are formed. In this case, the turning-off time between the pixel 1 and the pixel 2 is T2 and the turning-off time between the pixel 2 and the pixel 3 is T3 (<T2). The time T1 in FIG. 13 is the supply time of the modulated current, and is hereinafter referred to as a pulse width of a supply current.

When the turning-off time before turning-on is long as with the pixel 2, the parasitic capacity C is sufficiently discharged during the turning-off time, and the applied voltage returns back to Vb before turning-on, so that the response property and the emission delay in the pixel 2 become substantially equal to the response property and the emission delay in the pixel 1. On the other hand, if the turning-off time before turning-on is short as with the pixel 3, the parasitic capacity C is not sufficiently discharged during the turning-off time, and the modulated current is supplied before the applied voltage returns back to Vb, so that the applied voltage becomes larger than Vb in the lighting start timing in the pixel 3, and the response property and the emission delay in the pixel 3 differ from the response property and the emission delay in the pixel 1.

As described above, if the response property and the emission delay differ according to the length of the previous turning-off time although the pulse widths of the supply currents are the same, the quality of the image to be formed is lowered.

Figure 14:
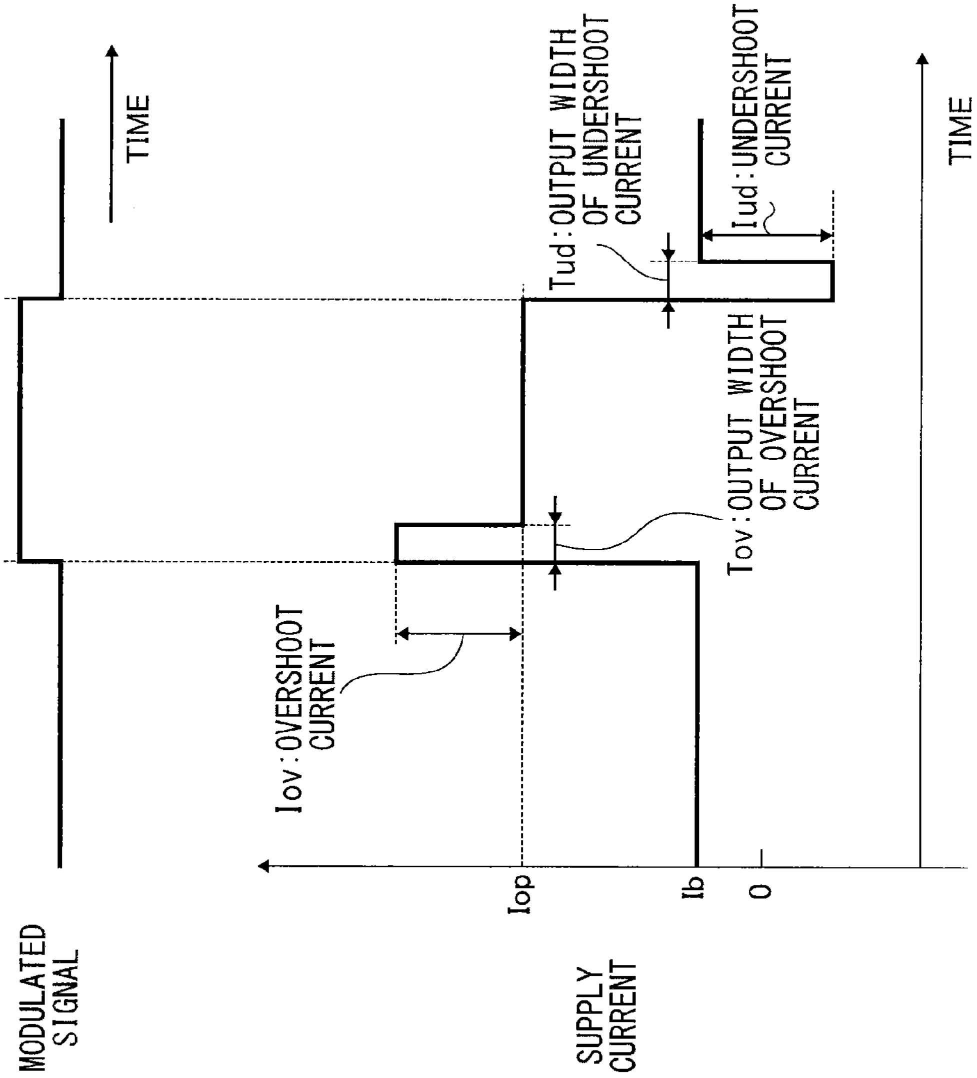
FIG. 14 is a view describing an undershoot current and an overshoot current.

In the present embodiment, an overshoot current and an undershoot current are added (refer to FIG. 14). Hereinafter, Iov denotes the magnitude of the overshoot current, Tov denotes the output width (output time) of the overshoot current, Iud denotes the magnitude of the undershoot current, and Tud denotes the output width (output time) of the undershoot current.

Figure 15:
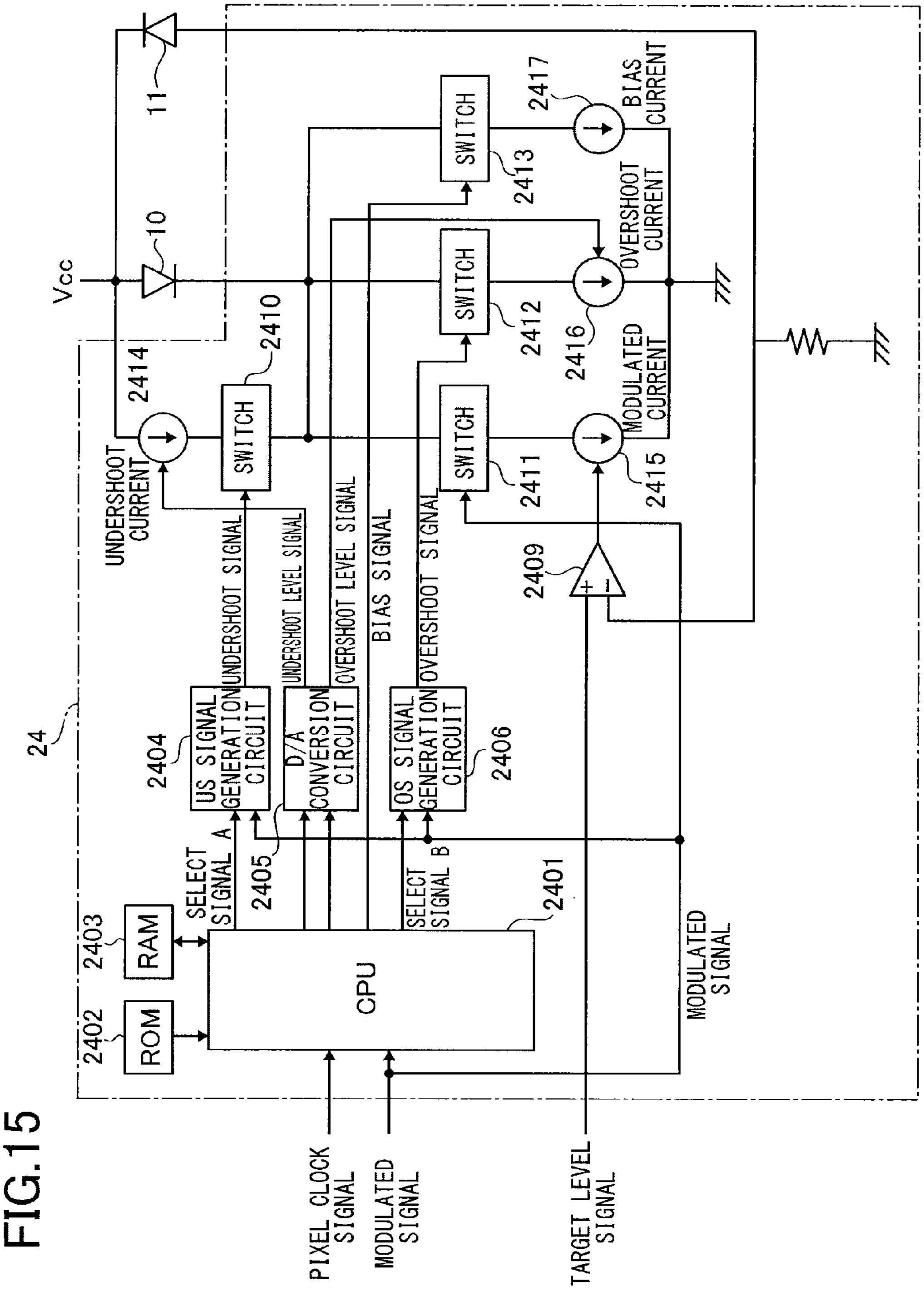
FIG. 15 is a view describing a light source-driving circuit in FIG. 7.

The light source-driving circuit 24 includes, as illustrated in FIG. 15 as one example, a CPU 2401, ROM 2402, RAM 2403, US signal generation circuit 2404, D/A conversion circuit 2405, OS signal generation circuit 2406, comparator 2409, four switches (2410, 2411, 2412, 2413), and four current sources (2414, 2415, 2416, 2417).

The ROM 2402 stores programs described with codes which can be read by the CPU 2401, data for use in the execution of the programs, or setting values.

The RAM 2403 is a memory for operation.

The CPU 2401 controls the entire operation of the light source-driving circuit 24 in accordance with the program stored in the ROM 2402.

The current source 2414 is a current source of the undershoot current, and the current source 2415 is a current source of the modulated current. The current source 2416 is a current source of the overshoot current, and the current source 2417 is a current source of the bias current.

The US signal generation circuit 2404 generates the undershoot signal based on the modulated signal and the select signal A from the CPU 2401. The output width Tud of the undershoot current is determined by the undershoot signal.

Figure 16:
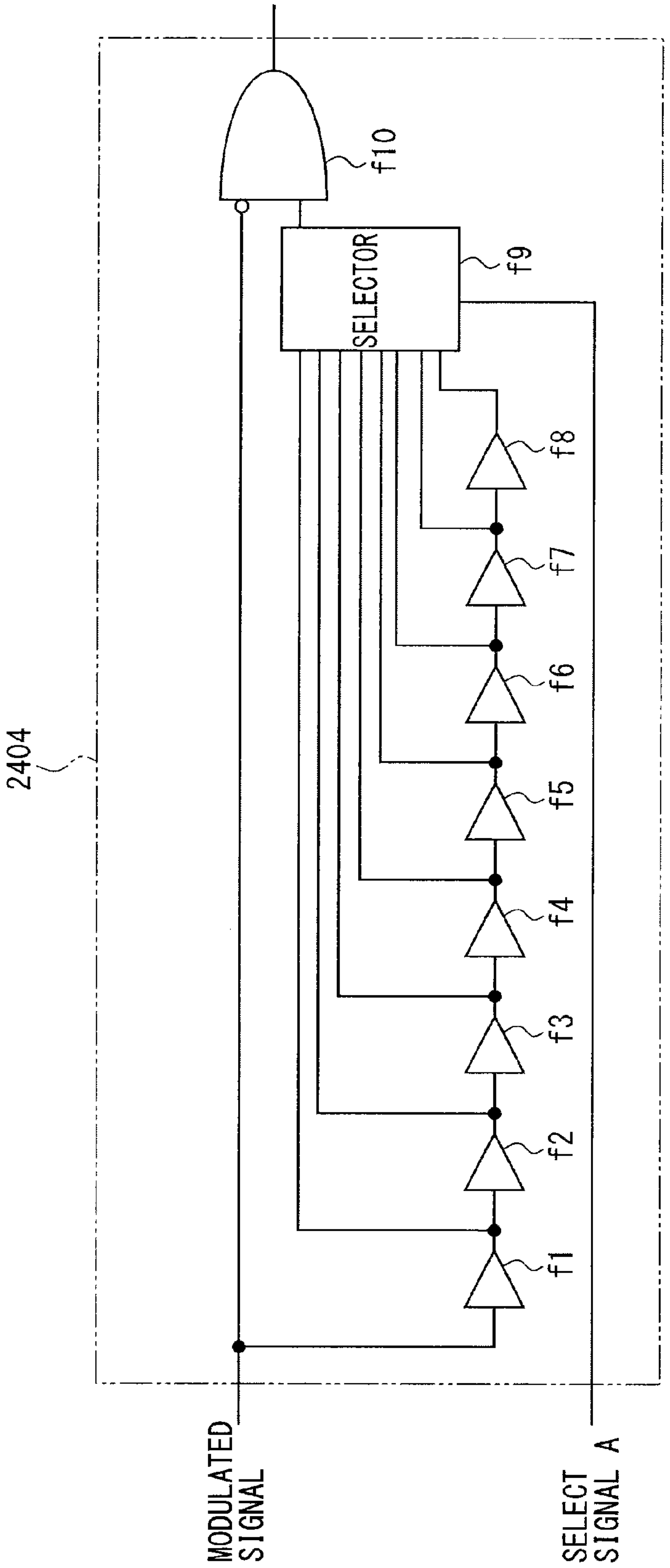
FIG. 16 is a view describing a US signal generation circuit in FIG. 15.

In this case, the US signal generation circuit 2404 includes, as illustrated in FIG. 16 as one example, buffer circuits (f1-f8) having a plurality of stages (in this case, 8 stages) which delay the modulated signal, a selector f9 which selects any of the outputs of the respective buffer circuits according to the select signal A, and outputs the selected output, and an AND circuit f10 which outputs a logical product of the inversion signal of the modulated signal and the output signal of the selector f9.

Figure 17:
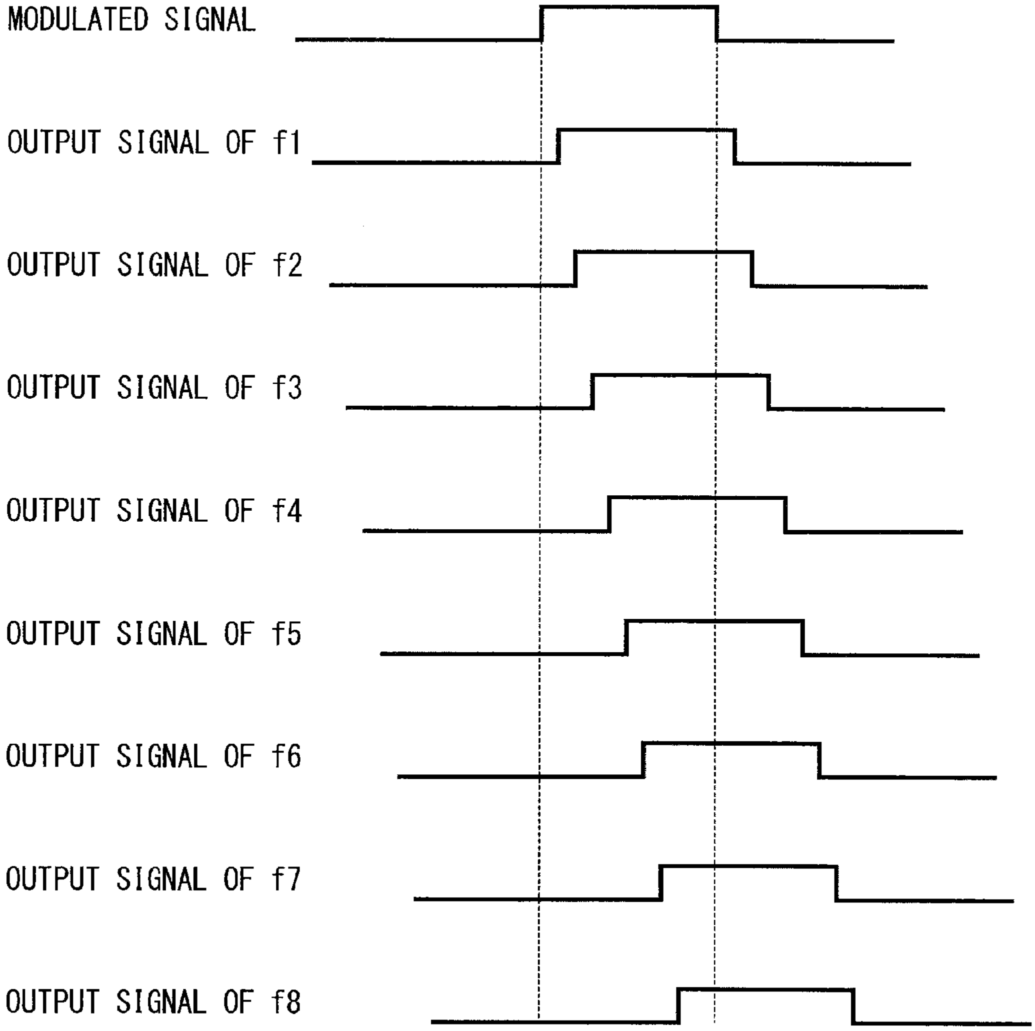
FIG. 17 is a timing chart describing an output signal of each buffer circuit in the US signal generation circuit.

FIG. 17 illustrates a timing chart of the modulated signal which is input to the US signal generation circuit 2404 and the signals which are output from the respective buffer circuits (f1-f8).

Figures 18, 19:
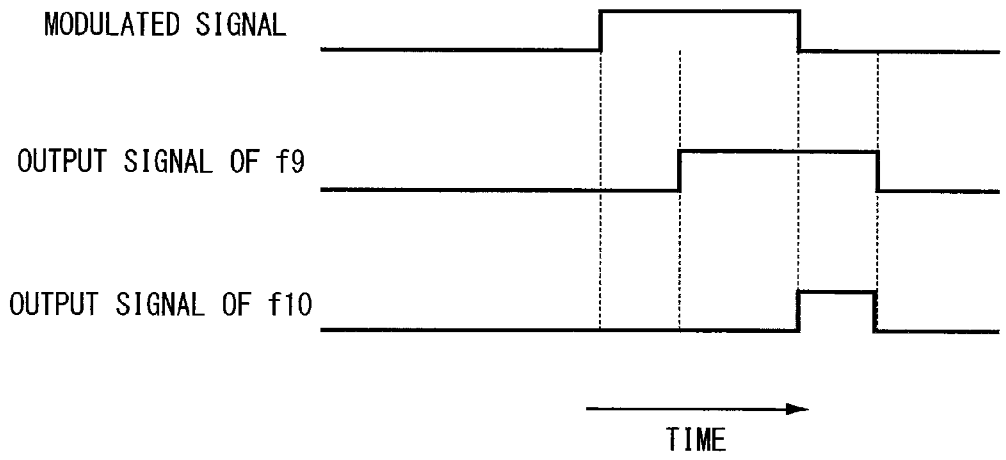
FIG. 18 is a view describing a relationship between a select signal A and an output signal of a selector.
FIG. 19 is a timing chart describing an output signal of an AND circuit and a selector in the US signal generation circuit.

FIG. 18 illustrates the operation of the selector f9. In this case, the select signal A includes three parallel signals. In FIG. 18, (000) denotes when all signal levels of three parallel signals are at a low level and (111) denotes when all signal levels of three parallel signals are at a high level.

The output signal of the selector f9 becomes a signal from the buffer circuit f1 when the select signal A is (000), the output signal of the selector f9 becomes a signal from the buffer circuit f2 when the select signal A is (001), and the output signal of the selector f9 becomes a signal from the buffer circuit f4 when the select signal A is (011).

The output signal of the selector f9 becomes a signal from the buffer circuit f5 when the select signal A is (100), the output signal of the selector f9 becomes a signal from the buffer circuit f6 when the select signal A is (101), the output signal of the selector f9 becomes a signal from the buffer circuit f7 when the select signal A is (110), and the output signal of the selector f9 becomes a signal from the buffer circuit f8 when the select signal A is (111).

FIG. 19 illustrates a timing chart of the output signal of the selector f9 and the output signal of the AND circuit f10 when the select signal A is (011) as one example. As described above, when the modulated signal is at a low level and the output signal of the selector f9 is at a high level, the output signal of the AND circuit f10 becomes a high level.

Referring to FIG. 15, the D/A conversion circuit 2405 converts the undershoot level-setting signal from the CPU 2401 into the analogue signal, and generates the undershoot level signal. The magnitude of the undershoot current Iud is determined based on the undershoot level signal.

The D/A conversion circuit 2405 converts the overshoot level-setting signal from the CPU 2401 into the analog signal, and generates the overshoot level signal. The magnitude of the overshoot current Iov is determined based on the overshoot level signal.

In addition, the undershoot level-setting signal and the overshoot level-setting signal are output from the CPU 2401 based on the overshoot level-setting information and the undershoot level-setting information stored in the ROM 2402.

The OS signal generation circuit 2406 generates the overshoot signal based on the modulated signal and the select signal B from the CPU 2401. The output width Tov of the overshoot current is determined based on the overshoot signal.

Figure 20:
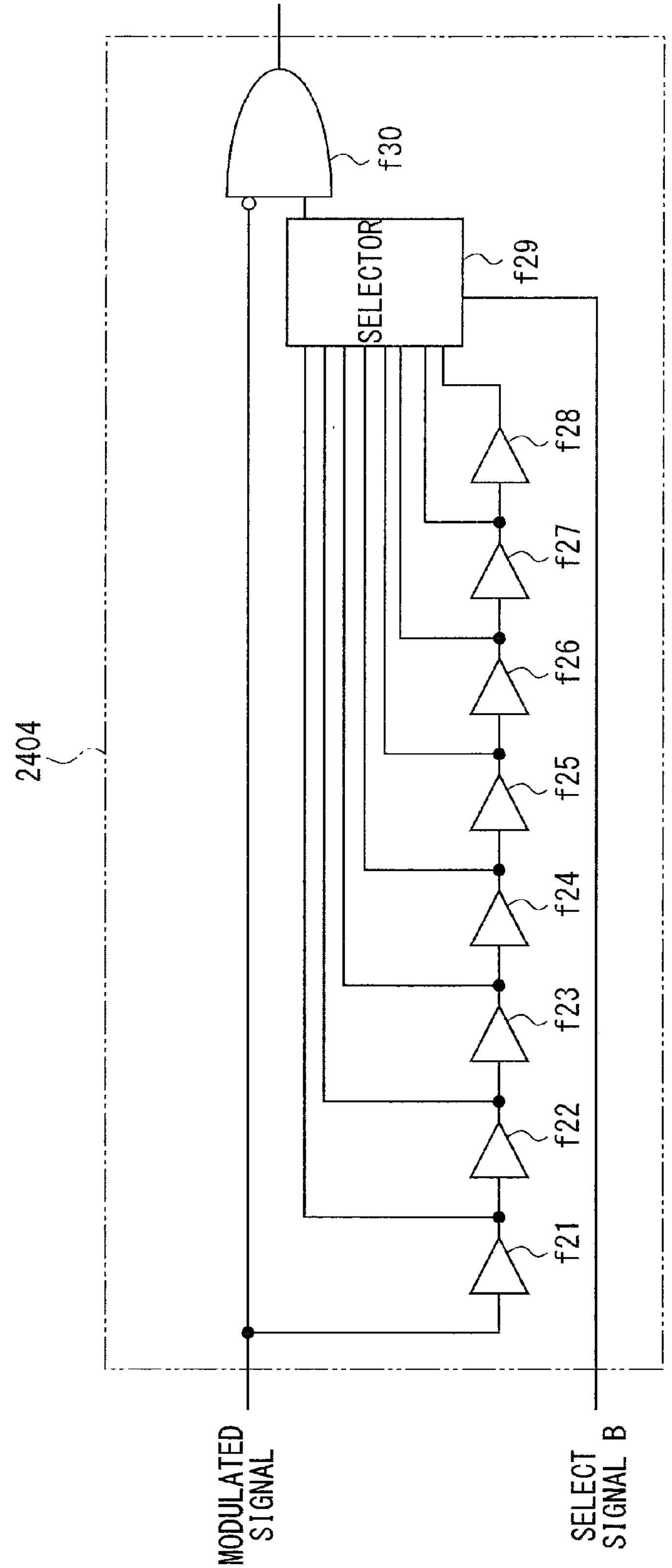
FIG. 20 is a view describing an OS signal generation circuit in FIG. 15.

In this case, the OS signal generation circuit 2406 includes, as illustrated in FIG. 20 as one example, buffer circuits (f21-f28) having a plurality of stages (in this case, 8 stages) which delay the modulated signal, a selector f29 which selects any of the outputs of the respective buffer circuits according to the select signal B, and an AND circuit f30 which outputs a logical product of the modulated signal and the signal in which the output signal of the selector f29 is inverted.

Figure 21:
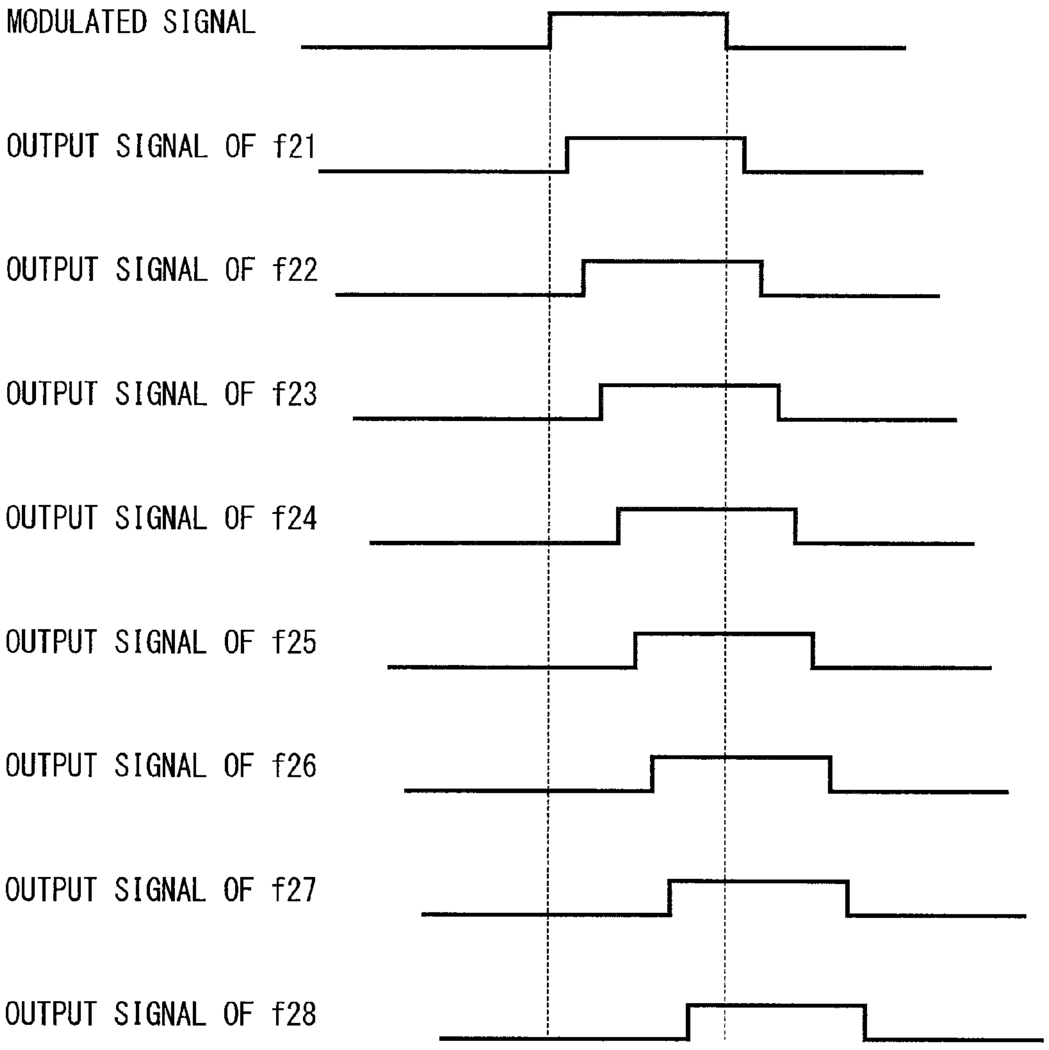
FIG. 21 is a timing chart describing an output signal of each buffer circuit in the OS signal generation circuit.

FIG. 21 illustrates a timing chart of the modulated signal which is input to the OS signal generation circuit 2406 and the signal which is output from each buffer circuit (f21-f28).

Figures 22, 23:
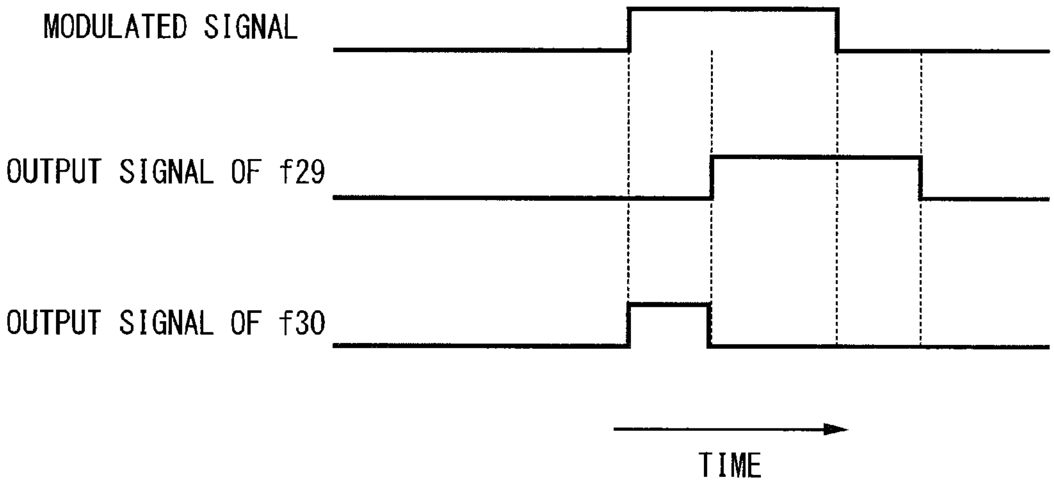
FIG. 22 is a view describing a relationship between a select signal B and an output signal of a selector.
FIG. 23 is a timing chart describing an output signal of an AND circuit and a selector in the OS signal generation circuit.

FIG. 22 illustrates the operation of the selector f29. In this case, the select signal B includes three parallel signals. In FIG. 22, (000) denotes when all signal levels of the three parallel signals are at a low level and (111) denotes when all signal levels of the three parallel signals are at a high level.

The output signal of the selector f29 becomes a signal from the buffer circuit f21 when the select signal B is (000), the output signal of the selector f29 becomes a signal from the buffer circuit f22 when the select signal B is (001), the output signal of the selector f29 becomes a signal from the buffer circuit f23 when the select signal B is (010), and the output signal of the selector f29 becomes a signal from the buffer circuit f24 when the select signal B is (011).

The output signal of the selector f29 becomes a signal from the buffer circuit f25 when the select signal B is (100), the output signal of the selector f29 becomes a signal from the buffer circuit f26 when the select signal B is (101), the output signal of the selector f29 becomes a signal from the buffer circuit f27 when the select signal B is (110), and the output signal of the selector f29 becomes a signal from the buffer circuit f28 when the select signal B is (111).

As one example, FIG. 23 illustrates a timing chart of the output signal of the selector f29 and the output signal of the AND circuit f30 when the selector signal B is (011). As described above, when the modulated signal is at a high level and the output signal of the selector f29 is at a low level, the output signal of the AND circuit f30 becomes a high level.

The comparator 2409 compares the target level signal to the output signal of the corresponding light-receiving element 11 for monitoring, and outputs the comparison result. The magnitude of the modulated current is determined based on the output signal of the comparator 2409.

The switch 2410 is a switch which turns on and off the electric connection with the current source 2414, and is turned on/off by the undershoot signal. In this case, the switch 2410 is set to be turned on when the undershoot signal is at a high level, and to be turned off when the undershoot signal is at a low level.

The switch 2411 is a switch which turns on/off the electric connection with the current source 2415, and is turned on/off by the modulated signal. In this case, the switch 2411 is set to be turned on when the modulated signal is at a high level, and to be turned off when the modulated signal is at a low level.

The switch 2412 is a switch which turns on/off the electric connection with the current source 2416, and is turned on/off by the overshoot signal. In this case, the switch 2412 is set to be turned on when the overshoot signal is at a high level, and to be turned off when the overshoot signal is at a low level.

The switch 2413 is a switch which turns on/off the electric connection with the current source 2417, and is turned on/off by the bias signal from the CPU 2401. In this case, the switch 2413 is set to be turned on when the bias signal is at a high level, and to be turned off when the bias signal is at a low level.

Figure 24:
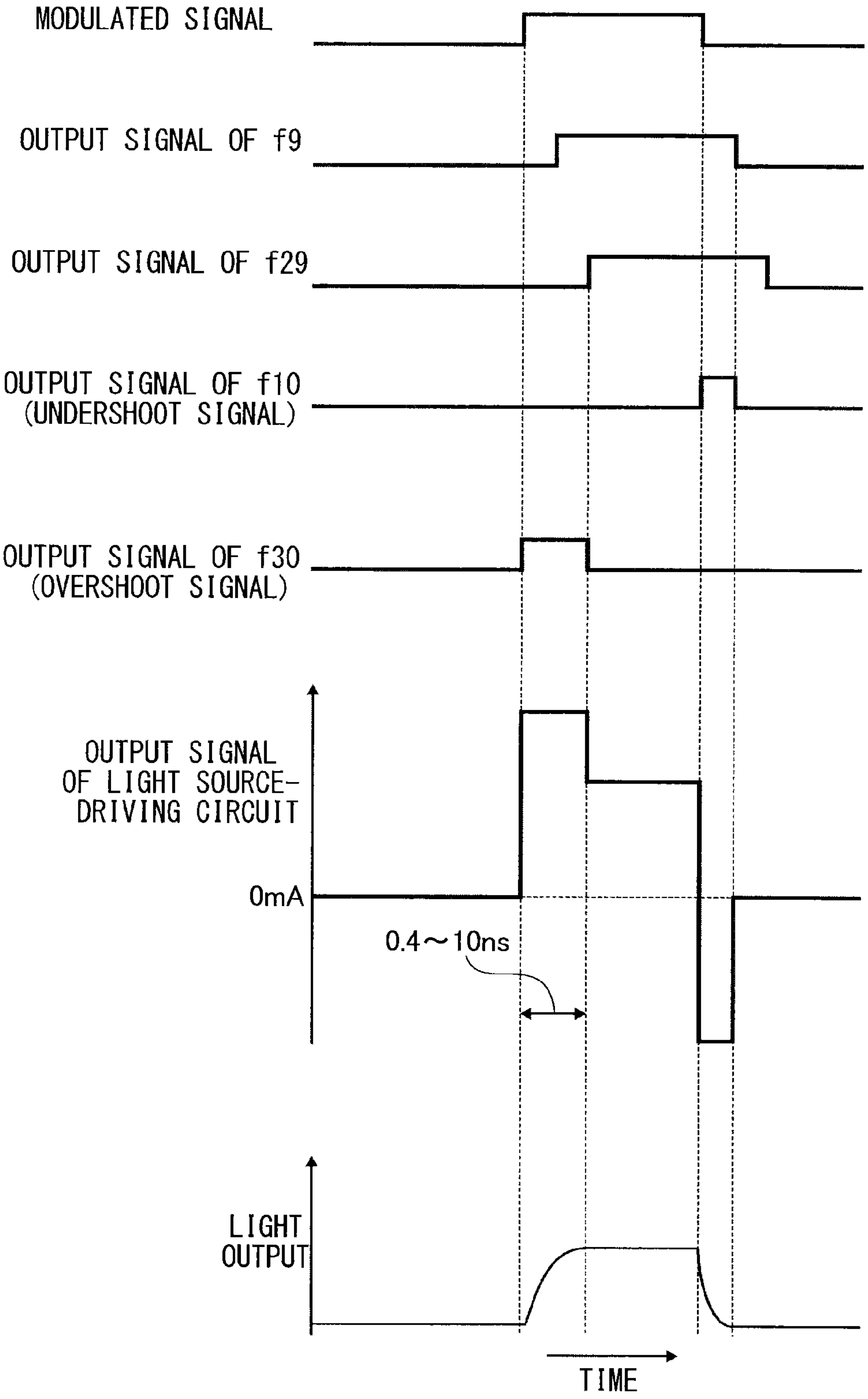
FIG. 24 is a timing chart describing an output signal of a light source-driving circuit.

FIG. 24 illustrates the timing chart of the output signal of the light source-driving circuit 24 and one example of the optical waveform which is emitted from the corresponding semiconductor laser 10.

The undershoot current is herein described. In addition, in order to simplify the description, the overshoot current is added.

Figure 25:
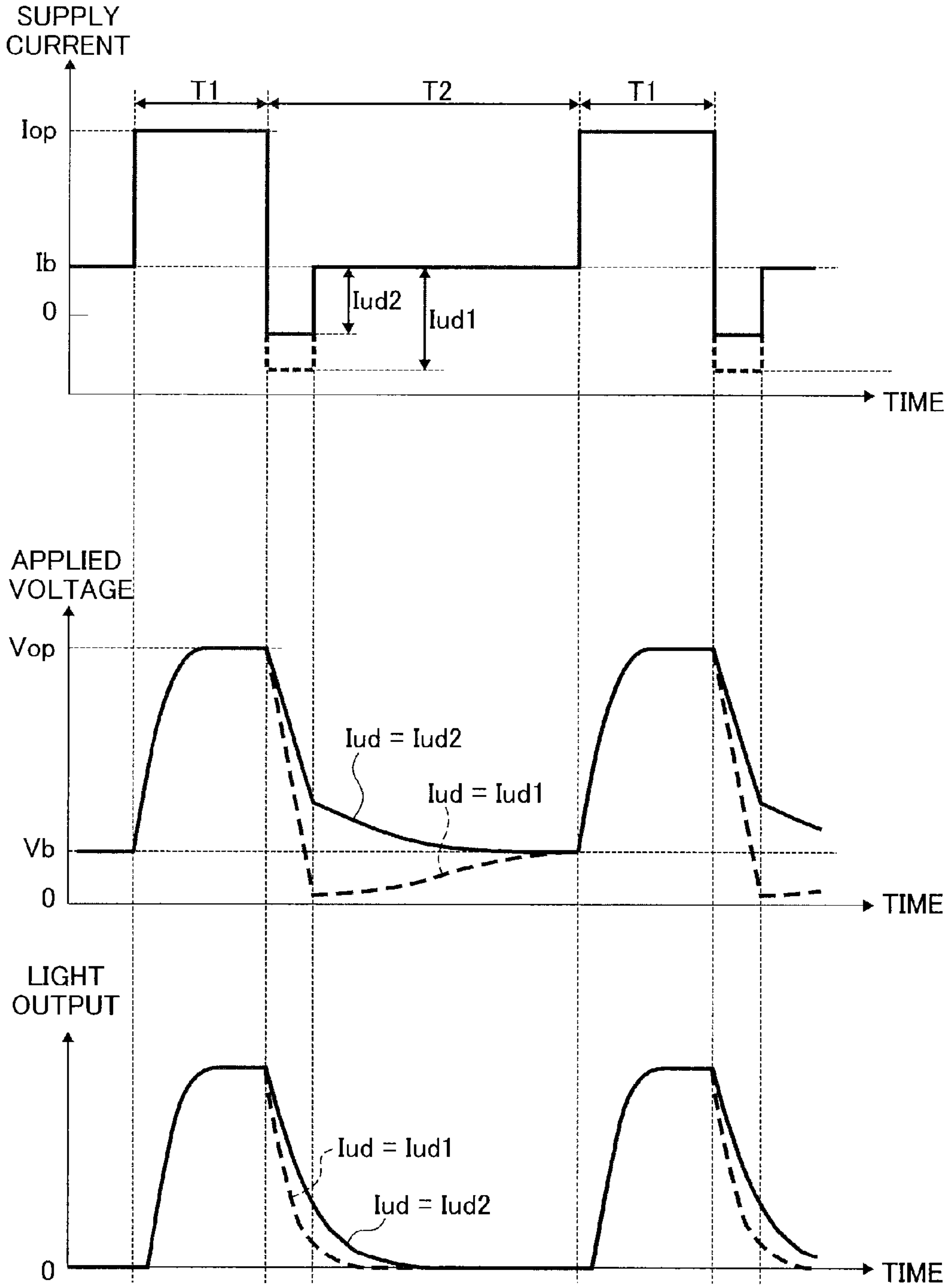
FIG. 25 is a timing chart describing an applied voltage and an optical waveform when a magnitude of an undershoot current is Iud1 and Iud2 in T2 of a turning-off time.
Figure 26:
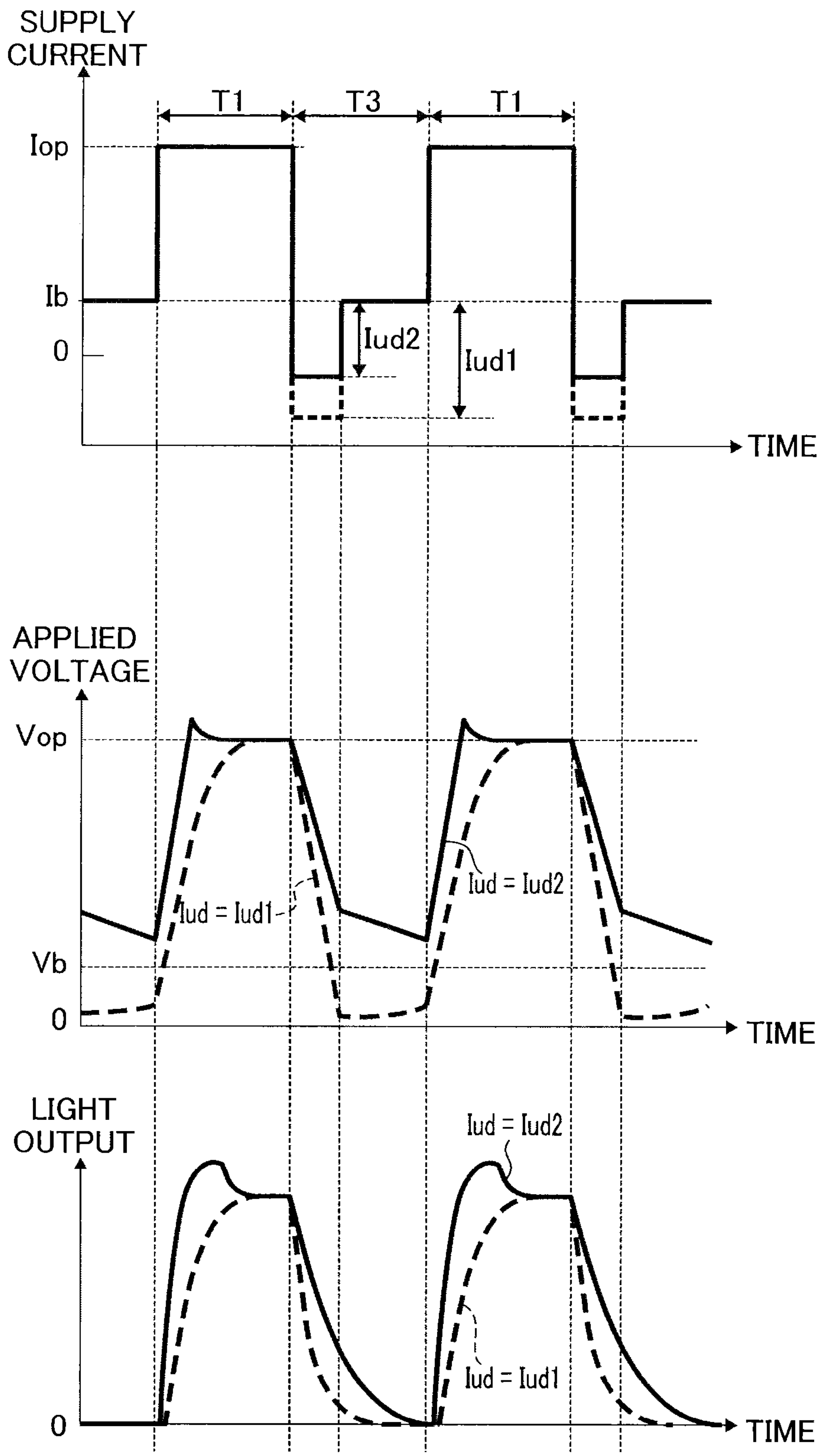
FIG. 26 is a timing chart describing an applied voltage and an optical waveform when a magnitude of the undershoot current is Iud1 and Iud2 in T3 of a turning-off time.

FIGS. 25, 26 illustrate the applied voltage and the optical waveform when the current value Iud of the undershoot current is Iud1 and Iud2 (<Iud1). FIG. 25 illustrates that the turning-off time before the turning-on is the above T2, and FIG. 26 illustrates that the turning-off time before the turning-on is the above T3.

Iud1 is an undershoot current in which the applied voltage when the output of the undershoot current is completed is smaller than Vb, and Iud2 is an undershoot current in which the applied voltage when the output of the undershoot current is completed is larger than Vb.

When the current value Iud of the undershoot current is Iud1, P12>P13 where P12 is an integral light volume when the turning-off time before the turning-on is T2 and P13 is an integral light volume when the turning-off time before the turning-on is T3. Namely, even if the pulse widths of the supply currents are the same, a longer turning-off time before the turning-on has a large integral light volume.

When the current value Iud of the undershoot current is Iud2, P22<P23 where P22 is an integral light volume when the turning-off time before the turning-on is T2 and P23 is an integral light volume when the turning-off time before the turning-on is T3. Namely, even if the pulse widths of the supply currents are the same, a shorter turning-off time before the turning-on has a large integral light volume.

Such a difference in the integral light volume results from a difference in the rising properties in the optical waveforms.

Figure 27:
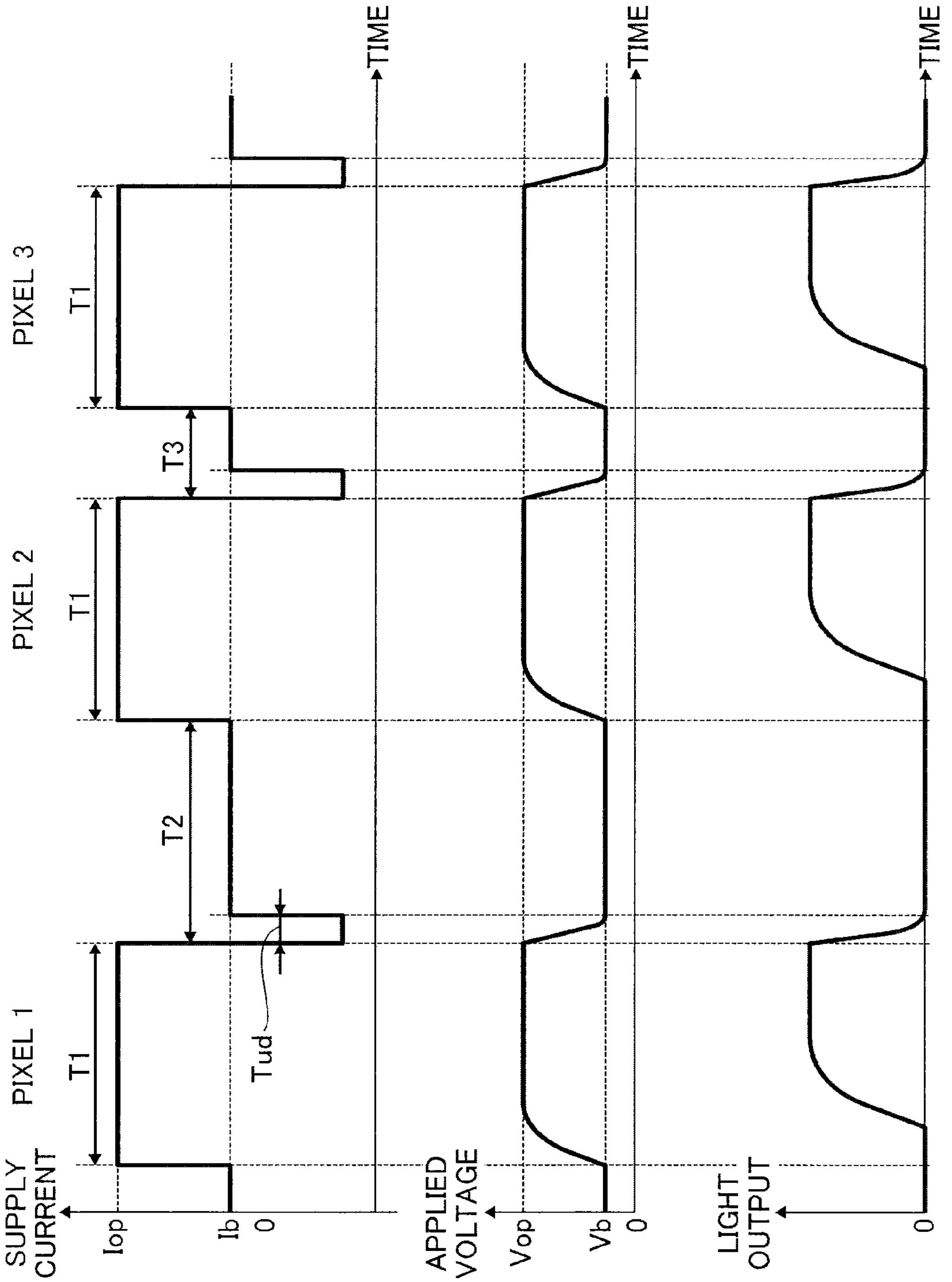
FIG. 27 is a timing chart describing an undershoot current in the first embodiment.

In this embodiment, at least one of the output width (output time) Tud and the magnitude Iud of the undershoot current is controlled such that the applied voltage when the output of the undershoot current is completed becomes substantially equal to Vb (refer to FIG. 27).

In this case, even if the turning-off time before the turning-on differs, the rising properties in the optical waveforms can be approximately the same. Therefore, as long as the pulse widths of the supply currents are the same, the integral light volume can be approximately the same even if the turning-off time before the turning-on differs.

Namely, in the present embodiment, at least one of the output width (output time) and the magnitude of the undershoot current is controlled such that the applied voltage when the output of the undershoot current is completed is equal to the applied voltage before the turning-on start timing. Therefore, variations in the response properties due to the parasitic capacity and the variations in the emission delay amount can be reduced. When the output of the undershoot current is complete, the applied voltage can be Vb at a high speed, and the current always drives from the condition that the applied voltage is Vb in the next turning-on start timing, so that a stable response property and emission delay amount can be obtained regardless of the turning-off time.

In addition, it is necessary to reduce the output width Tud of the undershoot current to be shorter than the turning-off time. If Tud is longer than the turning-off time, so-called rounding is generated in the rising property in the optical waveform.

Figure 28:
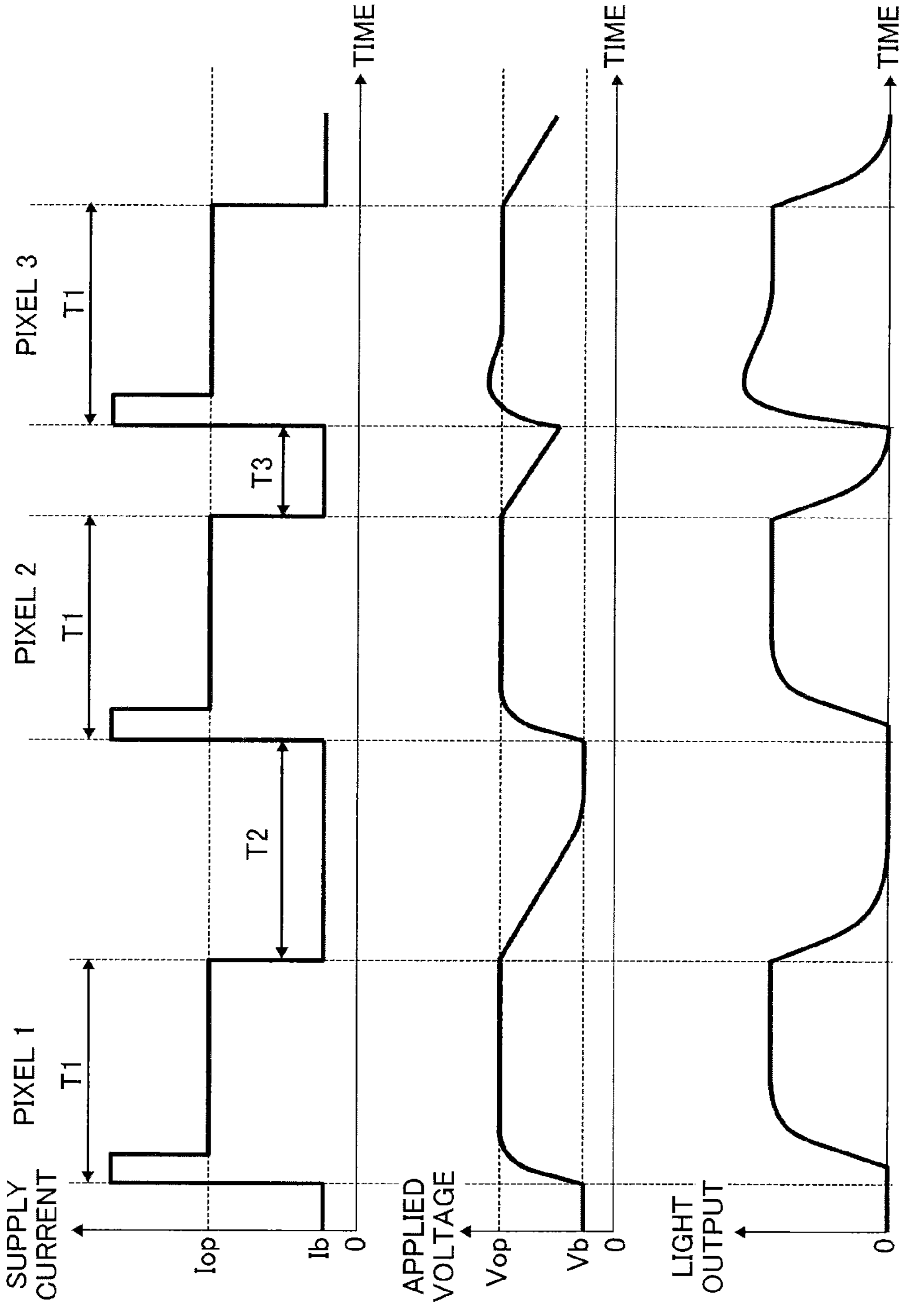
FIG. 28 is a view (part 2) describing a conventional inconvenience.

Next, the overshoot current will be described. The overshoot current was conventionally applied in order to improve the rounding of the raising property in the optical waveform and the emission delay. However, as illustrated in FIG. 28 as one example, in the pixel 3 in which the turning-off time before the tuning-on is T3, the applied voltage is not completely lowered to Vb within the turning-off time, so that the light may be overoutput at the start of the turning-on. In the conventional method, the response property may differ according to the length of the turning-off time before the turning-on. The operating life of the semiconductor laser may be reduced due to the overoutput light.

Figure 29:
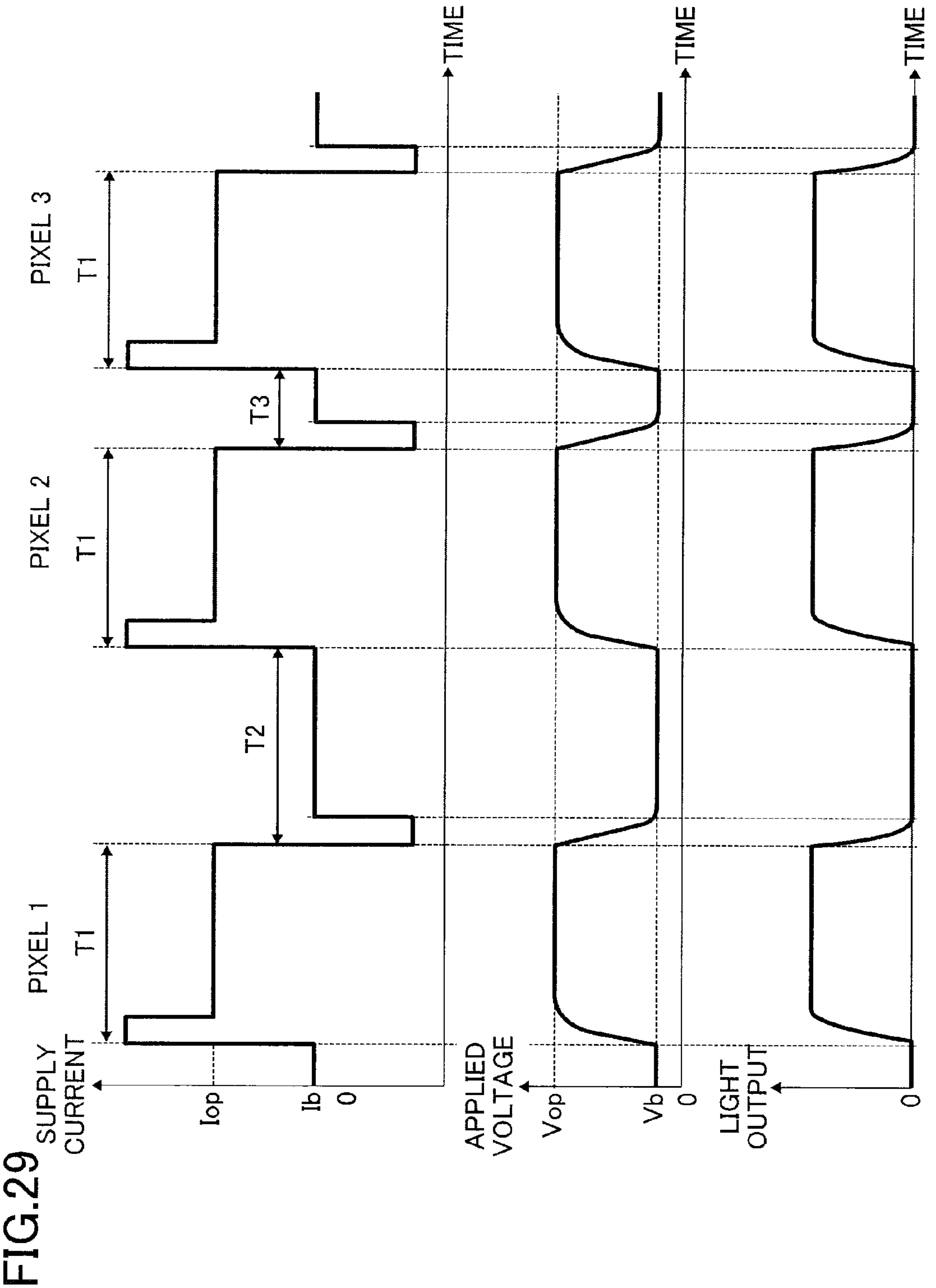
FIG. 29 is a timing chart describing an effect of the undershoot current of the first embodiment relative to the inconvenience in FIG. 28.

In the present embodiment, the applied voltage is absolutely reduced to Vb within the turning-off time by the undershoot current, so that the current always drives from the condition of Vb in the next turning-on start timing. Therefore, as illustrated in FIG. 29 as one example, the response property does not differ according to the length of the turning-off time before the turning-on even if the overshoot current is applied. Thus, the operating life of the semiconductor laser can be prevented from being shortened because the light is not overoutput.

As is clear from the above description, in the present embodiment, the light source driver is constituted by the light source-driving circuit 24, and the controller is constituted by the CPU 2401.

The method of driving a light source is carried out in the light source-driving circuit 24.

As described above, the light source-driving circuit 24 according to the present embodiment includes the CPU 2401, ROM 2402, RAM 2403, US signal generation circuit 2404, D/A conversion circuit 2405, OS signal generation circuit 2406, comparator 2409, four switches (2410, 2411, 2412, 2413), and four current sources (2414, 2415, 2416, 2417).

The CPU 2401 outputs a modulated current from lighting start timing to lighting complete timing in the modulated signal (lighting information) from the image-processing circuit 23, and outputs an undershoot current in synchronization with the lighting complete timing in the modulated signal. In this case, the CPU 2401 controls at least one of the output width (output time) and the magnitude of the undershoot current such that the applied voltage when the output of the undershoot current is complete is equal to the applied voltage before the turning-on.

In this case, the response property and the emission delay amount are approximately the same regardless of the length of the turning-off time before the turning-on. When the pulse widths of the supply currents are the same, the integral light volume can be approximately the same. Thus, desired light according to the modulated signal can be emitted from the light source.

The optical scanner 2010 includes the light source-driving circuit 24 with respect to each light source. With this configuration, a desired latent image can be formed on each photoreceptor drum. As a result, the color printer 2000 is able to stably form a high quality image.

Figure 30:
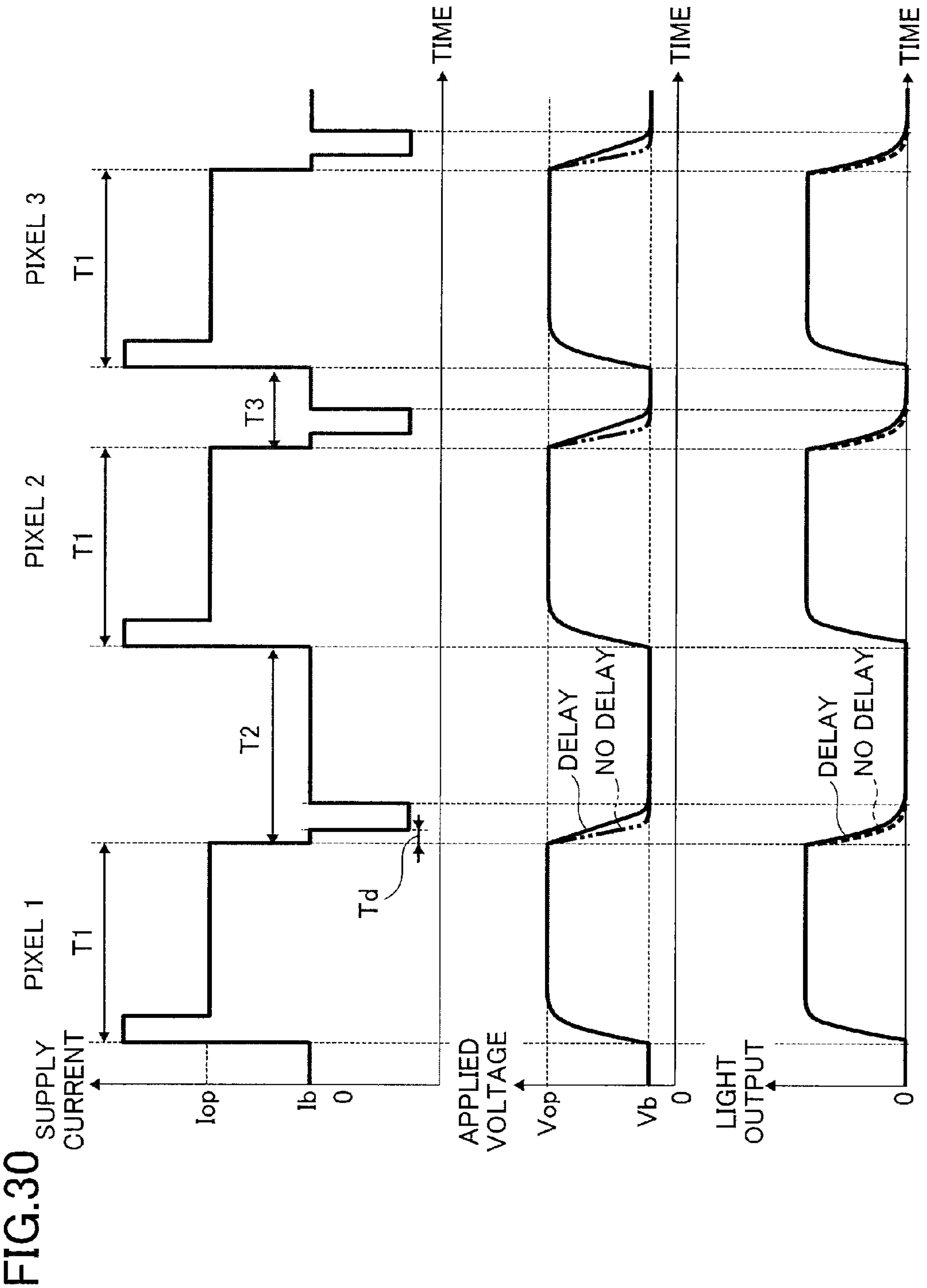
FIG. 30 is a timing chart describing delay of output timing of the undershoot current.

In the above embodiment, a VCSEL (Vertical Cavity Surface Emitting Laser) can be used instead of the semiconductor laser 10. However, the surface-emitting laser has a large element resistance and a large parasitic capacity, so that a desired integral light volume may not be obtained when the light volume is small. In this case, as illustrated in FIG. 30 as one example, a desired integral light volume can be obtained by delaying the output timing of the undershoot current. The response property can be controlled by delaying the output timing of the undershoot current.

In the above embodiment, at least a part of the processes according to the programs by the CPU 2401 can be constituted by hardware, or all of the processes can be constituted by hardware.

It is described in the above embodiment that each light source includes one semiconductor laser. However, the configuration is not limited to the above. Each light source may include a plurality of semiconductor lasers, or each light source may include a surface-emitting laser array.

It is described in the above embodiment that the driving method of the semiconductor laser is the bias method. However, the configuration is not limited to the above. The driving method of the semiconductor laser may be the unbias method. In this case, at least one of the output width (output time) Tud and the magnitude Iud of the undershoot current is controlled such that the applied voltage when the output of the undershoot current is complete becomes approximately 0.

It is described in the above embodiment that the tandem system multi-color printer, which forms a full color image by superimposing four colors (black, cyan, magenta, yellow), is used as an image-forming apparatus. However, it is not limited thereto. A multi-color printer using accessory colors can be used or a printer which forms a single color image can be used.

An image-forming apparatus which directly emits laser light to a medium (for example, paper) coloring by the laser light can be used.

An image-forming apparatus using a silver film as an image carrier can be used. In this case, a latent image is formed on the silver film by optical scanning, and the latent image can be visualized by a process which is the same as the development process in a normal silver halide photography process. The image can be transferred on printed paper by a process which is the same as a printing process in the normal silver halide photography process. Such an image-forming apparatus can be carried out as an optical printmaking apparatus or an optical drawing apparatus which draws a CT scan image or the like.

It is described in the above embodiment that the printer is used as the image-forming apparatus. However, the configuration is not limited thereto. An image-forming apparatus except a printer, for example, a complex machine, facsimile, or complex machine in which these are gathered can be used.

A second embodiment of the present invention generates a driving current including a first undershoot current which is a fixed value corresponding to an emission delay time (hereinafter, referred to as a parasitic delay time) depending on the parasitic capacity of a substrate or the like on which a light source is mounted, and a second undershoot current which is controlled according to the light volume of the light source. According to the second embodiment of the present invention, the rounding of the falling of the light output waveform can be reduced by supplying the driving current to the light source, so as to improve the response property of the light output.

Hereinafter, the second embodiment of the present invention will be described.

Figure 31A:
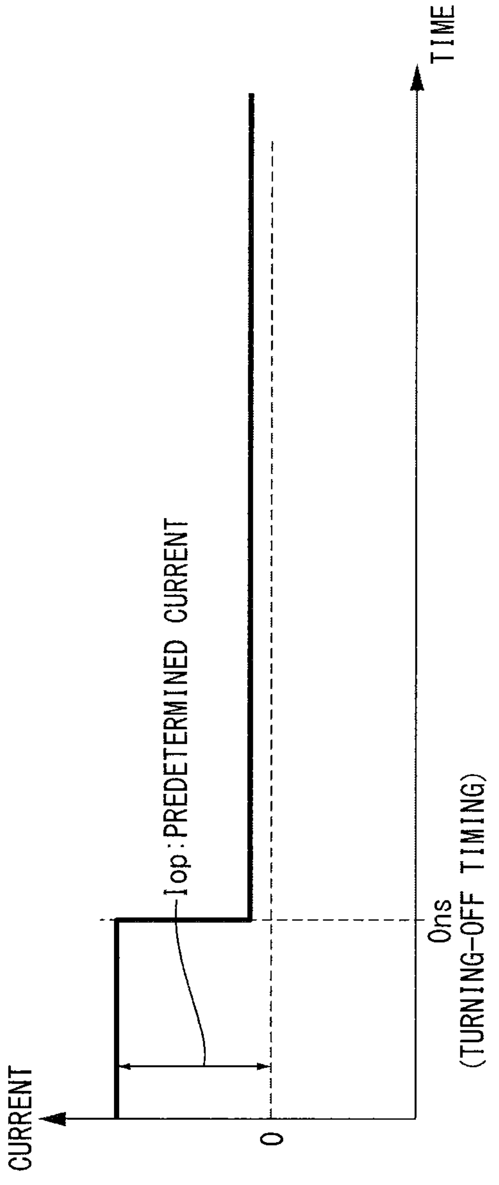
FIGS. 31A, 31B are views each illustrating a current waveform and an electric potential of an emission element when a light source is turned off.
Figure 31B:
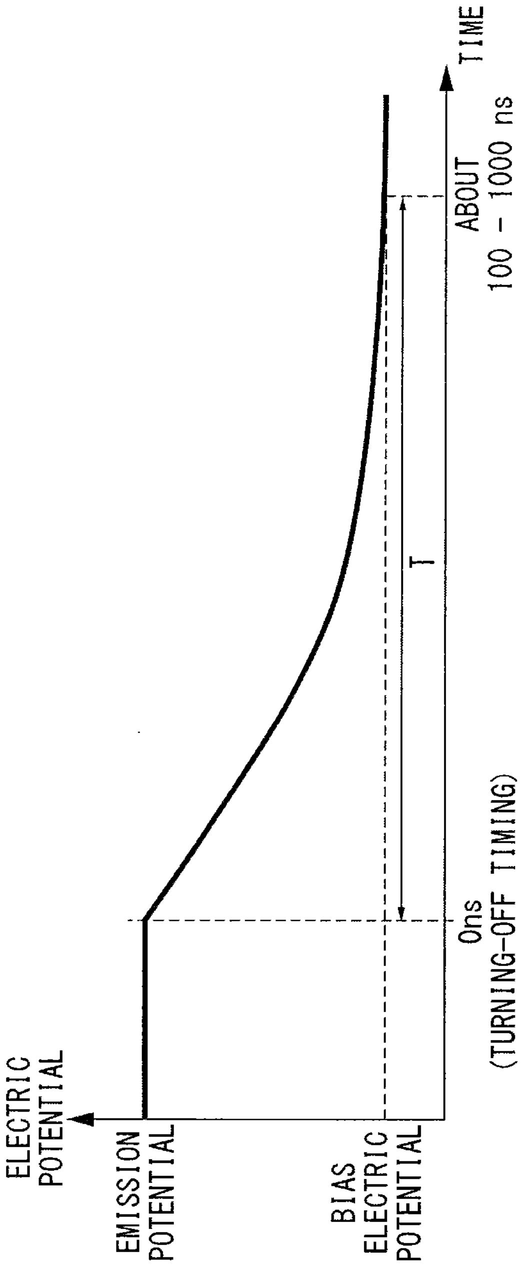

FIGS. 31A, 31B are views each illustrating a current waveform and an electric potential of an emission element when a light source is turned off. FIGS. 31A, 31B illustrate that a light source is turned off by simply disconnecting the application of a driving current to the light source. FIG. 31A illustrates a waveform of a driving current which is supplied to the light source, and FIG. 31B illustrates an electric potential of the light source. In the following embodiment, the light source will be described as an LD (Laser Diode).

When the light source is turned off by simply disconnecting the application of the driving current, the electric potential of the LD in this embodiment slowly lowers after the turning-off, and is stabilized in the target electric potential after several hundred nsec. This is due to the effect of the parasitic capacity in the wiring in the package provided with the LD or the wiring connecting the LD and the circuit, or the response property including a differential resistance of the LD. In the following description, a time T until the electric potential of the LD is stabilized after the disconnection of the driving current is referred to as the delay time T. The target electric potential becomes a bias electric potential when the driving current includes a bias current, and becomes a zero electric potential when the driving current does not include a bias current.

Hereinafter, the parasitic capacity and the response property of the LD such as a differential resistance will be described with reference to FIG. 32 describing the parasitic capacity of the light source.

Figure 32:
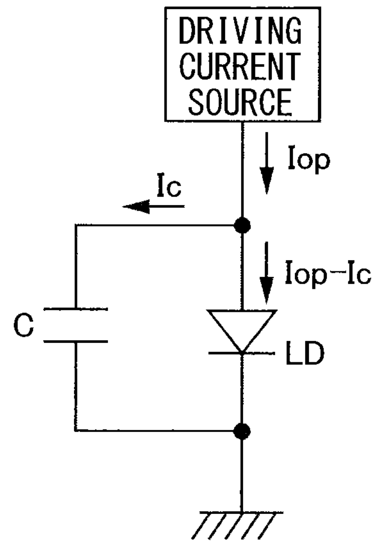
FIG. 32 is a view describing a parasitic capacity of a light source.

The LD illustrated in FIG. 32 outputs a predetermined light volume Po when a predetermined current Top is supplied. In FIG. 32, C denotes a parasitic capacity. The parasitic capacity C includes a parasitic capacity generated in the wiring connecting the LD and a circuit such as an LD driver when the LD is mounted on the circuit board together with the circuit such as an LD driver. The parasitic capacity C includes a parasitic capacity such as a package when the LD and the circuit such as an LD driver are packaged.

Upon the supply of the predetermined current Top to the LD, a part of the current Ic of the predetermined current Iop is supplied to the parasitic capacity C so as to charge the parasitic capacity C. While the parasitic capacity C is charged by the predetermined current Iop, the current (Iop-Ic) which is a part of the predetermined current Iop is supplied to the LD. When the charging of the parasitic capacity C is complete, the predetermined current Iop is supplied to the LD. Namely, during the charging time of the parasitic capacity C by the current Ic, a part (lop-Ic) of the predetermined current is only supplied to the LD, so that such a charging time becomes a time which cannot obtain the light output. The time which cannot obtain the light output is a parasitic delay time.

The LD requires a time for discharging the parasitic capacity C similarly to the discharge when disconnecting the supply of the predetermined current Iop from the driving current source. Therefore, it takes time to stabilize the electric potential of the LD in a target electric potential after disconnecting the supply of the predetermined current Iop. This time is the delay time T illustrated in FIGS. 31A. 31B.

The light output waveform of the LD corresponds to the electric potential of the LD. When the LD is turned off by simply disconnecting the supply of the driving current, the falling of the light output waveform rounds due to the delay time T. The rounding of the light output waveform is improved by applying the undershoot current to the LD. The undershoot current is a current which falls below the basic line such that the waveform becomes a constant value in the falling of the driving current waveform.

Figure 33A:
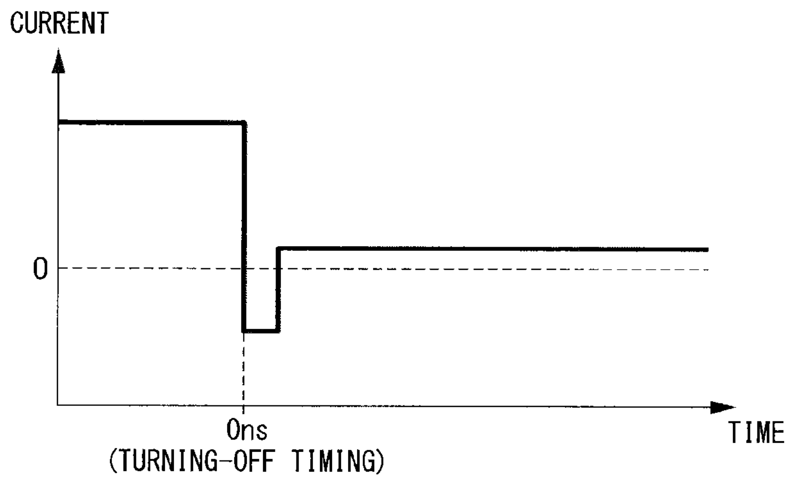
FIGS. 33A, 33B are views each describing an undershoot current.
Figure 33B:
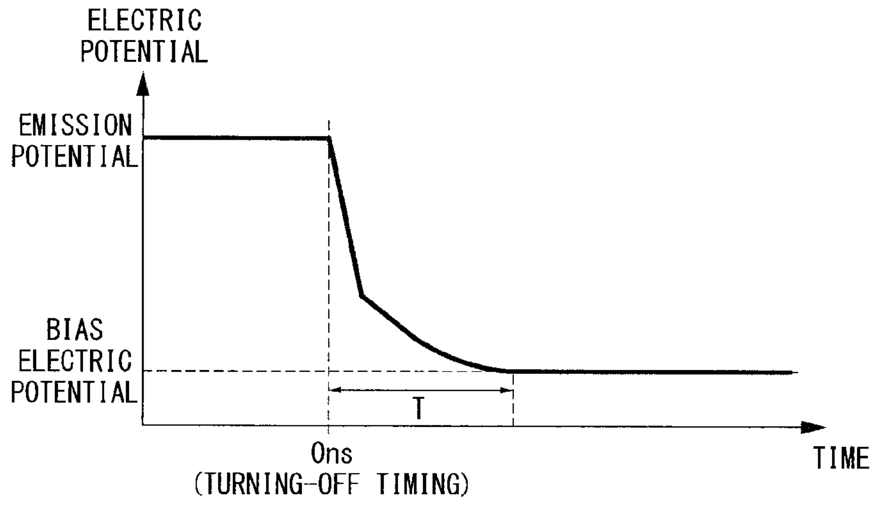

FIGS. 33A, 33B are views each describing the undershoot current. FIG. 33A illustrates a waveform of a driving current which is supplied to the LD. FIG. 33B illustrates an electric potential of the LD. FIGS. 33A, 33B illustrate an example in which the value of the undershoot current is set to a predetermined fixed value.

The electric potential of the LD rapidly falls because the undershoot current is applied in the turning-off timing of the driving current. However, the undershoot current illustrated in FIGS. 33A, 33B is a predetermined fixed value. For this reason, when the electric potential of the LD fluctuates, there may be a possibility that the value of the undershoot current becomes an inappropriate value. In addition, the electric potential of the LD corresponds to the light volume emitted from the LD.

In the example illustrated in FIGS. 33A, 33B, the delay time T is shortened compared to FIGS. 31A, 31B. However, the delay time T of several ten nsec still occurs. In this case, when the tuning-off time (LD OFF time) of the LD is set to several nsec or below, there may be a possibility that the driving current is supplied to the LD before the electric potential of the LD is stabilized, and the rising of the light output waveform may be affected.

In the present embodiment, the driving current includes a first undershoot current which is a fixed voltage depending on a time for discharging a parasitic capacity and a second undershoot current which adjusts according to the light volume of the LD.

Figure 34:
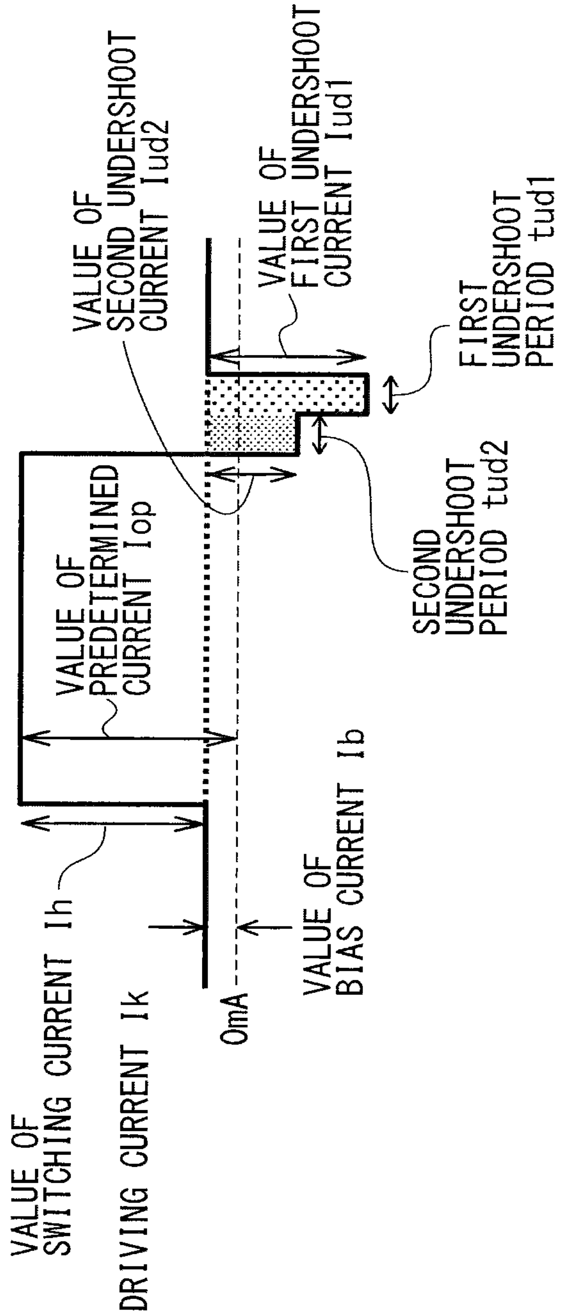
FIG. 34 is a view describing a driving current to be supplied to an LD from a light source-driving circuit.

FIG. 34 is a view describing the driving current to be supplied to the LD from the light source-driving circuit.

The driving current Ik includes a predetermined current Top which obtains a predetermined light volume P from the LD, a first undershoot current Iud1, and a second undershoot current Iud2. The predetermined current Iop is constituted by the switching current Ih and the bias current Ib.

Hereinafter, the first undershoot current Iud1 and the second undershoot current Iud2 of the present embodiment will be described. The first and second undershoot currents Iud1, Iud2 of the present embodiment improve the rounding of the falling of the light output waveform of the LD, and discharge the electric charge charged in the parasitic capacity C.

The first undershoot current Iud1 has a role of discharging the necessary amount of the electric charge in the parasitic capacity C, and the current value is a previously set fixed value. The value of the first undershoot current Iud1 is set based on the parasitic capacity C and the charged amount of the parasitic capacity C by the bias current Ib. The parasitic capacity C depends on the light source-driving circuit provided with the LD, for example. The first undershoot current Iud is set based on the configuration of the light source-driving circuit and on the timing that the value of the bias current Ib is determined.

The second undershoot current Iud2 is adjusted according to the light volume of the LD. This is because a necessary undershoot current amount varies upon a change in the LD light volume.

In this embodiment, the second undershoot current Iud2 is applied to the LD in the second undershoot period tud2 in the falling of the predetermined current Iop (switching current Ih). In the present embodiment, after the second undershoot period tud2, the first undershoot current Judi is supplied to the LD in the first undershoot period tud1.

As described above, the present embodiment includes the first undershoot current Iud1 which is a fixed value set to the driving current Ik according to the parasitic capacity and the second undershoot current Iud2 which is a variable value adjusted according to the light volume of the LD. According to the present embodiment, the electric potential can be accurately stabilized in the target electric potential from the emission electric potential just after the turning-off of the LD.

First Example

Figure 35:
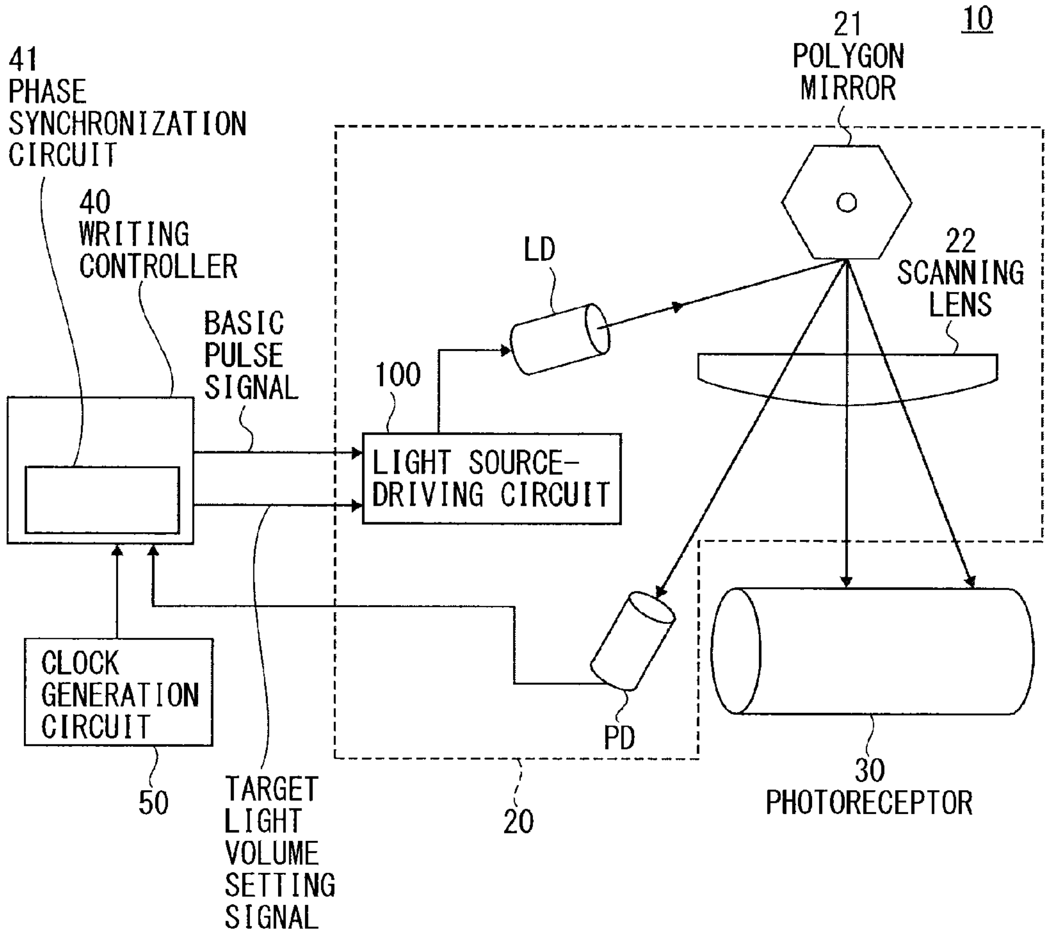
FIG. 35 is a view describing a schematic configuration of an image-forming apparatus according to First Example.

First Example of the present invention will be hereinafter described with reference to the drawings. FIG. 35 is a view describing the configuration of an image-forming apparatus according to First Example.

An image-forming apparatus 10 according to the present example includes an optical scanner 20, photoreceptor 30, writing controller 40, and clock generation circuit 50.

The optical scanner 20 of this example includes a polygon mirror 21, scanning lens 22, light source-driving circuit 100, LD (Laser Diode: semiconductor laser) of an emission element (light source), and PD (photo-detector) of a light-receiving element. In this example, the light source includes an LD, but it is not limited thereto. The light source can be a semiconductor laser array (LDA; Laser Diode Array), VCSEL (Vertical Cavity Surface Emitting Laser) or the like.

The laser light emitted from the LD scans by a rotatable polygon mirror 21, and irradiates the photoreceptor 30 of a medium to be scanned through the scanning lens 22. The irradiated laser light becomes a light spot on the photoreceptor 30, so that the electrostatic latent image is formed on the photoreceptor 30. The polygon mirror 21 emits the laser light to the PD every time that the scanning of one line is complete. Upon the irradiation of the laser light to the PD, the PD converts the laser light into electric signals, and inputs the electric signals into the phase synchronization circuit 41 in the writing controller 40. The phase synchronization circuit 41 generates a pixel clock for the next one line in response to the input of the electric signal. A high frequency clock signal is input into the phase synchronization circuit 41 from the clock generation circuit 50, and the phase of the pixel clock is thereby synchronized.

The writing controller 40 supplies a standard pulse signal to the light source-driving circuit 100 in accordance with the generated pixel clock. The writing controller 40 supplies a target light volume-setting signal to the light source-driving circuit 100, so as to drive the LD. An electrostatic latent image of the image data is thereby formed on the photoreceptor 30.

Figure 36:
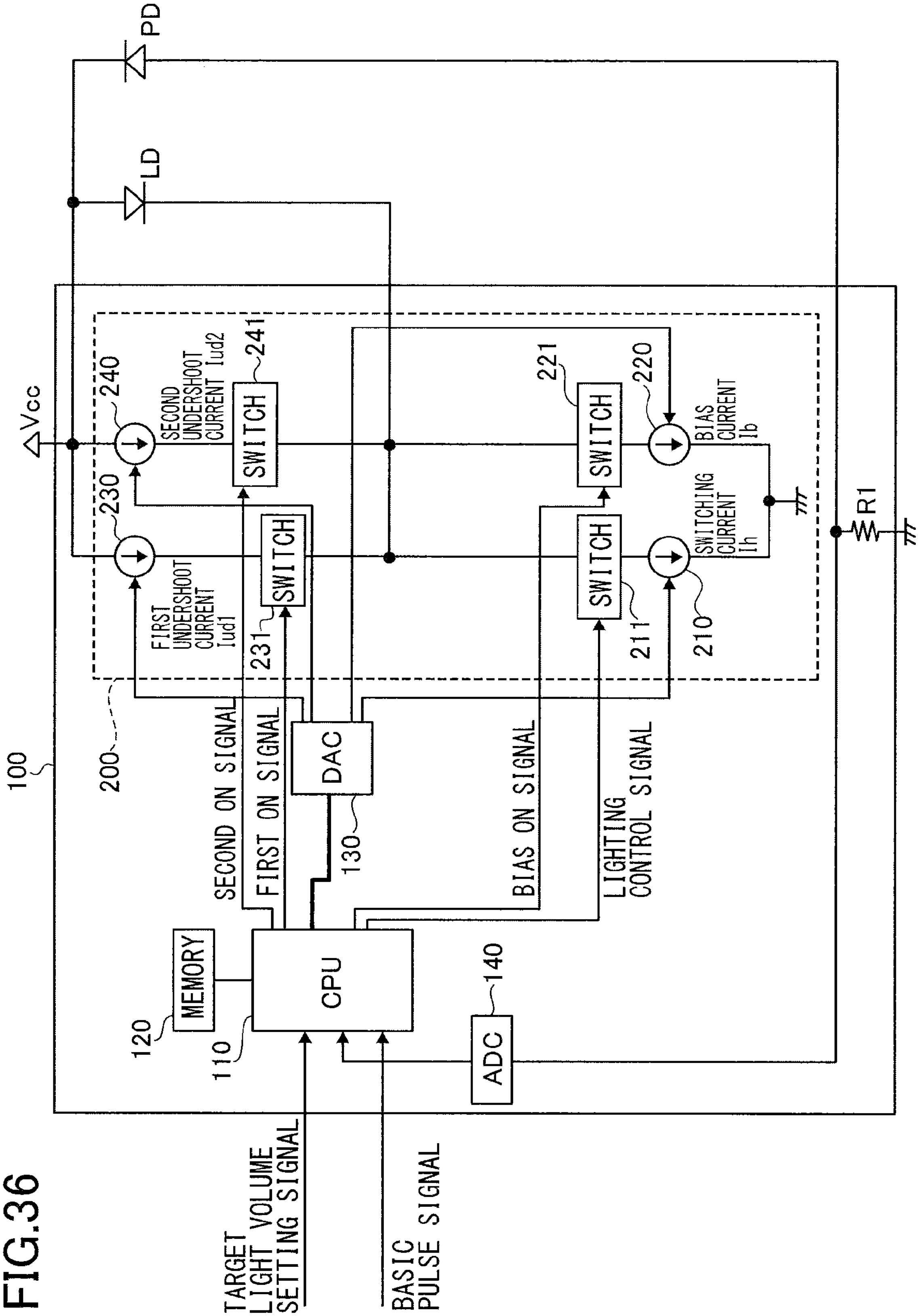
FIG. 36 is a view describing a light source-driving circuit according to First Example.

Hereinafter, the light source-driving circuit 100 of the present example will be described with reference to FIG. 36. FIG. 36 is a view describing the light source-driving circuit of First Example.

The light source-driving circuit 100 of this example includes a CPU (Central Processing Unit) 110, memory 120, DAC (Digital to Analogue Convertor) 130, ADC (Analog to Digital Converter) 140, LD driver 200, and resistor R1. In addition, the light source-driving circuit 100 may not include the resistor R1. In this case, the resistor R1 is provided outside the light source-driving circuit 100.

The light source-driving circuit 100 of this example is connected to the LD and PD, and the driving of the LD is controlled based on the electric signal output from the PD according to the light volume of the LD.

The CPU 110 controls various operations of the light source-driving circuit 100. The memory 120 stores various values or the like for use in the operation of the light source-driving circuit 100. The operation of the CPU 110 and the values stored in the memory 120 will be described in details below.

The DAC 130 converts the signal output from the CPU 110 into the analogue values. The ADC 140 converts the electric signals output from the PD into the digital values.

The LD driver 200 generates a driving current to be supplied to the LD based on the standard pulse signal and the target light volume setting signal, so as to control the emission timing of the LD. The LD driver 200 of this example outputs the driving current Ik including the first and second undershoot currents Iud1, Iud2 applied in the falling of the predetermined current Top.

The light source-driving circuit 100 of this example controls the driving current Ik by the CPU 110 and the LD driver 200. More specifically, the light source-driving circuit 100 generates the driving current Ik including the value of the second undershoot current Iud2 set according to the predetermined light volume P of the LD and the previously set first undershoot current Iud1.

The LD driver 200 of this example will be described hereinafter. The LD driver 200 of this example includes a switching current source 210, bias current source 220, first undershoot current source 230, second undershoot current source 240, and switches 211, 221, 231, 241.

The switching current source 210, bias current source 220, first undershoot current source 230, and second undershoot current source 240 generate the driving current Ik of the LD. The driving current Ik of this example is a current to which a current value output from each current source is added.

The switching current source 210 generates a predetermined switching current Ih based on the lighting control signal from the CPU 110. The switching current source 210 is connected to the LD through the switch 211. The switch 211 is constituted by a transistor or the like, and the switch 211 is controlled to be turned on/off based on the lighting control signal supplied from the CUP 110. The value of the switching current Ih is set based on the instruction from the CPU 110.

The bias current source 220 generates a predetermined bias current Ib based on the bias ON signal from the CPU 110. The bias current source 220 is connected to the LD through the switch 221. The switch 221 is constituted by a transistor or the like, and the switch 221 is controlled to be turned on/off based on the bias ON signal supplied from the CPU 110. The value of the bias current Ib is set based on the instruction from the CPU 110.

The first undershoot current source 230 generates the first undershoot current Iud1 applied to the LD after the application of the second undershoot current Iud2. The first undershoot current source 230 is connected to the LD through the switch 231. The switch 231 is constituted by a transistor or the like, and the switch 231 is controlled to be turned on/off based on the first ON signal supplied from the CPU 110. In this example, the first undershoot period tud1 is a period while the first ON signal is on.

The second undershoot current source 240 generates the second undershoot current Iud2 applied to the LD in the falling of the switching current Ih. The falling of the switching current Ih is the falling of the predetermined current Top. The second undershoot current source 240 is connected to the LD through the switch 241. The switch 241 is constituted by a transistor, or the like, and the switch 241 is controlled to be turned on/off based on the second ON signal supplied from the CPU 110. In this embodiment, the second undershoot period tud2 is a period in which the second ON signal is on.

Figure 37:
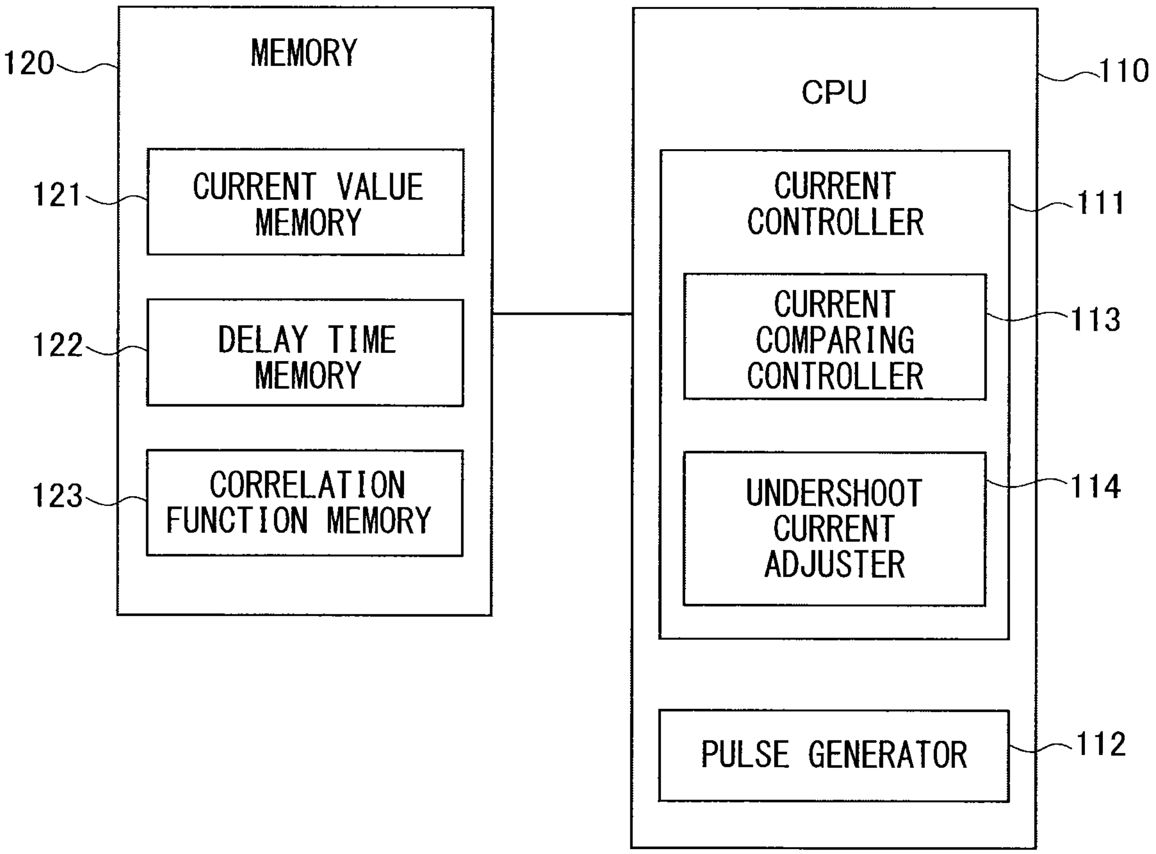
FIG. 37 is a view describing a configuration of a CPU and values stored in a memory.

Hereinafter, the operations of the CPU 110 and the values stored in the memory 120 of this example will be described with reference to FIG. 37. FIG. 37 is a view illustrating the configuration of the CPU and the values stored in the memory.

The CPU 110 of this example includes a current controller 111 and a pulse generator 112.

The memory 120 includes a current value memory 121, delay time memory 122, and correlation function memory 123. The current value memory 121 stores setting values in various current sources of the light source-driving circuit 100. More specifically, the current value memory 121 stores, for example, the value of bias current Ib and the value of first undershoot current Iud1.

The delay time memory 122 stores a delay time for determining the first and second undershoot periods tud1, tud2. The correlation function memory 123 stores a correction function for use in adjusting the second undershoot current Iud2 by an after-described undershoot current adjuster 114.

In the CPU 110 of this example, the current controller 111 includes a current comparing controller 113 and the undershoot current adjuster 114.

The current comparing controller 113 of this example obtains set values of various current sources stored in the current value memory 121, and outputs a current corresponding to the set values to various current sources through the DAC 130. The current comparing controller 113 of this example compares the output of the PD converted into the digital values by the ADC 140 and the target light volume-setting signals, and controls the set value of the switching current source 210 such that the output of the PD conforms to the value set by the target light volume-setting signals.

In this example, the switching current Ih based on the target light volume-setting signals can be supplied to the LD by controlling the switching current source 210 as described above.

The undershoot current adjuster 114 of this example adjusts the values of the second undershoot current Iud2. More specifically, the undershoot current adjuster 114 refers to the correlation function of the memory 120, and adjusts the value of the second undershoot current Iud2. The process of the undershoot current adjuster 114 of this example will be described in detail below.

The pulse generator 112 of this example is a signal generator which generates the first ON signal and second ON signal based on the delay time stored in the delay time memory 122 and the basic pulse signal. The pulse generator 112 can generate the bias ON signal.

Figure 38:
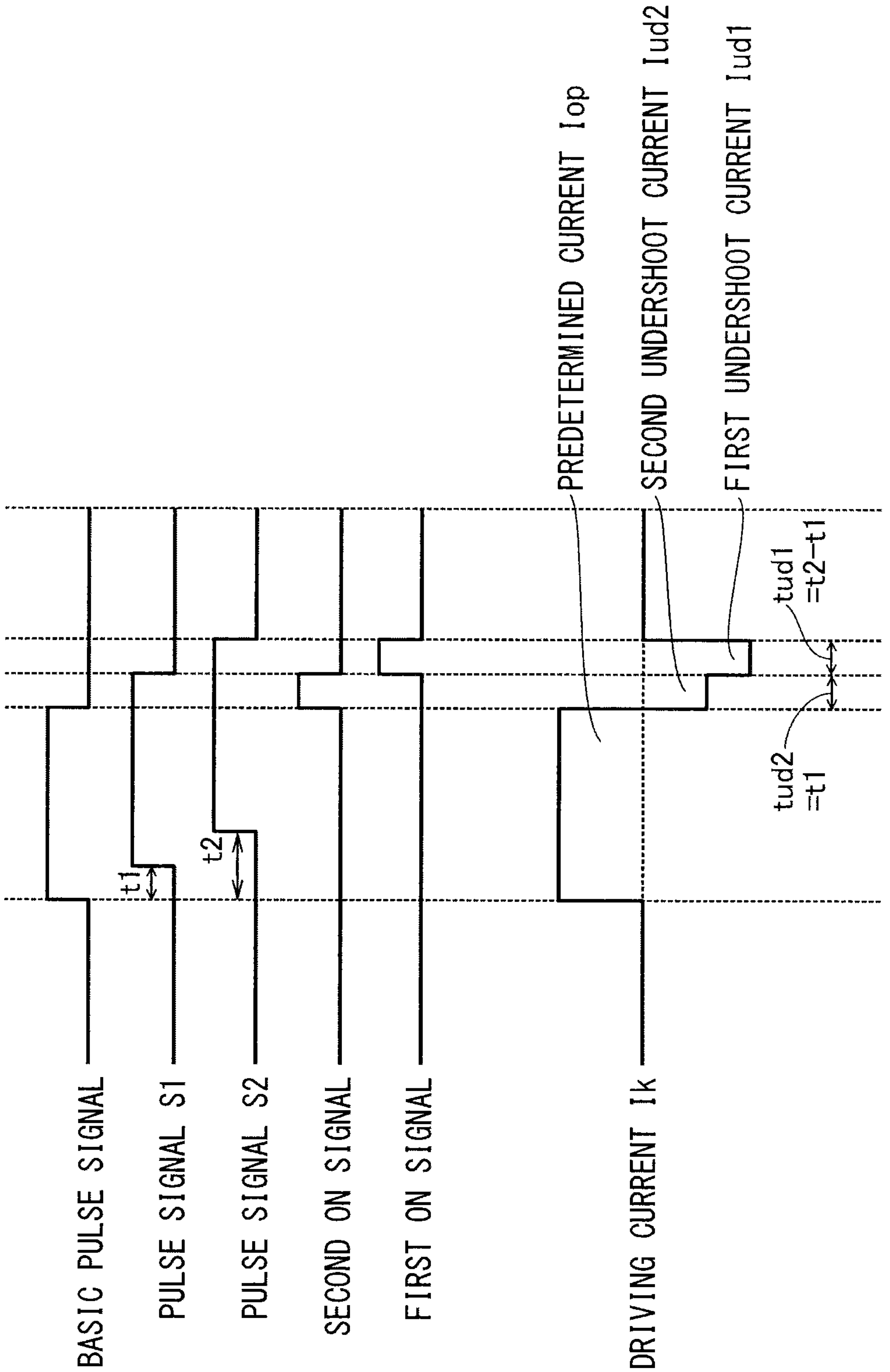
FIG. 38 is a view describing generation of a first ON signal and a second ON signal.

The generation of the first ON signal and the second ON signal with the pulse generator 112 of the present embodiment will be described with reference to FIG. 38. FIG. 38 is a view describing the generation of the first and second ON signals.

The pulse generator 112 of this example obtains, for example, a delay time t1 and a delay time t2 from the delay time memory 122.

The delay time t1 is a time which conforms to the second undershoot period tud2. The delay time t2 is a time which conforms to the total of the first undershoot period tud1 and the second undershoot period tud2. The pulse generator 112 generates a pulse signal S1 in which the basic pulse signal is delayed by the delay time t1 and a pulse signal S2 in which the basic pulse signal is delayed by the delay time t2. The pulse generator 112 generates the second ON signal in which the second undershoot period tud2 is ON (high level) when the basic pulse signal is at a low level and the pulse signals S1, S2 are at a high level. The pulse generator 112 generates the first ON signal in which the first undershoot period tud1 is ON (high level) when the basic pulse signal and the pulse signal S1 are at a low level and the pulse signal S2 is at a high level.

In this example, the delay times t1, t2 can be set such that the first undershoot period tud1 and the second undershoot period tud2 are equal.

In this example, the delay times t1, t2 are stored in the memory 120, but these are not limited thereto. The delay times t1, t2 of this example can be obtained by another method in addition to the above method. The pulse generator 112 of this example can generate the pulse signals S1, S2 by an inverter line or buffer line, for example. In this example, after delaying the basic pulse signal with a lower pass filter including a resistance and a capacitor, a waveform-shaped signal can be used as the pulse signals S1, S2. In both cases, the delay amount can be easily changed by changing the number of stages and the filter constant.

Figure 39:
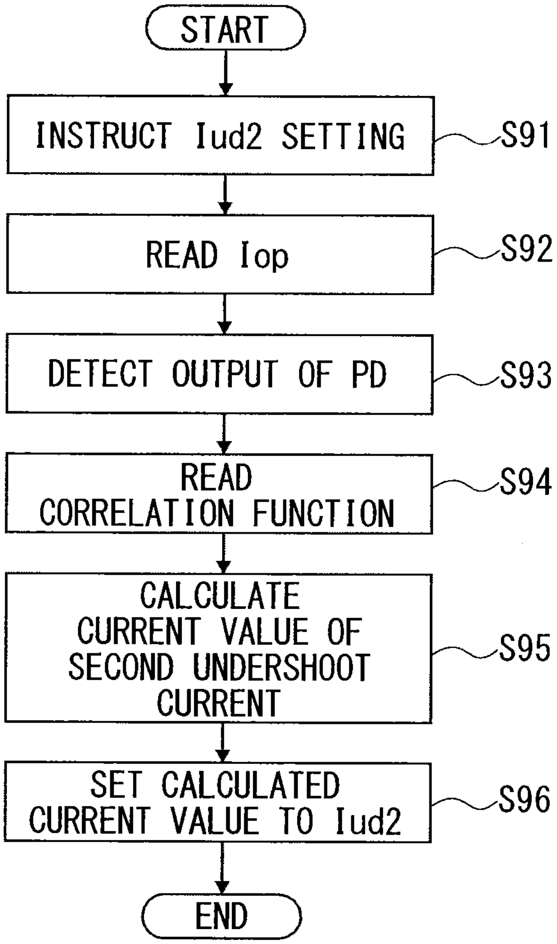
FIG. 39 is a flowchart describing a process of an undershoot current adjustor.

Next, the process of the undershoot current adjuster 114 of this example will be described with reference to FIG. 39. FIG. 39 is the flowchart describing the process of the undershoot current adjuster.

At first, the CPU 110 receives the instruction for setting the second undershoot current Iud2 (step S91). In this example, after disconnecting the supply of the driving current Ik to the LD from the light source-driving circuit 100, for example, the CPU 110 receives the setting instruction at the re-start of the supply of the driving current Ik to the LD. This setting instruction can be informed to the CPU 110 from a not-shown main CPU which controls the entire operation of the image-forming apparatus 10. In this example, the CPU 110 receives the setting instruction when the image-forming apparatus 10 starts up from a sleep mode or a door provided in the chamber of the image-forming apparatus 100 is closed after opening.

Next, the undershoot current adjuster 114 reads a value of the predetermined current Top from the current value memory 121 (step S92). Next, the undershoot current adjuster 114 detects the output of the PD through the ADC 140 (step S93).

Next, the undershoot current adjuster 114 reads the correlation function from the correction function memory 123 of the memory 120 (Step S94). The correlation function of this example is a function of the light volume of the LD and the value of the second undershoot current Iud2. In this example, it is possible to make connection between the output of the PD which is the light volume of the LD and the value of the second undershoot current Iud2.

This correlation function is a function obtained by changing the light volume of the LD, and performing an experiment or the like which samples an appropriate value of the second undershoot current Iud2. It can be a function shown by a primary approximation or a secondary approximation.

Next, the undershoot current adjuster 114 calculates the value of the second undershoot current Iud2 based on the output of the PD and the read correlation function (Step S95). Next, the undershoot current adjuster 114 stores the calculated value in the current value memory 121 as the set value of the second undershoot current Iud2 (Step S94). When the set value of the second undershoot current Iud2 is stored in the current value memory 121, the current comparing controller 113 outputs a current corresponding to the set value to the second undershoot current source 240 through the DAC 130.

In this example, the relationship between the value of the second undershoot current Iud2 and the output of the PD is shown by the correlation relationship. However, it is not limited thereto. The relationship between the value of the second undershoot current Iud2 and the output of the PD can be stored in the memory 120 as a lookup table in which each value has correspondence, for example. More specifically, in this example, associated information of the value of the second undershoot current Iud2 and the output of the PD can be stored in the memory 120. This associated information can be a function or a table, for example. In this example, the second undershoot current Iud2 can be easily adjusted with the associated information.

The present example as described above includes the first undershoot current Iud1 which is a fixed value set in the driving current Ik based on the parasitic capacity C and the second undershoot current Iud2 adjusted according to the light volume of the LD as a light source. According to the present example, the electric potential can be accurately stabilized at a high speed from the emission electric potential to the target electric potential just after the turning-off of the LD. According to the present example, the rounding of the falling of the light output waveform of the LD is improved, and the response property of the light output can be improved.

Figure 40A:
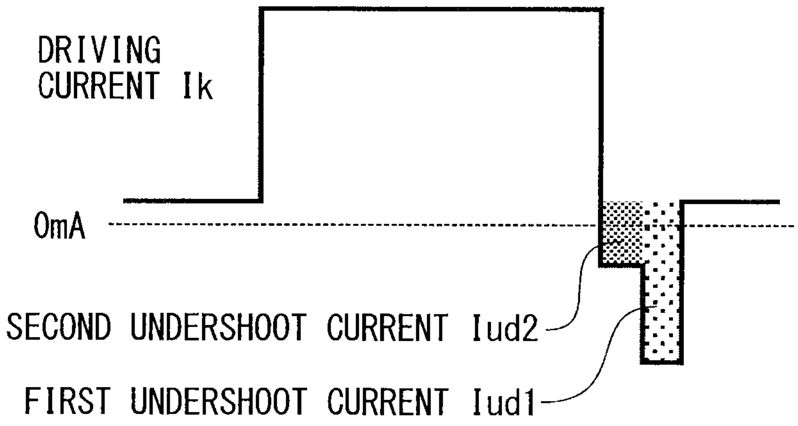
FIGS. 40A, 40B are views each illustrating a fluctuation in a second undershoot current Iud 2 according to a change in the light volume.
Figure 40B:
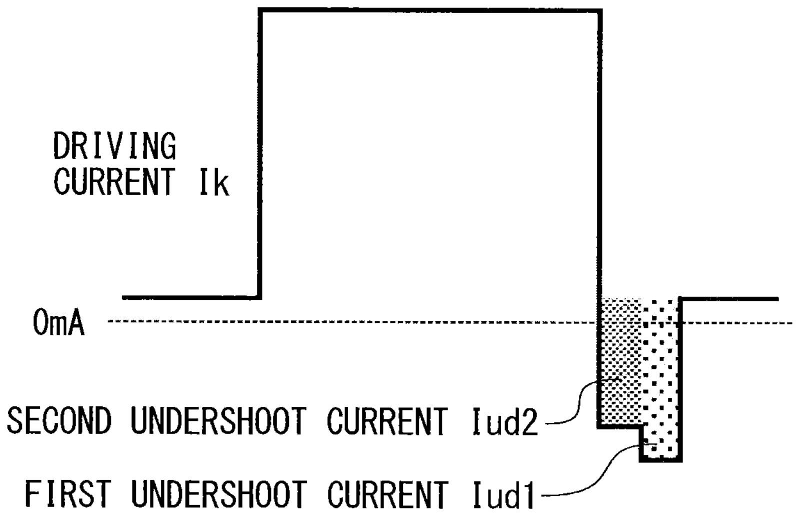

FIGS. 40A, 40B illustrate a variation in the second undershoot current Iud2 when the light volume is changed. FIG. 40A illustrates the driving current Ik when the light volume of the LD is small. FIG. 40B illustrates the driving current Ik when the light volume of the LD is large.

In the driving current Ik of this example, the value of the second undershoot current Iud2 varies according to a variation in the light volume of the LD. In the example illustrated in FIGS. 40A, 40B, the value of the second undershoot current Iud2 increases in accordance with an increase in the light volume. In this example, by adjusting the value of the second undershoot current Iud2 according to the variation in the light volume, the electric potential of the LD can be stabilized in a target electric potential at a high speed.

Figure 41A:
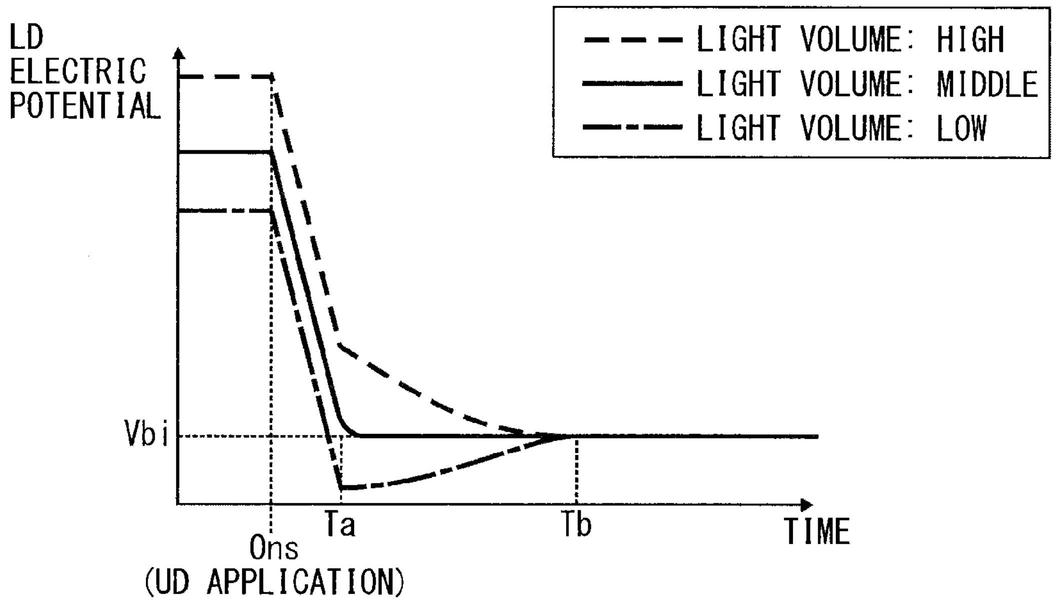
FIGS. 41A, 41B are views each illustrating transition in an electric potential of a light source with respect to each light volume.
Figure 41B:
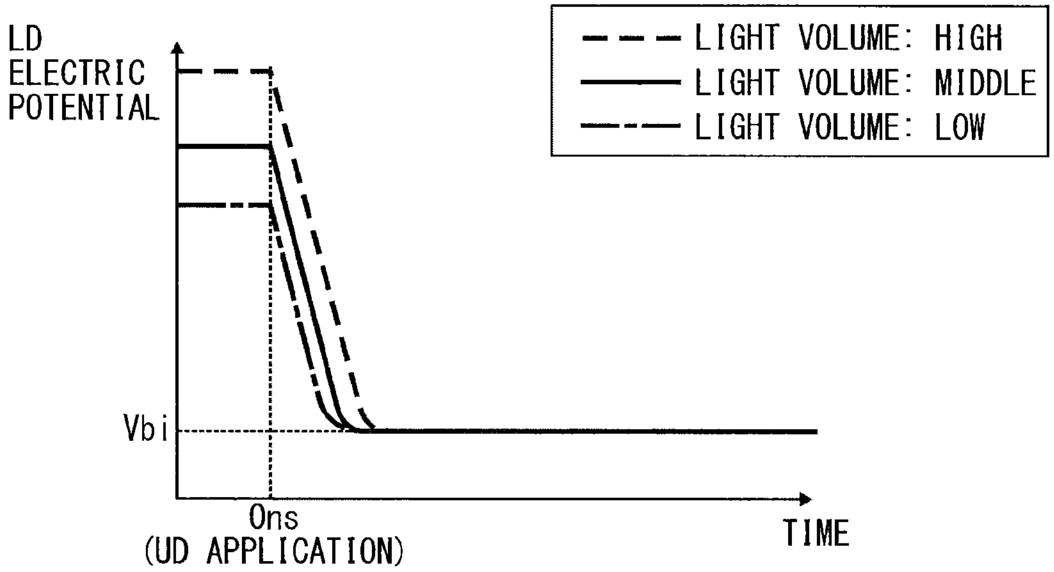

FIGS. 41A, 41B are views illustrating the transition of the electric potential of the light source with respect to each light volume. FIG. 41A illustrates an example in which the value of the undershoot current is constant, and FIG. 41B illustrates an example in which the value of the second undershoot current Iud2 of the example is adjusted.

When the undershoot current is constant, as illustrated in FIG. 41A, the electric potential of the LD just after the application of the undershoot current differs with respect to each light volume. The electric potential of the LD therefore varies in the delay time T until the electric potential of the LD is stabilized in the target electric potential according to the variation in the light volume. In the example in FIG. 41A, the delay time in the low light volume of the LD and in the high light volume of the LD is Tb whereas the delay time in the middle light volume of the LD is Ta.

On the other hand, in this example, the second undershoot current Iud2 is adjusted according to the light volume of the LD. The total charge amount of the undershoot current is therefore adjusted to be the charge amount which changes the electric potential of the LD to the target electric potential even if the light volume of the LD fluctuates. When applying the driving current Ik of the present example to the LD, the electric charge amount which changes the electric potential of the LD to the target electric potential is discharged by the first and second undershoot currents Iud1, Iud2 after turning off the LD. In addition, the target electric potential of this example is a bias electric potential.

Accordingly, in the present embodiment, as illustrated in FIG. 41B, the electric potential (emission potential) of the LD can be stabilized at a high speed from the electric potential of the LD to the target electric potential even if the light volume of the LD varies.

Accordingly, in this example, the stabilized light output waveform can be obtained regardless of the turning-on cycle and turning-off time width. In this example, an image-forming apparatus having improved pixel reproducibility and good tone reproducibility especially in a low concentration can be therefore achieved.

Figure 42A:
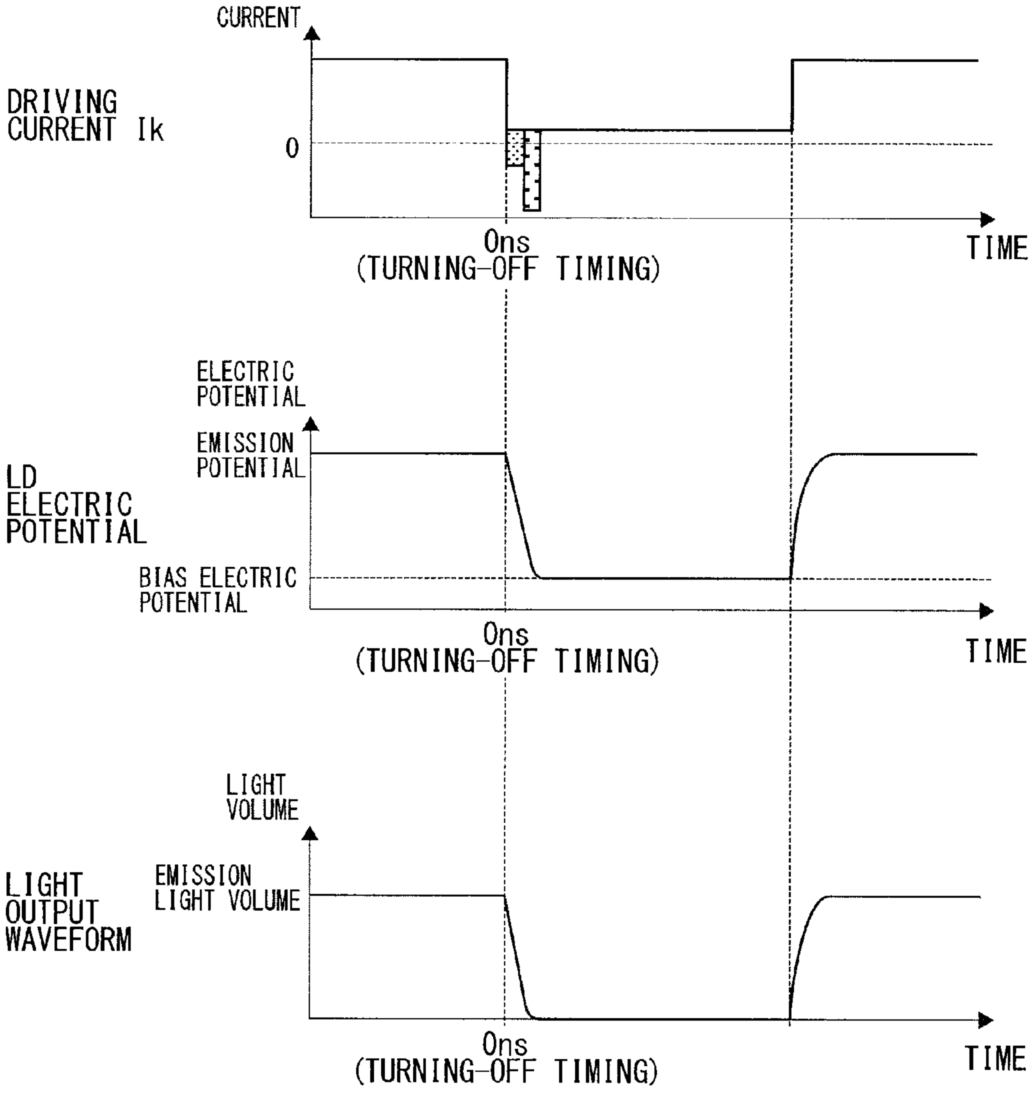
FIGS. 42A, 42B are views each describing an optical output waveform when a value of a second undershoot current is adjusted.
Figure 42B:
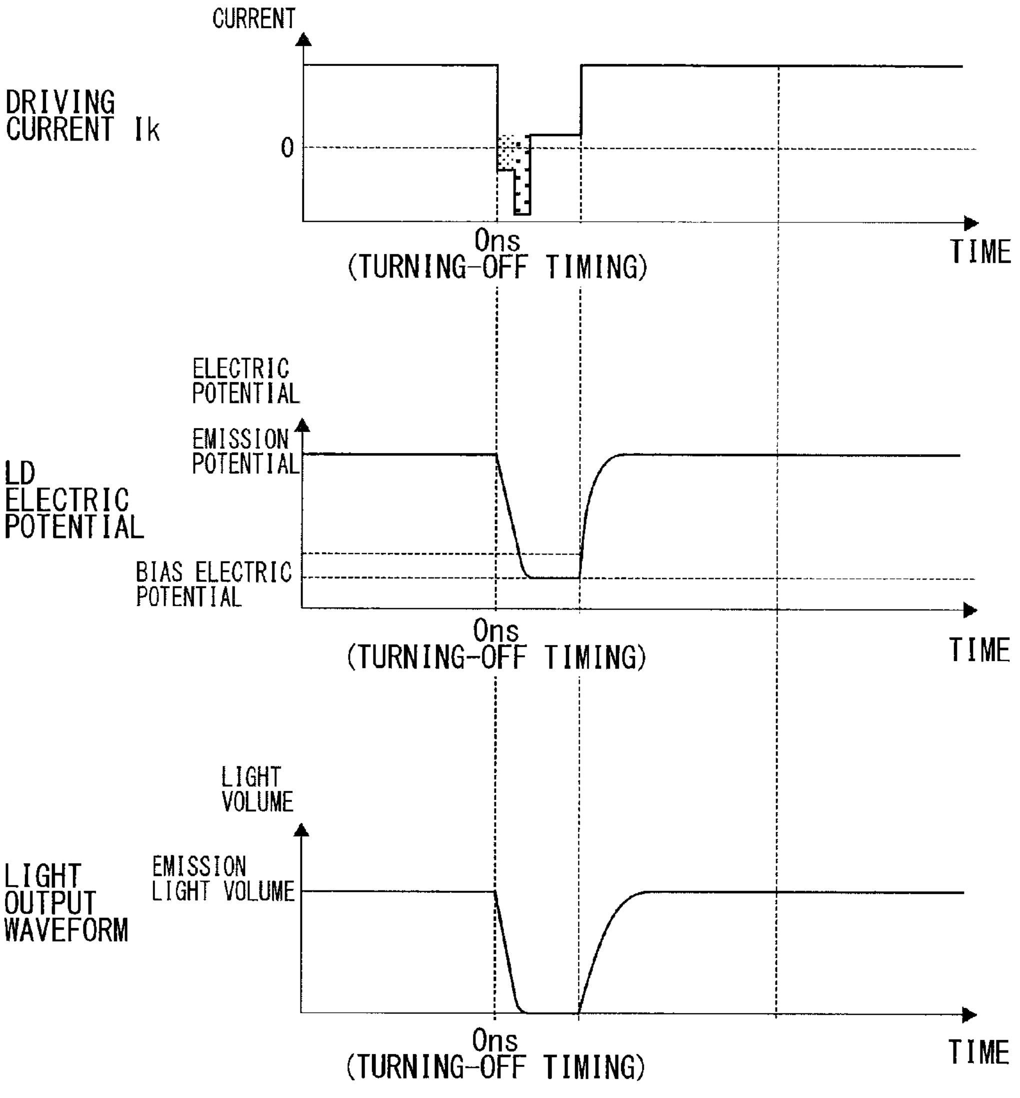

FIGS. 42A, 42B are views illustrating the light output waveform when the value of the second undershoot current is adjusted. FIG. 42A illustrates the light output waveform when the LD OFF time which turns off the LD is long, and FIG. 42B illustrates the light output waveform when the LD OFF time is short.

As is apparent from FIGS. 42A, 42B, in the present example, by applying the first and second undershoot currents Iud1, Iud2 to the LD, the electric potential of the LD is stabilized at a high speed. In the present example, the falling of the light output waveform does not round. In the present example, the rising of the light waveform can be therefore a constant regardless of the LD OFF time.

Figure 43A:
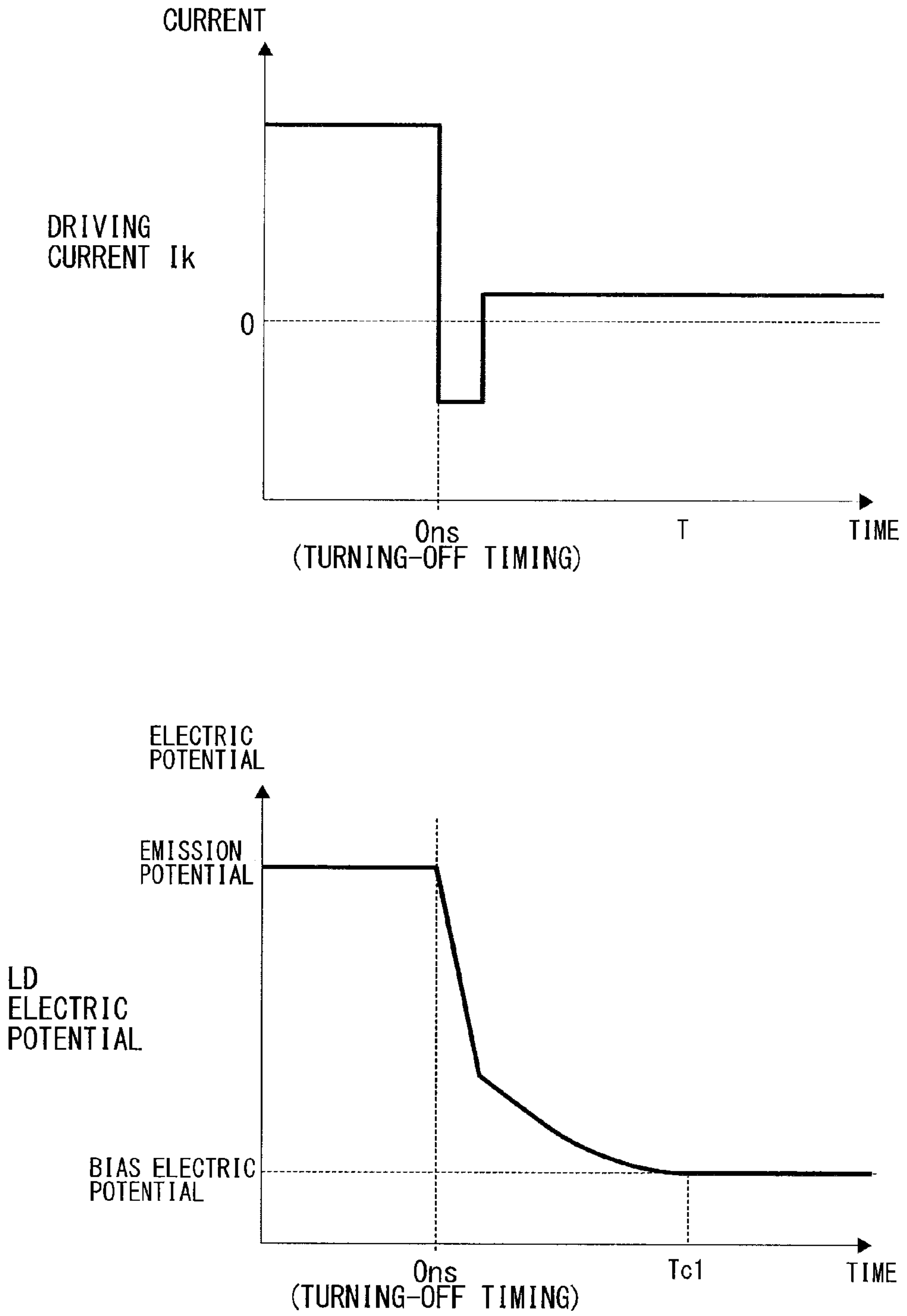
FIGS. 43A, 43B are views each describing differences in electric potentials of LDs when an undershoot current differs.
Figure 43B:
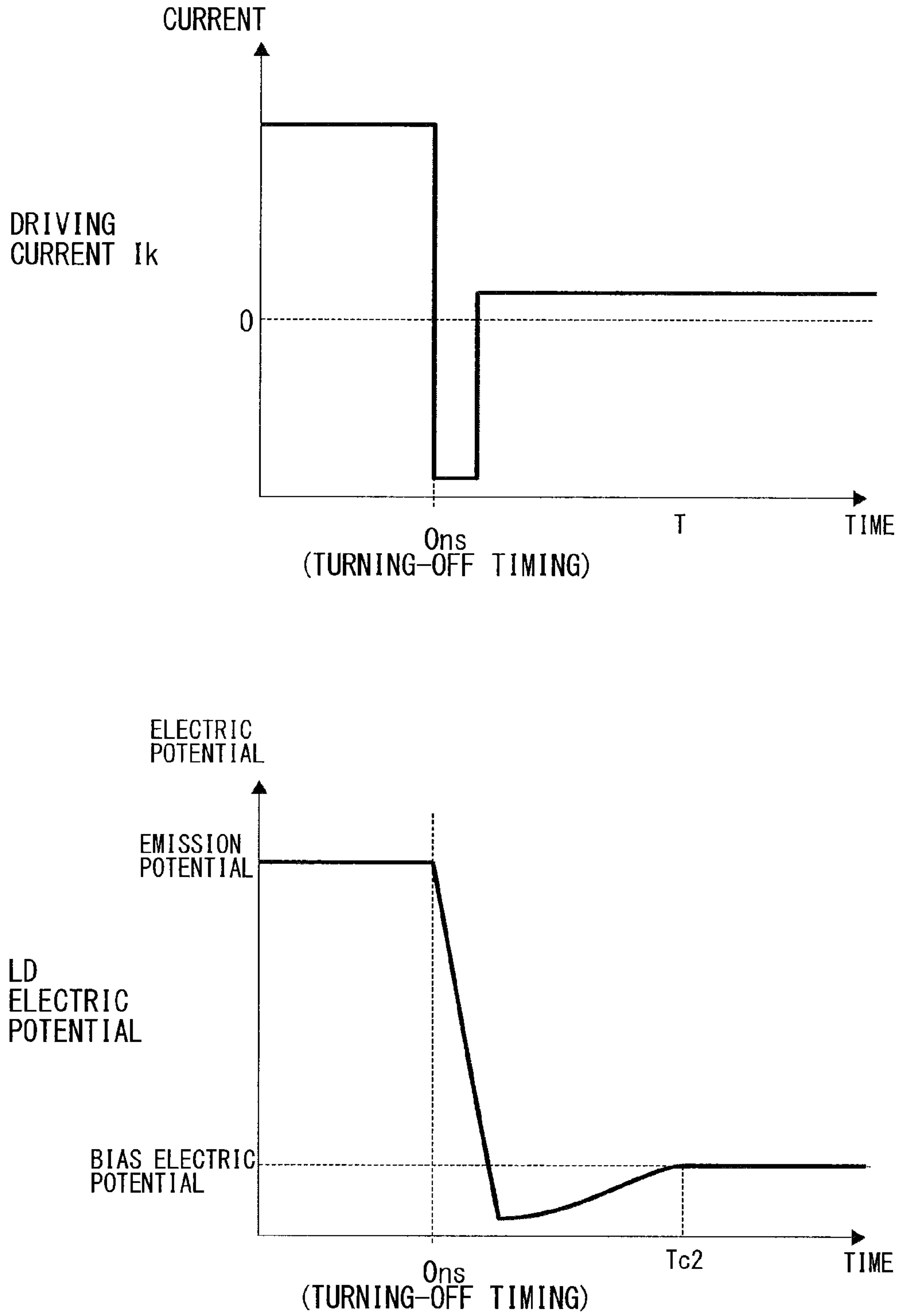

FIGS. 43A, 43B are views each illustrating a difference in the electric potential of the LD when the undershoot current differs.

FIGS. 43A, 43B illustrate differences in the electric potentials of the LD just after the application of the undershoot current according to the undershoot current when the value of the undershoot current is a fixed value.

In the example in FIG. 43A, the value of the undershoot current is relatively small, the electric potential of the LD just after the application of the undershoot current becomes higher than the bias electric potential, and the electric potential of the LD slowly lowers to the bias electric potential. In this case, the delay time Tc1 occurs until the electric potential of the LD is stabilized in the bias electric potential.

In the example of FIG. 43B, the value of the undershoot current is relatively large, the electric potential of the LD just after the application of the undershoot current becomes lower than the bias electric potential, and the electric potential slowly increases to the bias electric potential. In this case, the delay time Tc2 occurs until the electric potential of the LD is stabilized in the bias electric potential.

When the value of the undershoot current is a fixed value, the delay times Tc1, Tc2 do not fluctuate. When the LD OFF time which is the turning-off period of the LD is shorter than the delay time Tc1 or Tc2, for example, the driving current Ik is again applied to the LD before the electric potential of the LD is stabilized in the bias electric potential. The electric potential level of the LD differs in the rising, affecting the oscillation delay and the response of the rising of the light output waveform. These become apparent as the difference in the emission amount and the response waveform.

Figure 44A:
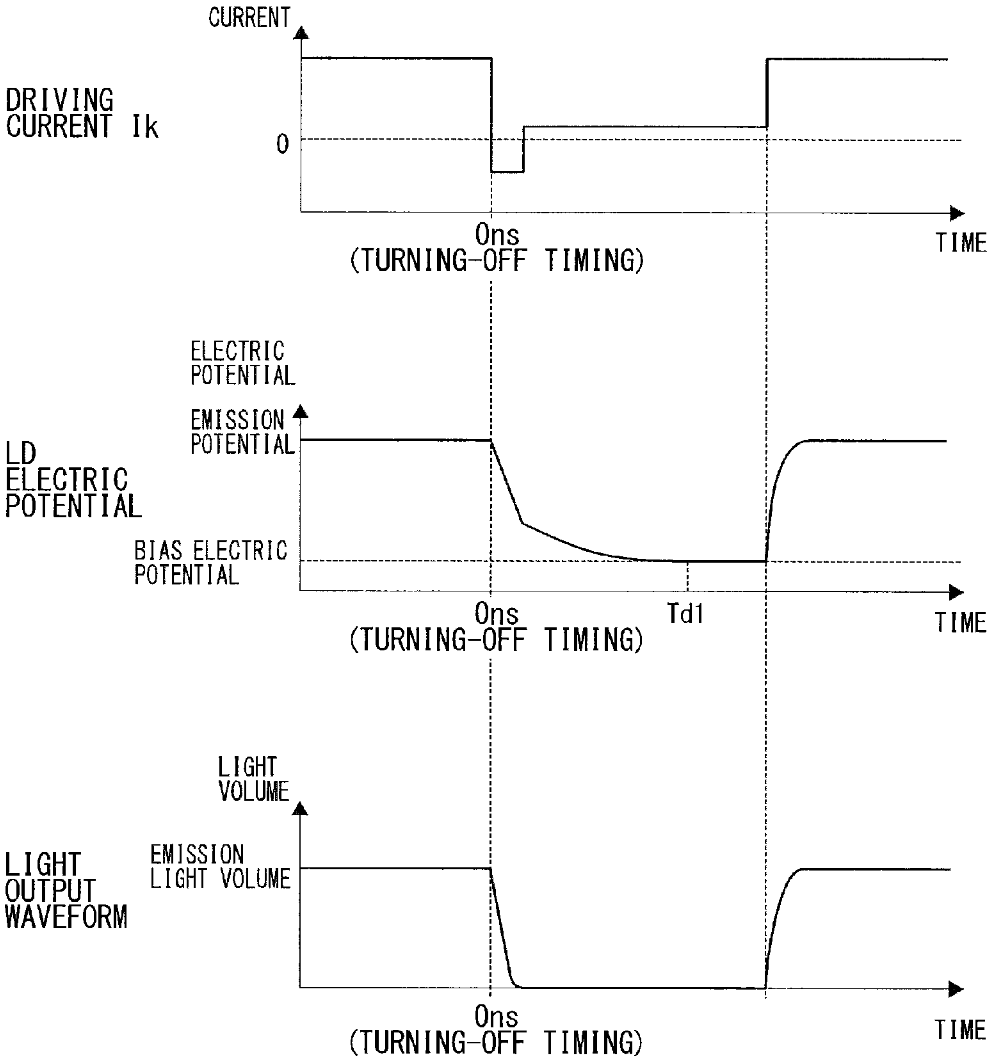
FIGS. 44A, 44B are first views each describing a difference in optical output waveforms according to a difference in LD off times.
Figure 44B:
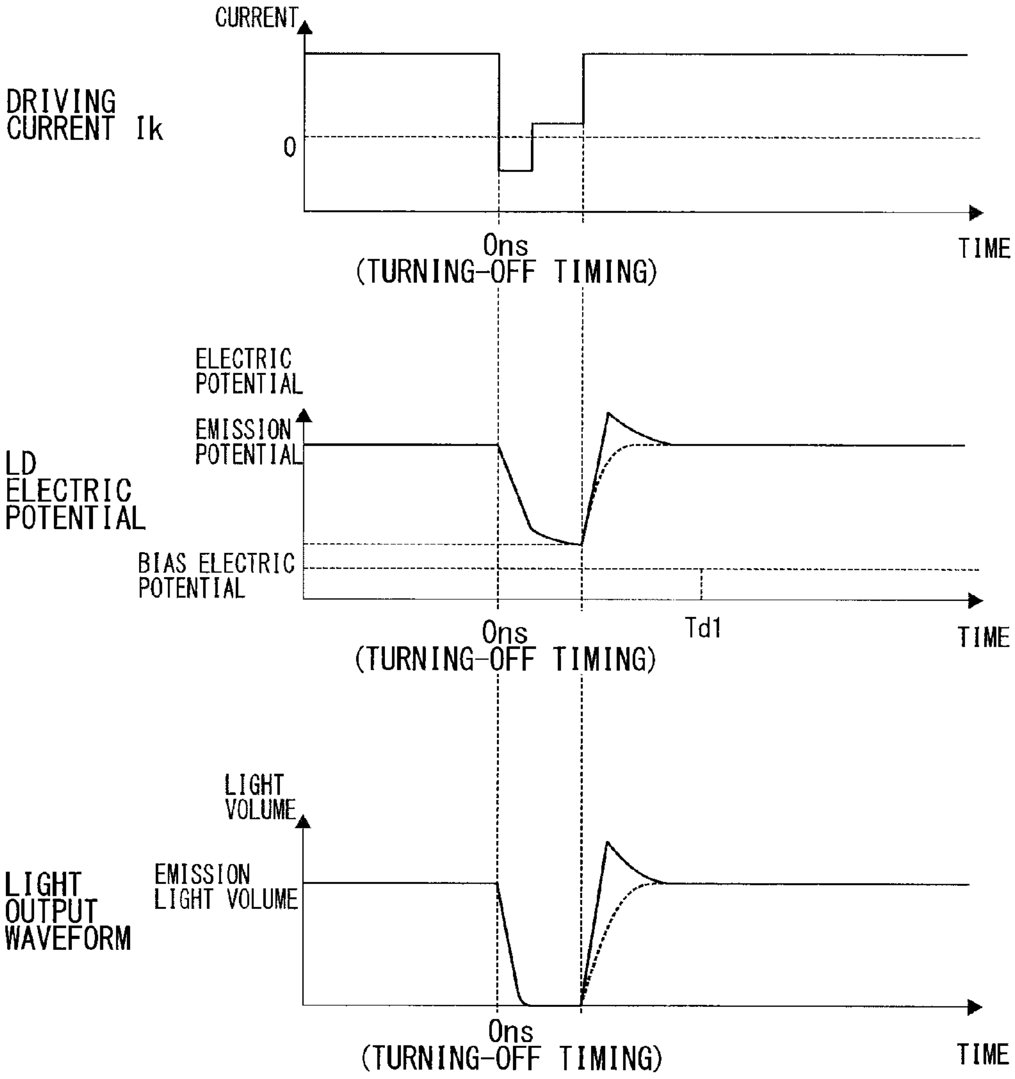

FIGS. 44A, 44B are first views each describing a difference in the light output waveform based on a difference in the LD OFF time.

FIGS. 44A, 44B illustrate examples when the value of the undershoot current is relatively small. FIG. 44A illustrates when the LD OFF time is long, and FIG. 44B illustrates when the LD OFF time is short.

When the LD OFF time is longer than the delay time Td1 until the electric potential of the LD is stabilized in the bias electric potential as illustrated in FIG. 44A, the predetermined current Iop is supplied under a condition in which the electric potential of the LD is stabilized in the bias electric potential, so that the electric potential of the LD is ideally changed to the emission electric potential, and the light waveform ideally rises.

On the other hand, when the LD OFF time is shorter than the delay time Td1 as illustrated in FIG. 44B, the predetermined current Top is applied before the electric potential of the LD is lowered to the bias electric potential, namely, under a condition in which the electric potential of the LD is higher than the bias electric potential. Therefore, the electric potential of the LD temporarily exceeds the emission electric potential, and the light output is temporarily overemitted.

Figure 45A:
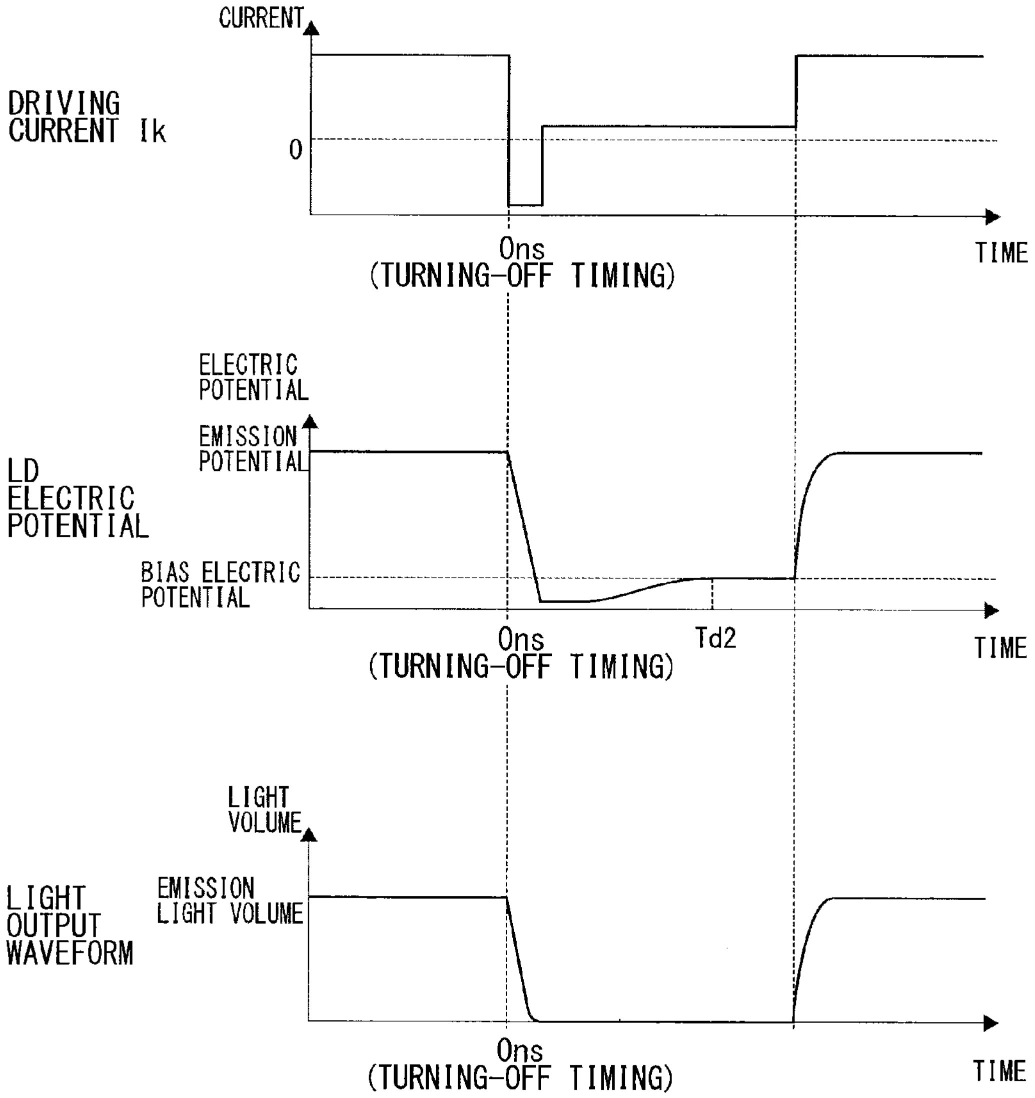
FIGS. 45A, 45B are second views each describing a difference in optical output waveforms according to a difference in LD off times.
Figure 45B:
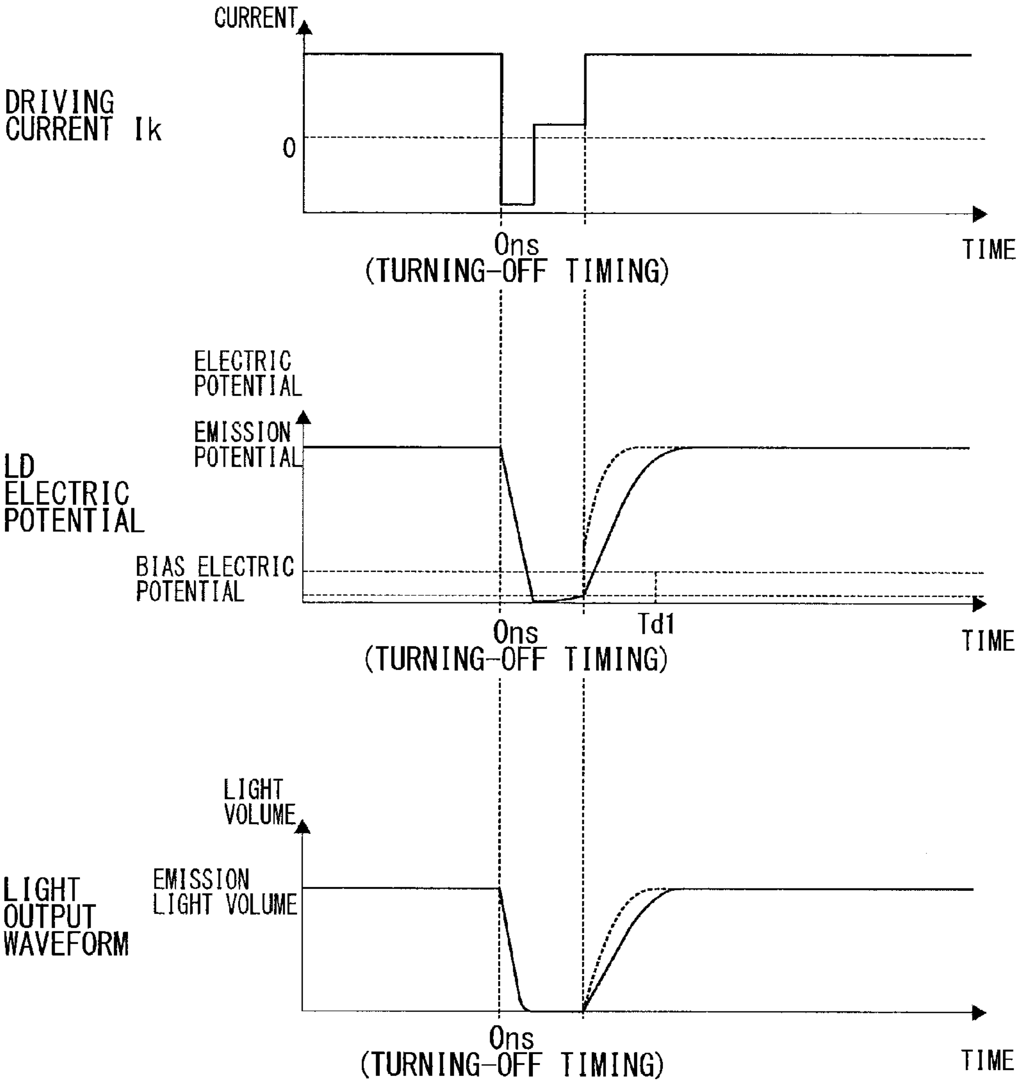

FIGS. 45A, 45B are second views each describing a difference in the light output waveform based on a difference in the LD OFF time.

FIGS. 45A, 45B illustrate an example when the value of the undershoot current is relatively small. FIG. 45A illustrates when the LD OFF time is long, and FIG. 45B illustrates when the LD OFF time is short.

FIGS. 45A, 45B are similar to FIGS. 44A, 44B. As illustrated in FIG. 45A, when the LD OFF time is longer than the delay time Td2 until the electric potential of the LD is stabilized in the bias electric potential, the electric potential of the LD ideally changes to the emission electric potential, and the light waveform ideally rises.

In contrast, as illustrated in FIG. 45B, when the LD OFF time is shorter than the delay time Td2, the predetermined current Iop is applied before the electric potential of the LD is increased to the bias electric potential, namely, under a condition in which the electric potential of the LD is lower than the bias electric potential. For this reason, it takes time for the electric potential of the LD to increase to the emission electric potential, and the rising of the light output waveform rounds compared to ideal rising.

In the present example, the above problem is solved by providing the second undershoot current Iud2 which is adjusted according to the light volume of the LD.

Specifically, a conventional large package LD has fluctuating factors of various response properties such as an increase in a parasitic capacity or an increase in a resistance component according to a wavelength range. Comparing to an infrared semiconductor laser having a wavelength of a 780 nm, for example, an infrared semiconductor laser having a wavelength of 650 nm generally has a large differential resistance, so that it is not always possible to obtain a response of light output at a high speed, and the rounding in the waveform may be generated. The infrared semiconductor laser such as VCSEL (Vertical Cavity Surface Emitting Laser) includes a very large differential resistance such as several hundred Ω compared to an edge emitting type laser based on a structural difference. The time constant of CR therefore occurs based on the terminal capacity of the VCSEL, the parasitic capacity of the substrate on which the VCSEL is mounted, the terminal capacity of the driver, or the like. For this reason, the VCSEL cannot obtain a desired response of the light output at a high speed when the VCSEL is mounted on the substrate even if the VCSEL has an element feature which can be modulated at a high speed or a cutoff frequency Ft.

In this example, the light output waveform is corrected based on the parasitic capacity, differential resistance or the like even if any kind of light source is used, so that the response property of the light output waveform can be improved. In the present example, the undershoot charge amount by the first and second undershoot currents Iud1, Iud2 is applied by the amount which changes the electric potential of the LD to the target electric potential in the turning-off from the emission electric potential. In the present example, the electric potential of the LD can be lowered to the target electric potential at a high speed in the turning-off, and the electric potential of the LD when turning on the LD next can be the target electric potential regardless of the length of the LD OFF time.

As described above, according to the present example, the variation in the response of the light waveform output is reduced, the reproducibility of the light output waveform can be improved, and the response property of the light output waveform can be improved.

In the present example, the first undershoot current Iud1 is applied after the second undershoot current Iud2 is applied to the LD. However, it is not limited thereto. The first and second undershoot currents Iud1, Iud2 can be simultaneously applied to the LD, for example.

Figure 46:
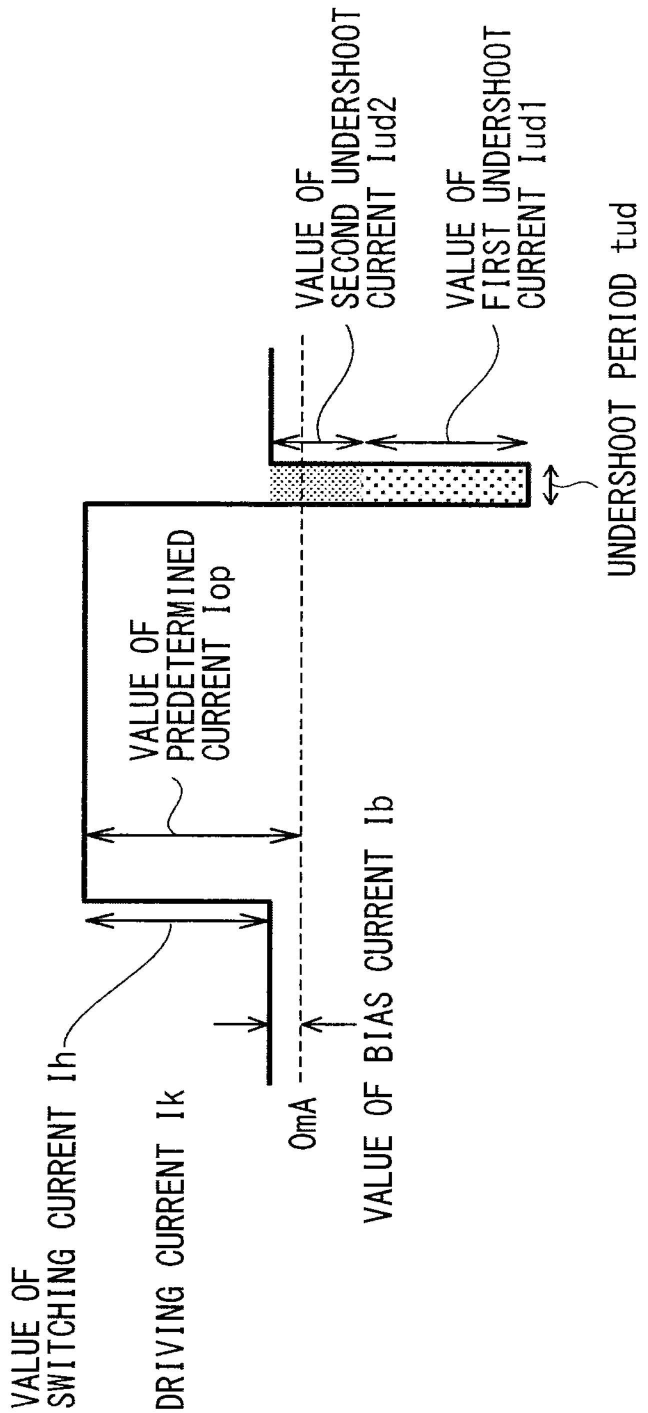
FIG. 46 is a view illustrating an example of a driving current waveform when first and second undershoot currents are simultaneously applied to the LD.

FIG. 46 is a view illustrating a driving current waveform when the first and second undershoot currents are simultaneously applied.

In the example illustrated in FIG. 46, the first and second undershoot currents Iud1, Iud2 are simultaneously applied, and the first undershoot period tud1 and the second undershoot period tud2 are equalized. With this configuration, the undershoot current can be applied to the LD at a higher speed, and the delay time T can be shortened.

In the example in FIG. 46, even if the LD OFF time is further shortened about several nsec, the first and second undershoot currents Iud1, Iud2 can be applied to the LD. When the maximum pulse width is 75% duty under the actual use condition of one pixel, for example, it is necessary to set the minimum OFF time to 25%, namely, ¼ pixel. In this case, if the turning-on time of the LD of one pixel is 10 nsec, the minimum LD OFF time becomes 2.5 nsec. Thus, it is necessary to set the applied time of the first and second undershoot currents Iud1, Iud2 to be shorter than 2.5 nsec.

In the example of FIG. 46, the application of the first and second undershoot currents Iud1, Iud2 is effective when the LD OFF time is short as described above.

In addition, when the driving current Ik has a waveform as illustrated in FIG. 46, in the light source-driving circuit 100 of the present example, the first undershoot current source 230 and the second undershoot current source 240 can be shared. In this case, the switch 231 and the switch 241 are also shared.

Second Example

Second Example of the present invention will be hereinafter described with reference to the drawings. Second Example differs from First Example in that the driving current Ik does not include the bias current Ib. Differences between First Example and Second Example are only described in the following description of Second Example. Reference numbers which are the same as those in First Example are applied to configurations which are similar to those in First Example; thus, the detailed description thereof will be omitted.

Figure 47:
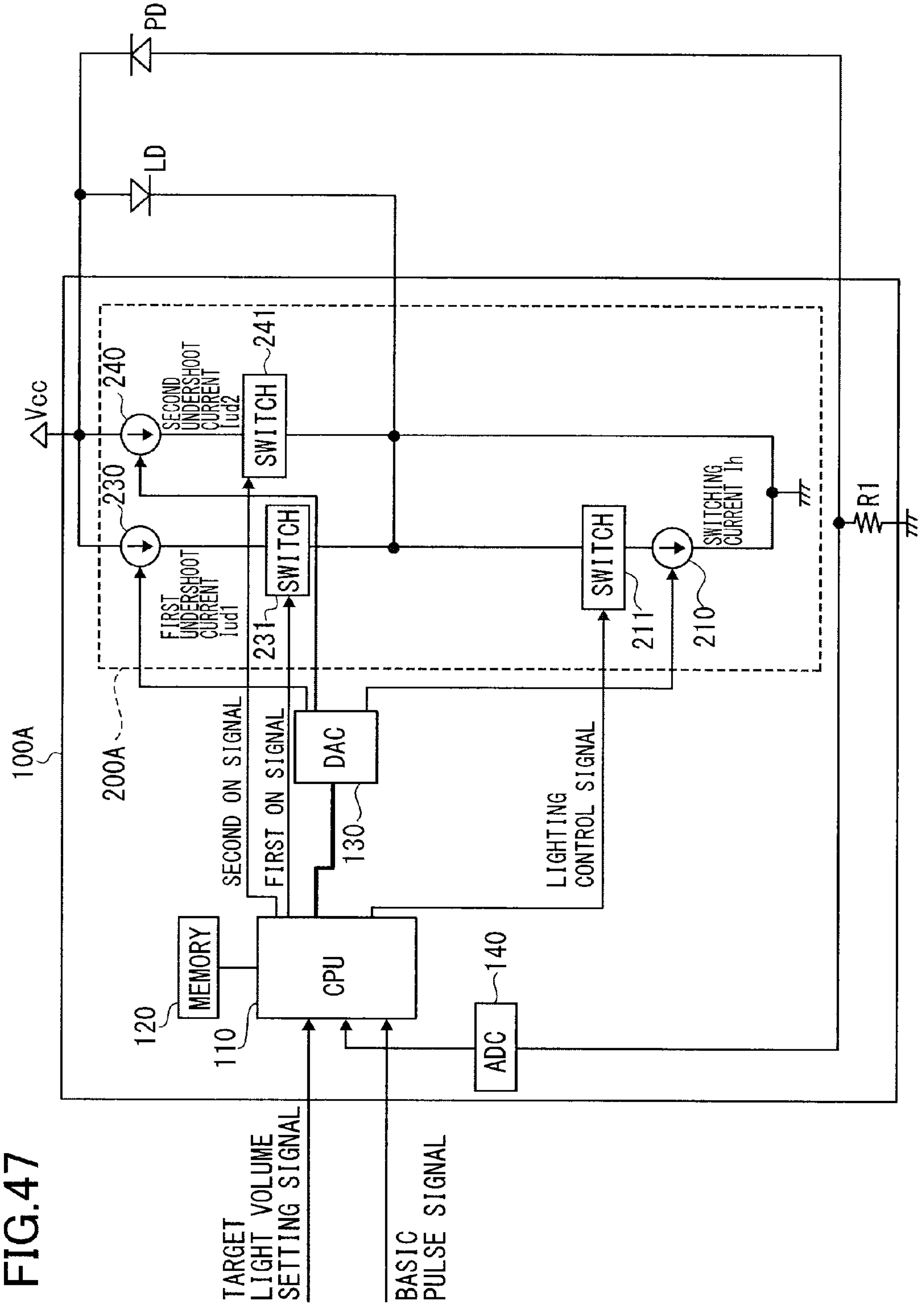
FIG. 47 is a view describing a light source-driving circuit according to Second Example.

FIG. 47 is a view illustrating a light source-driving circuit of Second Example.

A light source-driving circuit 100A of the present example includes a CPU (Central Processing Unit) 110, memory 120, DAC (Digital-to-Analog Converter) 130, ADC (Analog-to-Digital Converter) 140, LD driver 200A, and resistance R1.

The LD driver 200A of the present example includes a switching current source 210, first undershoot current source 230, second undershoot current source 240, and switches 211, 231, 241 which control the connection between an LD and each current source.

Figure 48:
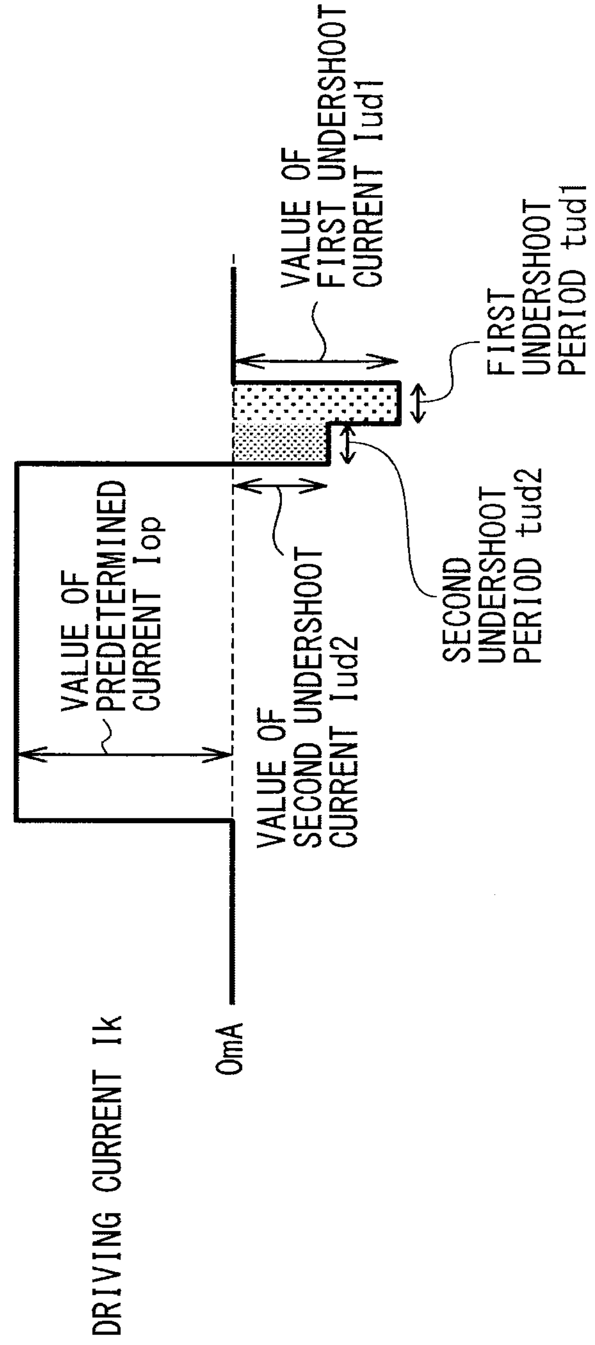
FIG. 48 is a view illustrating an example of a driving current waveform according to Second Example.

FIG. 48 is a view illustrating an example of the driving current waveform in Second Example. In the driving current Ik of the present example, the predetermined current Top only includes a switching current Ih, and does not include a bias current Ib.

In the present example, the driving current Ik does not include the bias current Ib, so that the target electric potential which converges after the turning off of the LD becomes 0. In the present embodiment, the amount of the first undershoot current Iud1 is set to the current amount which sets the electric potential of the LD after the turning-off of the LD to the zero electric potential, namely, the current amount which sets the charged amount of the parasitic capacity C to zero. In addition, the amount of the first undershoot current Iud1 is obtained by a product of the value of the first undershoot current Iud1 and the first undershoot period tud1.

The second undershoot current Iud2 is set according to the light volume value calculated similar to First Example.

In the present embodiment, by setting the values of the first and second undershoot currents Iud1, Iud2 as described above, the electric potential of the LD after the application of the first undershoot current Iud1 can be stabilized in the zero electric potential at a high speed. Therefore, the response property of the light output waveform can be improved.

Third Example

Third Example of the present invention will be hereinafter described with reference to the drawings. Third Example of the present invention differs from First Example in that the driving current Ik includes an overshoot current Iov. In the description of Third Example, differences between First Example and Third Example are only described, and the reference numbers which are the same as those in First Example are applied to configurations which are the same as those in First Example; thus, the description thereof will be omitted.

Figure 49:
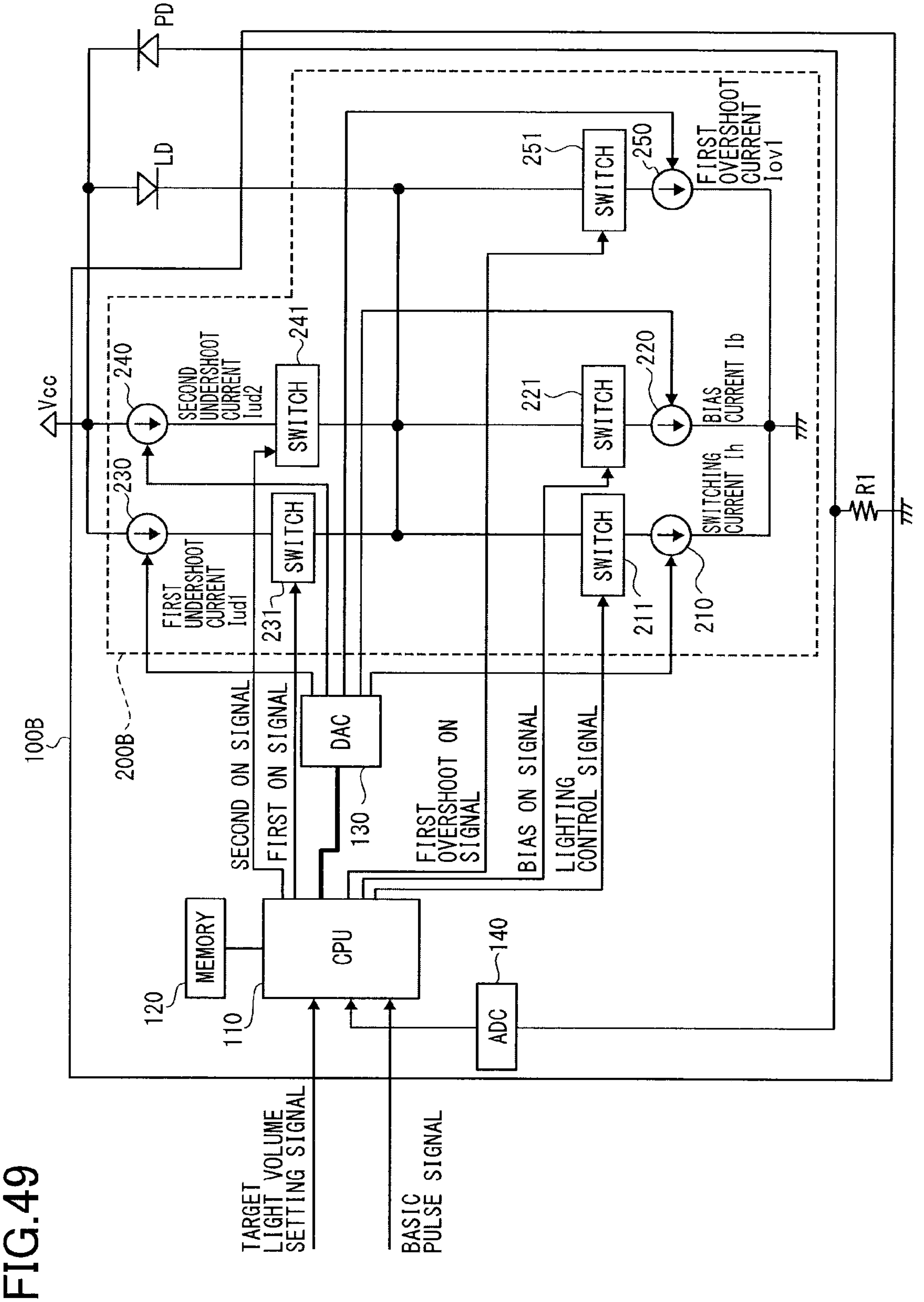
FIG. 49 is a view describing a light source-driving circuit according to Third Example.

FIG. 49 is a view illustrating a light source-driving circuit of Third Example.

A light source-driving circuit 100 of the present example includes a CPU (Central Processing Unit) 110, memory 120, DAC (Digital-to-Analog Converter) 130, ADC (Analog-to-Digital Converter) 140, LD driver 200B, and resistance RI.

The LD driver 200B of the present example includes a switching current source 210, bias current source 220, first undershoot current source 230, second undershoot current source 240, overshoot current source 250, and switches 211, 231, 241, 251 which control the connection between each current source and an LD.

The overshoot current Iov of the present example is applied to the LD in synchronization with the switching current Ih. The overshoot current Iov has an effect which increases a speed for charging the parasitic capacity C, and improves the rounding in the waveform by the differential resistance of the LD.

Figure 50:
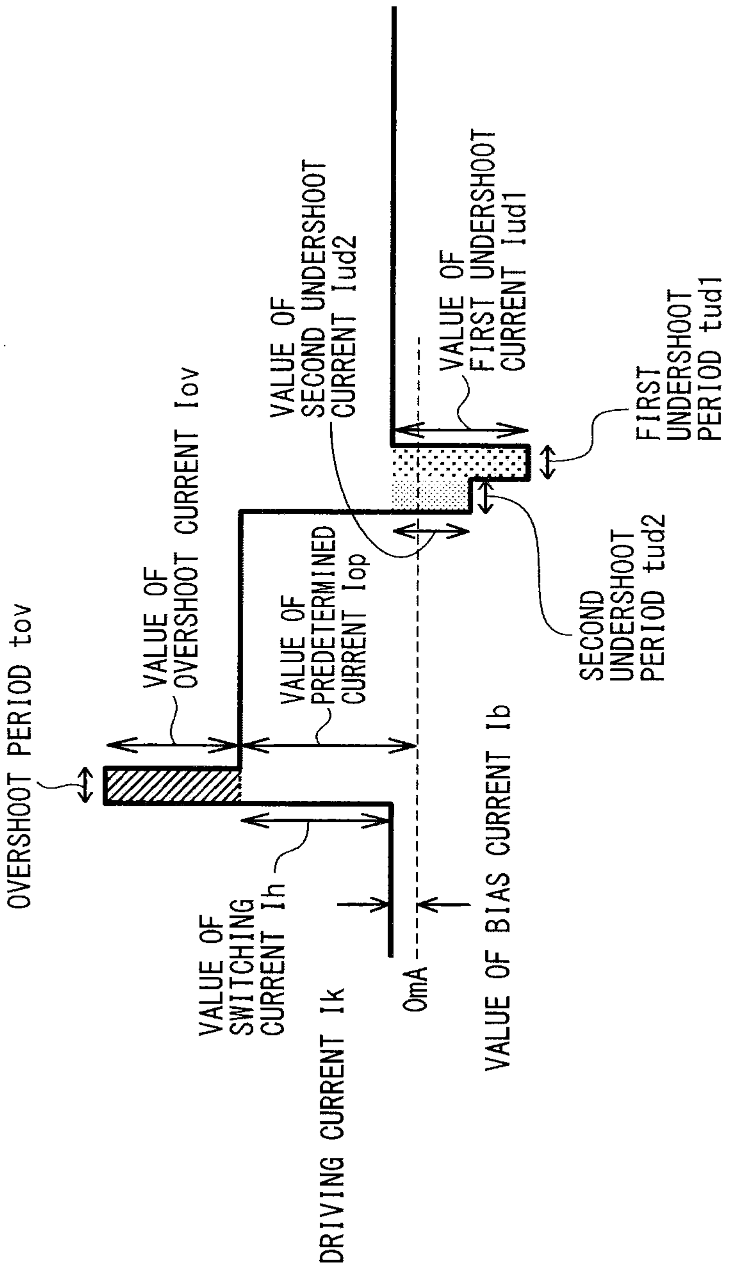
FIG. 50 is a view illustrating an example of a driving current waveform according to Third Example.

FIG. 50 is a view illustrating an example of the driving current waveform of Third Example. The driving current Ik of the present example includes an overshoot current Iov which is applied in synchronization with the predetermined current Top.

The amount of the overshoot current Iov in the present example is set to be equal to the sum of the amount of the first undershoot current Iud1 and the amount of the second undershoot current Iud2. In addition, the amount of the overshoot current Iov is obtained by the product of the value of the overshoot current Iov and the overshoot period tov in which the overshoot current Toy is applied to the LD. The value of the overshoot current Iov is previously stored in the current value memory 121 of the memory 120 in the present example. The delay time for generating the pulse signal which turns on the switch 251 during the overshoot period tov can be previously stored in the delay time memory 122 of the memory 120 in the present example.

In the present example, since the driving current Ik includes the overshoot current Iov set as described above, not only the falling of the light output waveform but also the rounding in the rising of the light output waveform can be improved. Therefore, the response property of the light output waveform can be improved.

Fourth Example

Fourth Example of the present invention will be hereinafter described with reference to the drawings. Fourth Example of the present invention differs from First Example in that the driving current Ik includes the first overshoot current Iov1 and the second overshoot current Iov2. Accordingly, differences between Fourth Example and First Example are only described in the following description, and the same reference numbers are applied to the configurations which are the same as those in First Example; thus, the detailed description thereof will be omitted.

Figure 51:
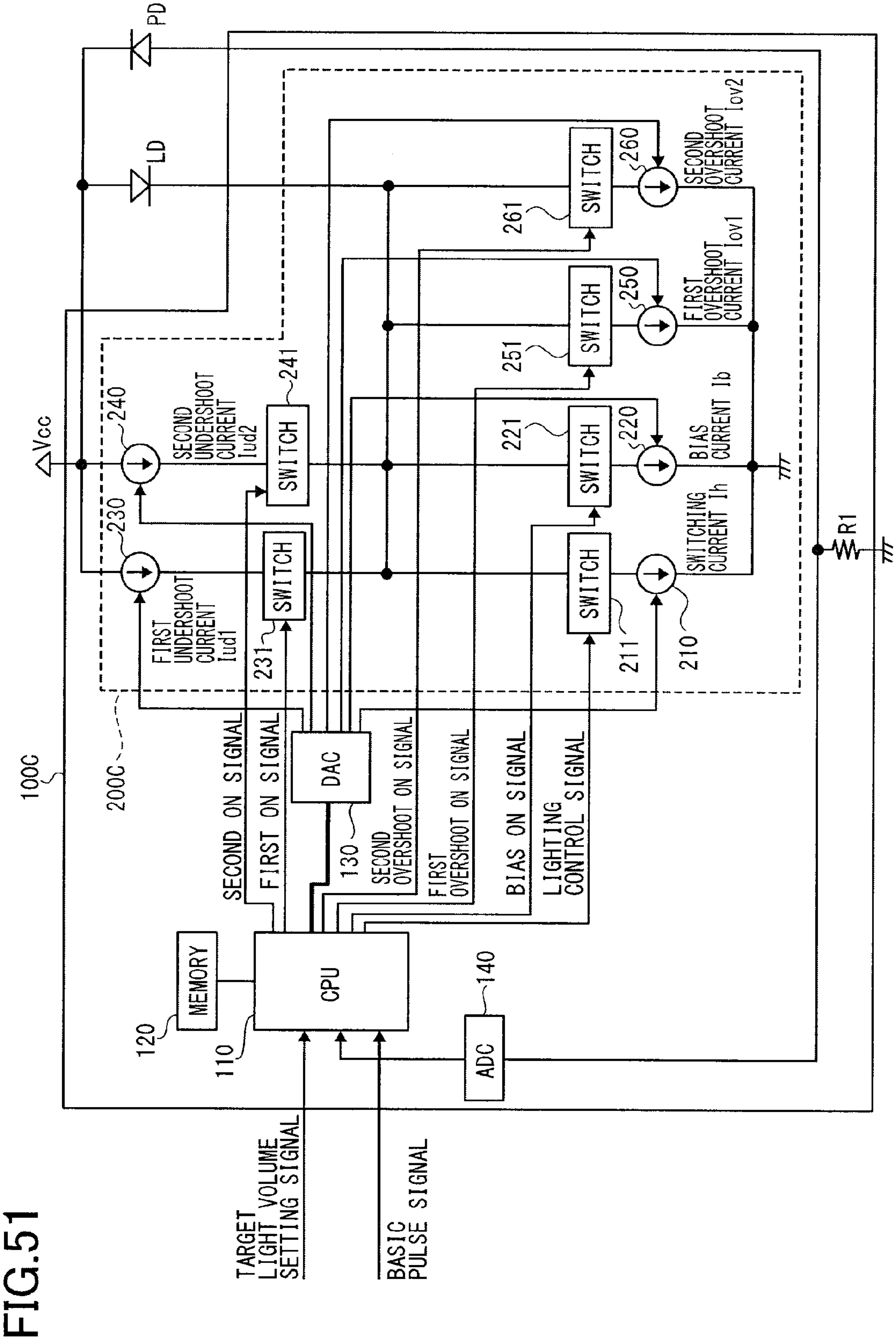
FIG. 51 is a view describing a light source-driving circuit according to Fourth Example.

FIG. 51 is a view describing a light source-driving circuit of Fourth Example.

The light source-driving circuit 100C of the present example includes a CPU (Central Processing Unit) 110, memory 120, DAC (Digital-to-Analog Converter) 130, ADC (Analog-to-Digital Converter) 140, LD driver 200C, and resistance R1.

The LD driver 200C of the present example includes a switching current source 210, bias current source 220, first undershoot current 230, second undershoot current 240, first overshoot current source 260, second overshoot current source 270, and switches 211, 231, 241, 261, 271 which control the connection between each current source and an LD.

Figure 52:
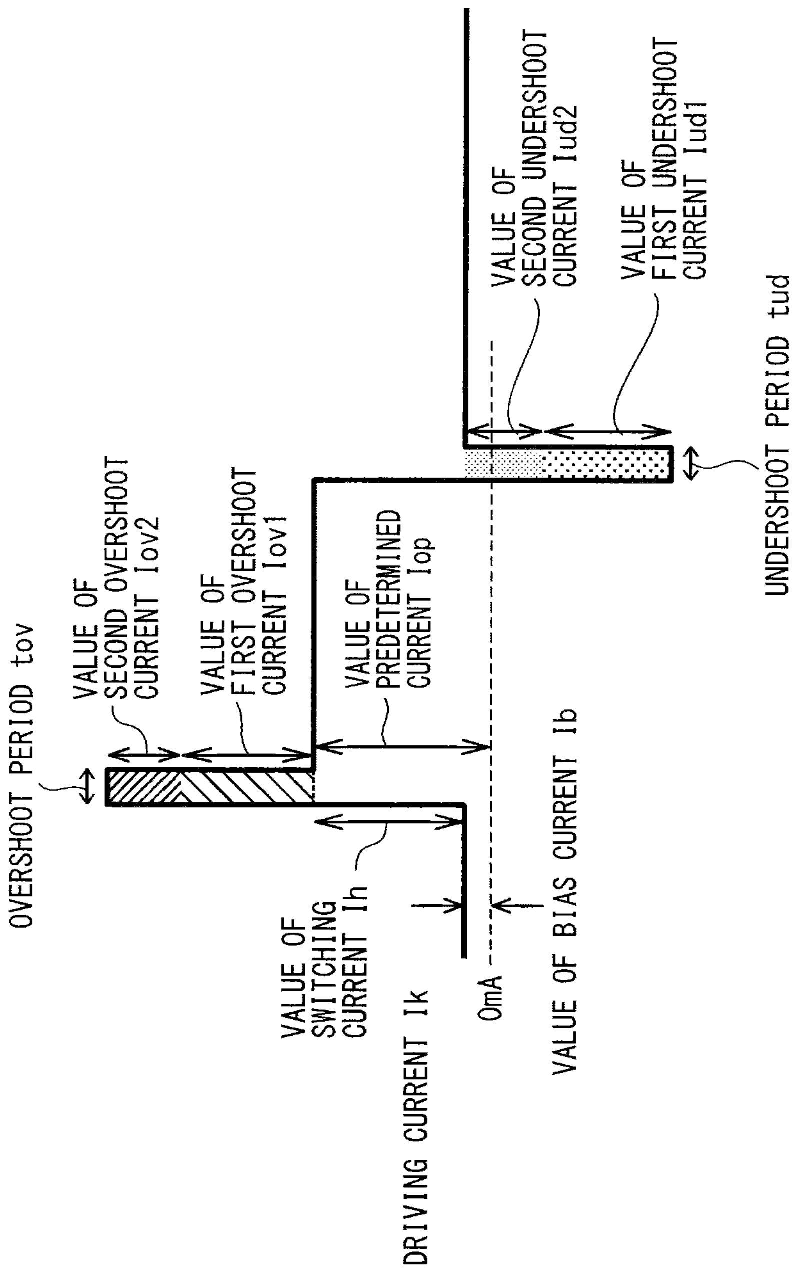
FIG. 52 is a first view illustrating an example of a driving current waveform according to Fourth Example.

FIG. 52 is a first view illustrating an example of a drive current waveform in Fourth Example.

The driving current Ik of the present example includes a first overshoot current Iov1 and a second overshoot current Iov2 which are applied in synchronization with a predetermined current Top.

In the present example, the value of the first overshoot current Iov1 is set to a fixed value, and the value of the second overshoot current Iov2 is set to a variable value. In the present example, the first overshoot current Iov1 and the second overshoot current Iov2 are simultaneously applied to the LD during the overshoot period tov.

The value of the first overshoot current Iov1 in the present example is set such that the amount of the first overshoot current Iov1 is equal to the amount of the first undershoot current Iud1. The value of the second overshoot current Iov2 is set such that the amount of the second overshoot current Iov2 is equal to the amount of the second undershoot current Iud2.

Figure 53:
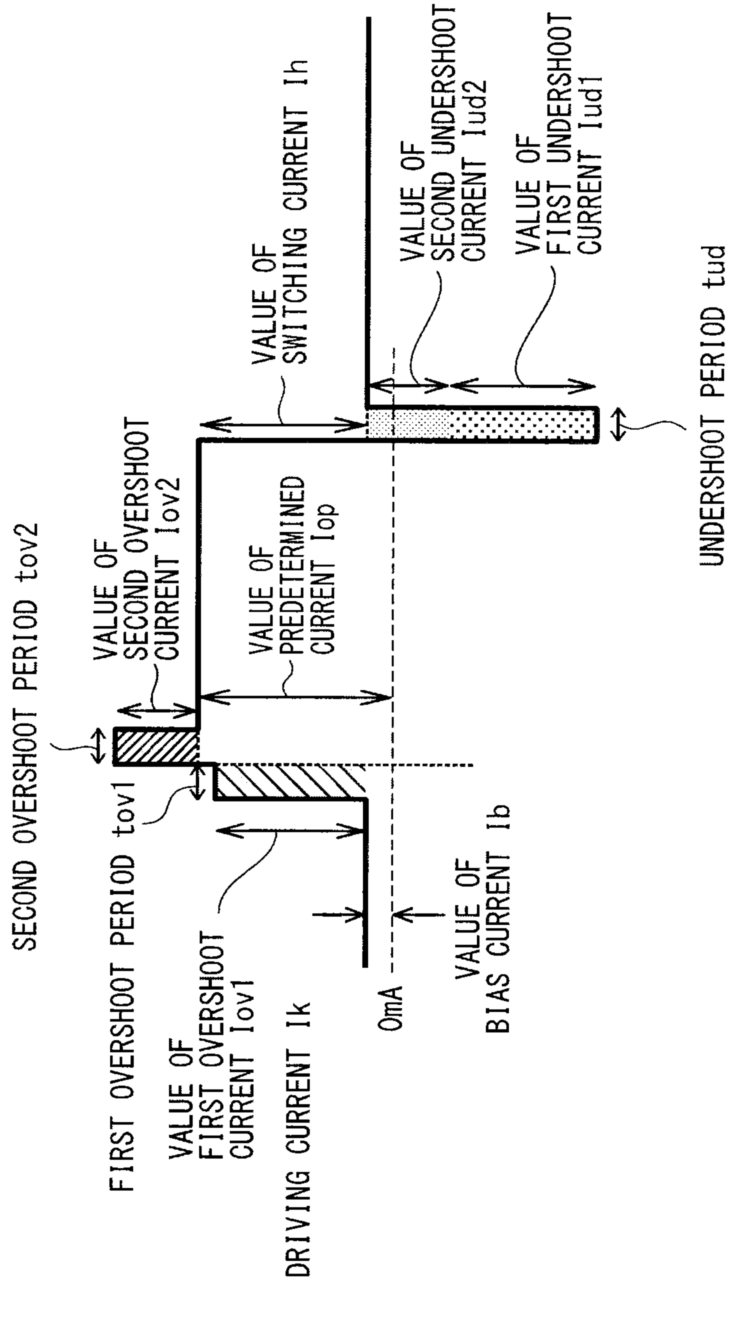
FIG. 53 is a second view illustrating an example of a driving current waveform according to Fourth Example.

FIG. 53 is a second view illustrating the driving current waveform in Fourth Example.

In the driving current Ik illustrated in FIG. 53, the first overshoot current Iov1 is applied prior to the rising of the predetermined current Iop, and the second overshoot current Iov2 is applied in synchronization with the rising of the predetermined current Iop.

In the present example, the first and second undershoot currents Iud1, Iud2 are applied to the LD during the undershoot period tud in synchronization with the falling of the predetermined current Iop. The first overshoot period tov1 and the second overshoot period tov2 of the present example have a period which is the same as the undershoot period tud.

In the driving current Ik illustrated in FIG. 53, the parasitic capacity C is previously charged by the first overshoot current Iov1, so that the oscillation delay time of the LD due to the charging time can be reduced.

As illustrated in FIGS. 52, 53, the driving current Ik in the present example is set such that the amount of the first and second overshoot currents Iov1, Iov2 is equal to the amount of the first and second undershoot currents Iud1, Iud2. With this configuration, the present example does not require a circuit configuration which sets the first and second overshoot currents Iov1, Iov2, so that the rounding in the rising of the light output waveform can be improved with a simple configuration.

According to the light source driver in one embodiment of the present invention, the stability of the light waveform can be improved.

According to the response feature of the light output in one embodiment of the present invention, the response feature of the light output can be improved.

Although the embodiments including examples of the present invention have been described above, the present invention is not limited thereto. It should be appreciated that variations may be made in the embodiments described by persons skilled in the art without departing from the scope of the present invention.

What is claimed is:

1. A light source driver, comprising:

a controller which outputs an undershoot current in synchronization with lighting complete timing in lighting information, wherein the controller is configured to output the undershoot current such that a voltage in a light source when the output of the undershoot current is complete is equal to a voltage in the light source before being turned on.

2. The light source driver according to claim 1, wherein the controller is configured to control at least one of an output time and a magnitude of the undershoot current.

3. The light source driver according to claim 1, wherein the controller is configured to output a bias current regardless of the lighting information, and the controller is configured to control the undershoot current such that the voltage in the light source when the output of the undershoot current is complete is equal to a voltage corresponding to the bias current.

4. The light source driver according to claim 1, wherein an output time of the undershoot current is a time from the lighting complete timing to next lighting start timing in the lighting information.

5. The light source driver according to claim 1, wherein the controller is configured to delay output timing of the undershoot current relative to the lighting complete timing in the lighting information.

6. The light source driver according to claim 5, wherein the controller is configured to control an integral light volume in turning-on by delaying the output timing of the undershoot current.

7. The light source driver according to claim 6, wherein the controller is configured to output an overshoot current in synchronization with lighting start timing in the lighting information.

8. The light source driver according to claim 7, wherein the light source includes a plurality of light emitters, and the controller is configured to control the overshoot current such that the integral light volume in the turning-on becomes the same in a plurality of light emitters.

9. The light source driver according to claim 1, wherein the light source includes a surface-emitting laser.

10. A method of driving a light source, comprising:

a step of outputting an operation current from lighting start timing to lighting complete timing in lighting information; and a step of outputting an undershoot current in synchronization with the lighting complete timing such that a voltage in the light source when the output of the undershoot current is complete equals to a voltage in the light source before being turned on.

11. A light source-driving circuit which drives a light source, comprising:

a driving current generator which generates a predetermined current for obtaining a predetermined light volume from the light source, and a driving current including a first undershoot current and a second undershoot current to be subtracted from the predetermined current; and a controller which sets the first undershoot current to a fixed value, and sets the second undershoot current to a value adjusted according to the light volume of the light source.

12. The light source-driving circuit according to claim 11, further comprising:

a memory which stores associated information of a light volume of the light source and a value of the second undershoot current, wherein the controller includes an undershoot current adjuster which adjusts the value of the second undershoot current based on the associated information and the light volume of the light source.

13. The light source-driving circuit according to claim 12, wherein the associated information includes at least one of a function indicating a relationship between the light volume of the light source and the value of the second undershoot current and a table having a correspondence between the light volume of the light source and the value of the second undershoot current.

14. The light source-driving circuit according to claim 11, wherein a value of the first undershoot current and a first undershoot period in which the first undershoot current is supplied to the light source are set based on an electric charge amount which discharges a parasitic capacity in the light source-driving circuit to a target electric potential of the light source when turning off the light source.

15. The light source-driving circuit according to claim 14, wherein the first undershoot period and a second undershoot period in which the second undershoot current is supplied to the light source are equal.

16. The light source-driving circuit according to claim 11, wherein the second undershoot current is supplied to the light source in synchronization with falling of the predetermined current, and the first undershoot current is supplied to the light source after the second undershoot current is supplied to the light source.

17. The light source-driving circuit according to claim 11, wherein the first undershoot current and the second undershoot current are supplied to the light source in synchronization with falling of the predetermined current.

18. The light source-driving circuit according to claim 11, wherein the driving current generator is configured such that the driving current includes a first overshoot current and a second overshoot current which are added in synchronization with rising of the predetermined current, and the controller is configured to set a value of the first overshoot current and a first overshoot period such that the amount of the first overshoot current is equal to the amount of the first undershoot current, and to set a value of the second overshoot current and a second overshoot period such that the amount of the second overshoot current is equal to the amount of the second undershoot current.

19. An optical scanner, comprising:

a light source;

a reflection mirror which reflects light irradiated from the light source; and a light source-driving circuit which drives the light source, wherein the light source-driving circuit includes a driving current generator which generates a predetermined current for obtaining a predetermined light volume from the light source and a driving current including a first undershoot current and a second undershoot current subtracted from the predetermined current, and a controller which sets the first undershoot current to a fixed value, and sets the second undershoot current to a value adjusted according to the light volume of the light source.

20. An image-forming apparatus, comprising:

a light source;

a reflection mirror which reflects light irradiated from the light source;

a photoreceptor which is scanned by light reflected by the reflection mirror; and a light source-driving circuit which drives the light source, wherein the light source-driving circuit includes a driving current generator which generates a predetermined current for obtaining a predetermined light volume from the light source and a driving current including a first undershoot current and a second undershoot current subtracted from the predetermined current, and a controller which sets the first undershoot current to a fixed value, and sets the second undershoot current to a value adjusted according to the light volume of the light source.

* * * * *